United States Patent
Jin et al.

(10) Patent No.: US 12,213,205 B2
(45) Date of Patent: Jan. 28, 2025

(54) APPARATUS AND METHOD FOR SUPPORTING VEHICLE-TO-EVERYTHING IN WIRELESS COMMUNICATION SYSTEM

(71) Applicant: Samsung Electronics Co., Ltd., Suwon-si (KR)

(72) Inventors: Seungri Jin, Suwon-si (KR); Anil Agiwal, Suwon-si (KR); Soenghun Kim, Suwon-si (KR); Hyunjeong Kang, Suwon-si (KR); Sangyeob Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 435 days.

(21) Appl. No.: 17/278,024

(22) PCT Filed: Sep. 20, 2019

(86) PCT No.: PCT/KR2019/012190
§ 371 (c)(1),
(2) Date: Mar. 19, 2021

(87) PCT Pub. No.: WO2020/060254
PCT Pub. Date: Mar. 26, 2020

(65) Prior Publication Data
US 2021/0385710 A1 Dec. 9, 2021

(30) Foreign Application Priority Data
Sep. 21, 2018 (KR) .......................... 10-2018-0114440

(51) Int. Cl.
*H04W 76/28* (2018.01)
*H04L 5/14* (2006.01)
(Continued)

(52) U.S. Cl.
CPC ........... *H04W 76/28* (2018.02); *H04L 5/1469* (2013.01); *H04W 4/40* (2018.02);
(Continued)

(58) Field of Classification Search
CPC ... H04W 36/08; H04W 4/40; H04W 36/0072; H04W 72/02; H04W 76/28; H04W 48/12;
(Continued)

(56) References Cited

U.S. PATENT DOCUMENTS 10,075,887 B2 * 9/2018 Suzuki .............. H04W 36/0058
2017/0215119 A1 * 7/2017 Hong .................. H04W 56/001
(Continued)

FOREIGN PATENT DOCUMENTS

CN 107734557 A 2/2018
EP 3 197 224 A1 7/2017
(Continued)

OTHER PUBLICATIONS

Huawei et al., TS 36.300 Running CR for eV2X, 3GPP TSG RAN WG2 Meeting #101bis, R2-1804642, Sanya, China, Apr. 6, 2018.
(Continued)

*Primary Examiner* — Steven Hieu D Nguyen
(74) *Attorney, Agent, or Firm* — Jefferson IP Law, LLP

(57) ABSTRACT

The present disclosure relates to a 5th generation (5G) or pre-5G communication system for supporting a higher data transmission rate beyond a 4th generation (4G) communication system such as long term evolution (LTE). The present disclosure provides an apparatus and a method for supporting vehicle-to-everything (V2X) in a wireless communication system. A method for operating a terminal provided by the present disclosure comprises: a step of performing vehicle-to-everything (V2X) communication with another terminal by using a first transmission resource pool set by a first base station connected to the terminal; a
(Continued)

step of transmitting, to the first base station, a measurement result for at least one neighboring base station including a second base station; a step of receiving an indication message for handover from the first base station to the second base station; and a step of performing V2X communication with another terminal by using an exceptional resource pool set for the terminal during handover.

8 Claims, 39 Drawing Sheets

(51) Int. Cl.
*H04W 4/40* (2018.01)
*H04W 36/00* (2009.01)
*H04W 36/08* (2009.01)
*H04W 72/02* (2009.01)

(52) U.S. Cl.
CPC ....... *H04W 36/0072* (2013.01); *H04W 36/08* (2013.01); *H04W 72/02* (2013.01); *H04W 36/037* (2023.05)

(58) Field of Classification Search
CPC . H04W 92/18; H04W 36/03; H04W 74/0808; H04W 76/23; H04W 72/04; H04W 48/08; H04L 5/1469
See application file for complete search history.

(56) References Cited

U.S. PATENT DOCUMENTS

| 2020/0008183 A1* | 1/2020 | Chen | H04W 72/20 |
| 2020/0170002 A1* | 5/2020 | Lee | H04W 72/0453 |
| 2021/0068079 A1* | 3/2021 | Sahin | H04W 4/40 |
| 2021/0185578 A1* | 6/2021 | Zhuo | H04W 36/22 |

FOREIGN PATENT DOCUMENTS

| EP | 3 768 017 A1 | 1/2021 |
| KR | 10-2019-0119799 A | 10/2019 |
| WO | 2017/076373 A2 | 5/2017 |
| WO | 2017/148236 A1 | 9/2017 |
| WO | 2018/093220 A1 | 5/2018 |

OTHER PUBLICATIONS

ZTE, Resource pool sharing between mode 3 and mode 4, 3GPP TSG RAN WG1 Meeting #93, R1-1806100, Busan, Korea, May 12, 2018.
Fraunhofer Hhi et al., Resource Pool Sharing between V2X Mode 3 and Mode 4 UEs, 3GPP TSG RAN WG1 Meeting #92, R1-1802888, Athens, Greece, Feb. 16, 2018.
Huawei, Summary of [94#30][LTE/V2V]—RRC Open issues, 3GPP TSG-RAN WG2 Meeting #95, R2-164880, Aug. 21, 2016, Gothenburg, Sweden.
Ericsson, Remaining open issues for RRC timers in EN-DC, R2-1713346, 3GPP TSG-RAN WG2 #100, Nov. 17, 2017, Reno, Nevada.
Intel, Background on RAN Delay Budget Reporting, S4-180038, 3GPP TSG-SA4 Meeting #97, Feb. 4, 2018, Fukuoka, Japan.
Huawei, Introduction of RRC connection reconfiguration / UE Assistance Information / Delay Budget Report setup and release in 8.2.2.6.4, R5-176960, 3GPP TSG-RAN5 Meeting #77, Dec. 14, 2017, Reno, US.
European Search Report dated Feb. 16, 2022, issued in European Application No. 19863858.7.
Ericsson, Introducing 5G indication in LTE RRC SIB, R2-1710512, 3GPP TSG-RAN WG2 #99bis, Oct. 8, 2017, Prague, Czech Republic.
China Telecom, On the ways of SI message generation and transportation in disaggregated gNB, R3-173043, 3GPP TSG-RAN3 #97, Aug. 21, 2017, Berlin, Germany.
European Search Report dated Oct. 15, 2021, issued in European Application No. 19863858.7.
CATT, Considerations on synchronization mechanism in NR V2X, R1-1808401, 3GPP TSG RAN WG1 Meeting #94, Gothenburg, Sweden, Aug. 11, 2018.
Ericsson (Rapporteur), Introduction of SA, R2-1813492, 3GPP TSG-WG2 Meeting #103, Gothenburg, Sweden, Sep. 5, 2018.
Korean Office Action dated Sep. 8, 2023, issued in Korean Patent Application No. 10-2018-0114440.
Samsung, Sensing related interruption for UE autonomous resource selection, R2-165042, 3GPP TSG-RAN WG2 Meeting #95, Gothenburg, Sweden, Aug. 21, 2016.
European Office Action dated Feb. 21, 2024, issued in European Patent Application No. 19 863 858.7.
Huawei et al., Introduction of eV2X in TS 36.331, R2-1813202, 3GPP TSG-RAN WG2 Meeting #103, Gothenburg, Sweden, Aug. 20-24, 2018.
Huawei et al., TS 36.300 Running CR for eV2X, R2-1804642, 3GPP TSG-RAN WG2 Meeting #101bis, Sanya, China, Apr. 16-20, 2018.
Korean Office Action dated May 23, 2024, issued in Korean Patent Application No. 10-2018-0114440.

* cited by examiner

|   0   |   1   |   2   |   3   |   4   |   5   |   6   |   7   | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
|---|---|---|---|---|---|---|---|---|---|---|---|---|---|---|---|---|---|---|---|---|---|---|---|---|---|---|---|---|---|---|---| header
- V=2 | P | RC | PT = SR = 200 | Length
- SSRC of sender sender info
- NTP timestamp, most significant word
- NTP timestamp, most significant word
- RTP timestamp
- Sender's packet count
- Sender's octet count report block 1
- SSRC_1 (SSRC of first source)
- fraction lost | cumulative number of packets lost
- extended highest sequence number received
- interarrival jitter
- last SR (LSR)
- delay since last SR (DLSR)

report block 2
- SSRC_2 (SSRC of second source)
- ........
- profile-specific extensions

FIG.22A ical Problem section)

APPARATUS AND METHOD FOR SUPPORTING VEHICLE-TO-EVERYTHING IN WIRELESS COMMUNICATION SYSTEM

BACKGROUND ART

The disclosure relates to a wireless communication system and, more particularly, to an apparatus and method for supporting vehicle-to-everything (V2X) in a wireless communication system.

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

In a 5G system, a vehicle to everything (V2X) technology is being considered. In order to support V2X operation in a new radio (NR) system apart from V2X operation in an existing LTE system, a specific procedure for satisfying new requirements in the NR system is being discussed.

DISCLOSURE OF INVENTION

Technical Problem

Therefore, the disclosure has been made in view of the above-mentioned problems, and an aspect of the disclosure is to provide an apparatus and method for effectively supporting vehicle-to-everything (V2X) in a wireless communication system.

Solution to Problem

In accordance with an aspect of the disclosure, a method of operating a terminal in a wireless communication system may include: performing vehicle-to-everything (V2X) communication with another terminal using a first transmission resource pool configured by a first base station connected with the terminal; transmitting a measurement result of at least one neighboring base station including a second base station to the first base station; receiving an indication message for handover from the first base station to the second base station; and performing V2X communication with the other terminal using an exceptional resource pool configured for the terminal during the handover.

In accordance with another aspect of the disclosure, a terminal device in a wireless communication system may include: a transceiver; and at least one processor, wherein the at least one processor is configured to: perform V2X communication with another terminal using a first transmission resource pool configured by a first base station connected with the terminal; transmit a measurement result of at least one neighboring base station including a second base station to the first base station; receive an indication message for handover from the first base station to the second base station; and perform V2X communication with the other terminal using an exceptional resource pool configured for the terminal during the handover.

Advantageous Effects of Invention

An apparatus and a method according to various embodiments of the disclosure can effectively support vehicle-to-everything (V2X) in a wireless communication system.

Advantageous effects obtainable from the disclosure may not be limited to the above mentioned effects, and other effects which are not mentioned may be clearly understood, through the following descriptions, by those skilled in the art to which the disclosure pertains.

BRIEF DESCRIPTION OF DRAWINGS

FIGS. 22A to 22B illustrate an example of a method for a terminal to measure a packet transmission delay in a wireless communication system according to various embodiments of the disclosure.

BEST MODE FOR CARRYING OUT THE INVENTION

Figure 1:
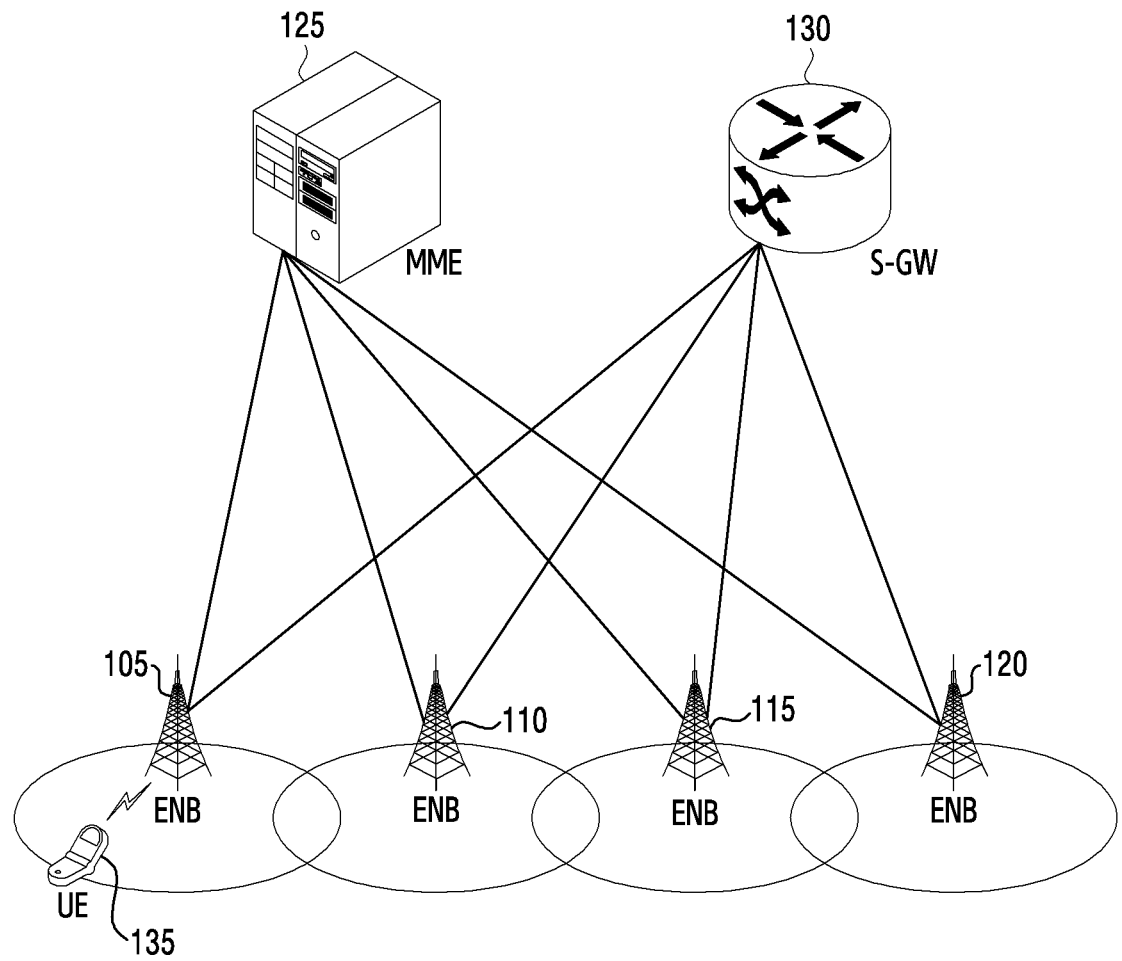
FIG. 1 illustrates an example of a wireless communication system according to various embodiments of the disclosure.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, the disclosure relates to an apparatus and method for effectively supporting vehicle-to-everything (V2X) in a wireless communication system.

In the following description, terms that refer to communication methods, terms that refer to signals, terms that refer to information, terms that refer to network entities, terms that refer to components of devices, etc., are illustrated for convenience of description. Accordingly, the disclosure is not limited to terms to be described later, and other terms having an equivalent technical meaning may be used.

In addition, the disclosure describes various embodiments using terms used in some communication standards {e.g., 3rd generation partnership project (3GPP)}, but these are only examples for description. Various embodiments of the disclosure may be easily modified and applied to other communication systems.

Hereinafter, the operating principle of the disclosure will be described in detail with reference to the accompanying drawings. In the following description of the disclosure, when it is determined that a detailed description of a related known function or configuration may unnecessarily obscure the subject matter of the disclosure, the detailed description thereof will be omitted. In addition, terms to be described later are terms defined in consideration of functions in the disclosure and may vary according to the intention or practices of users or operators. Therefore, the definition should be made based on the contents throughout this specification. Terms for identifying access nodes, terms referring to network entities, terms referring to messages, terms referring to an interface between network objects, and terms referring to various types of identification information, which are used in the following description, and the like are illustrated for convenience of description. Accordingly, the disclosure is not limited to terms to be described later, and other terms referring to objects having an equivalent technical meaning may be used.

For convenience of description below, this disclosure uses terms and names defined in the 3GPP LTE standard. However, the disclosure is not limited by the terms and names, and may be equally applied to systems according to other standards.

FIG. 1 illustrates an example of a wireless communication system according to various embodiments of the disclosure. Specifically, FIG. 1 is a diagram illustrating a structure of an LTE system referred to for description of the disclosure.

Referring to FIG. 1, a radio access network of the LTE system includes next-generation base stations (evolved node B, hereinafter, eNB, node B or base station) 105, 110, 115, and 120, a mobility management entity (MME) 125, and a serving-gateway (S-GW) 130. User equipment (UE) 135 accesses an external network through the eNBs 105 to 120 and the S-GW 130.

In FIG. 1, the eNBs 105 to 120 correspond to an existing Node B of a UMTS system. The eNB is connected to the UE 135 through a radio channel and performs a more complex role than the existing Node B. In the LTE system, all user traffic including real-time services such as Voice over IP (VoIP) through an Internet protocol are serviced through a shared channel, so a device that collects and schedules status information such as buffer status, available transmission power status, and channel status of UEs is required, and the eNBs 105 to 120 are responsible for this. One eNB typically controls multiple cells. For example, in order to implement a transmission rate of 100 Mbps, the LTE system uses, for example, orthogonal frequency division multiplexing (hereinafter, referred to as "OFDM") in a bandwidth of 20 MHz as a radio access technology. In addition, adaptive modulation and coding (hereinafter, referred to as "AMC") that determines a modulation scheme and a channel coding rate according to the channel state of the UE is applied. The S-GW 130 is a device that provides a data bearer, and generates or removes the data bearer under the control of the MME 125. The MME is a device responsible for various control functions as well as mobility management functions for a UE, and is connected to a number of eNBs.

Figure 2:
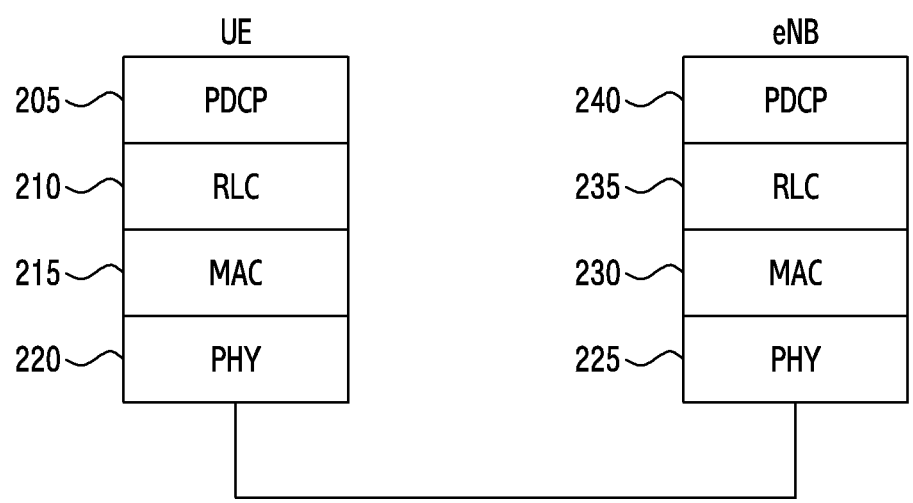
FIG. 2 illustrates an example of a radio protocol structure of a wireless communication system according to various embodiments of the disclosure.

FIG. 2 illustrates an example of a radio protocol structure of a wireless communication system according to various embodiments of the disclosure.

FIG. 2 is a diagram illustrating a radio protocol structure in an LTE system referred to for description of the disclosure.

Referring to FIG. 2, the radio protocol of the LTE system is composed of a packet data convergence protocol (PDCP) 205 or 240, a radio link control (RLC) 210 or 235, and a medium access control (MAC) 215 or 230, respectively, at a terminal and a base station. The PDCPs 205 and 240 are in charge of operations such as IP header compression/decompression, and the like. The main functions of PDCP are summarized as follows:
  Header compression and decompression: ROHC only
  Transfer of user data
  In-sequence delivery of upper layer PDUs at PDCP re-establishment procedure for RLC AM
  For split bearers in DC (only support for RLC AM): PDCP PDU routing for transmission and PDCP PDU reordering for reception
  Duplicate detection of lower layer SDUs at PDCP re-establishment procedure for RLC AM
  Retransmission of PDCP SDUs at handover and, for split bearers in DC, of PDCP PDUs at PDCP data-recovery procedure, for RLC AM
  Ciphering and deciphering
  Timer-based SDU discard in uplink.

The radio link controls (RLCs) 210 and 235 performs an ARQ operation or the like by reconfiguring a PDCP packet data unit (PDU) to an appropriate size. The main functions of RLC are summarized as follows:
  Transfer of upper layer PDUs
  Error Correction through ARQ (only for AM data transfer)
  Concatenation, segmentation and reassembly of RLC SDUs (only for UM and AM data transfer)
  Re-segmentation of RLC data PDUs (only for AM data transfer)
  Reordering of RLC data PDUs (only for UM and AM data transfer)
  Duplicate detection (only for UM and AM data transfer)
  Protocol error detection (only for AM data transfer)
  RLC SDU discard (only for UM and AM data transfer)
  RLC re-establishment The MACs 215 and 230 are connected to several RLC layer devices configured in one terminal, and performs an operation of multiplexing RLC PDUs to an MAC PDU and demultiplexing the RLC PDUs from the MAC PDU. The main functions of MAC are summarized as follows:
  Mapping between logical channels and transport channels
  Multiplexing/demultiplexing of MAC SDUs belonging to one or different logical channels into/from transport blocks (TB) delivered to/from the physical layer on transport channels
  Scheduling information reporting
  Error correction through HARQ
  Priority handling between logical channels of one UE
  Priority handling between UEs by means of dynamic scheduling
  MBMS service identification
  Transport format selection
  Padding Physical layers 220 and 225 channel-code and modulate upper layer data, make the obtained data into an OFDM symbol, and transmit the OFDM symbol through a radio channel, or demodulate the OFDM symbol received through the radio channel, and channel decode the demodulated OFDM symbol and transmit the obtained data to the upper layer. In addition, the physical layer also uses hybrid ARQ (HARQ) for additional error correction, and the receiving end transmits information indicating whether a packet transmitted by the transmitting end is received, in one bit. This is called HARQ ACK/NACK information. Downlink HARQ ACK/NACK information for uplink transmission may be transmitted through a physical hybrid-ARQ indicator channel (PHICH) physical channel, and uplink HARQ ACK/NACK information for downlink transmission may be transmitted through a physical uplink control channel (PUCCH) or a physical uplink shared channel (PUSCH).

Meanwhile, the PHY layer may be composed of one or a plurality of frequencies/carriers, and a technology for simultaneously configuring and using a plurality of frequencies is referred to as a carrier aggregation (hereinafter, referred to as "CA") technology. In the CA technology, only one carrier was used for communication between a terminal (or UE) and a base station (E-UTRAN NodeB or eNB), but by additionally using a primary carrier and one or a plurality of subcarriers, the amount of transmission can be dramatically increased by the number of subcarriers. Meanwhile, in LTE, a cell in an eNB that uses a primary carrier is called a primary cell (PCell), and a subcarrier is called a secondary cell (SCell).

Although not shown in this figure, there is a radio resource control (RRC) layer, respectively, above the PDCP layer of the UE and the eNB, and the RRC layer may transmit and receive access and measurement-related configuration control messages for radio resource control.

Figure 3:
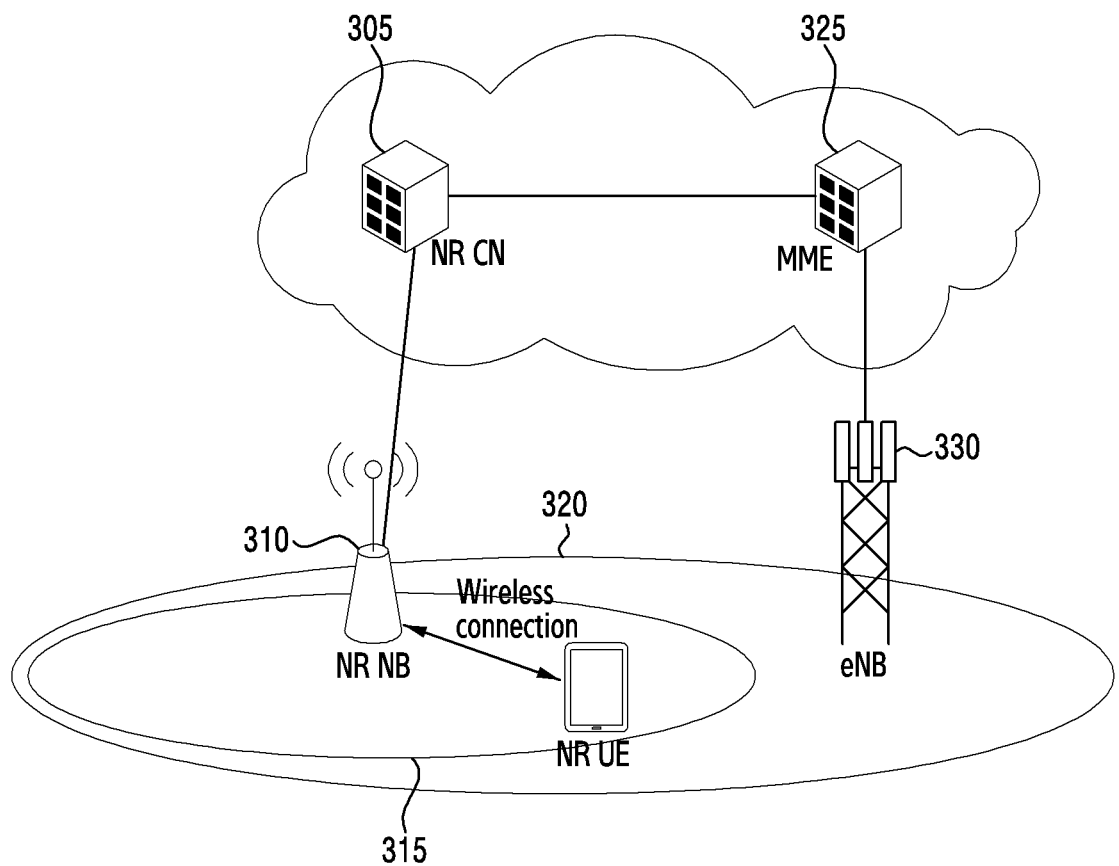
FIG. 3 illustrates an example of a structure of a wireless communication system according to various embodiments of the disclosure.

FIG. 3 illustrates an example of a structure of a wireless communication system according to various embodiments of the disclosure.

FIG. 3 is a diagram illustrating a structure of a next-generation mobile communication system to which the disclosure is applied.

Referring to FIG. 3, a radio access network of a next-generation mobile communication system is composed of a next-generation base station (new radio node B, hereinafter, referred to as "NR NB") 310, and a new radio core network (NR CN) or a next-generation core network (NG CN) 305. User equipment (new radio user equipment, hereinafter, NR UE or terminal) 315 accesses an external network through the NR NB 310 and the NR CN 305.

In FIG. 3, the NR NB 310 corresponds to an evolved node B (eNB) of an existing LTE system. The NR NB is connected to the NR UE 315 through a radio channel, and can provide a service superior to that of the existing Node B. In the next-generation mobile communication system, all user traffic is serviced through a shared channel, so a device that collects and schedules status information such as buffer status, available transmission power status, and channel status of UEs, and the NR NB 310 is responsible for this. One NR NB typically controls multiple cells. In order to implement ultra-high-speed data transmission compared to the existing LTE, it may have an existing maximum bandwidth or more, and OFDM may be used as a radio access technology to additionally incorporate a beamforming technology. In addition, adaptive modulation and coding (hereinafter, referred to as "AMC") that determines a modulation scheme and a channel coding rate according to the channel status of the UE is applied. The NR CN 305 performs functions such as mobility support, bearer configuration, and QoS configuration. The NR CN is a device responsible for various control functions as well as a mobility management function for a UE, and is connected to a plurality of eNBs. In addition, the next-generation mobile communication system can be interlocked with the existing LTE system, and the NR CN is connected to an MME 325 through a network interface. The MME is connected to the eNB 330, which is an existing base station.

Figure 4:
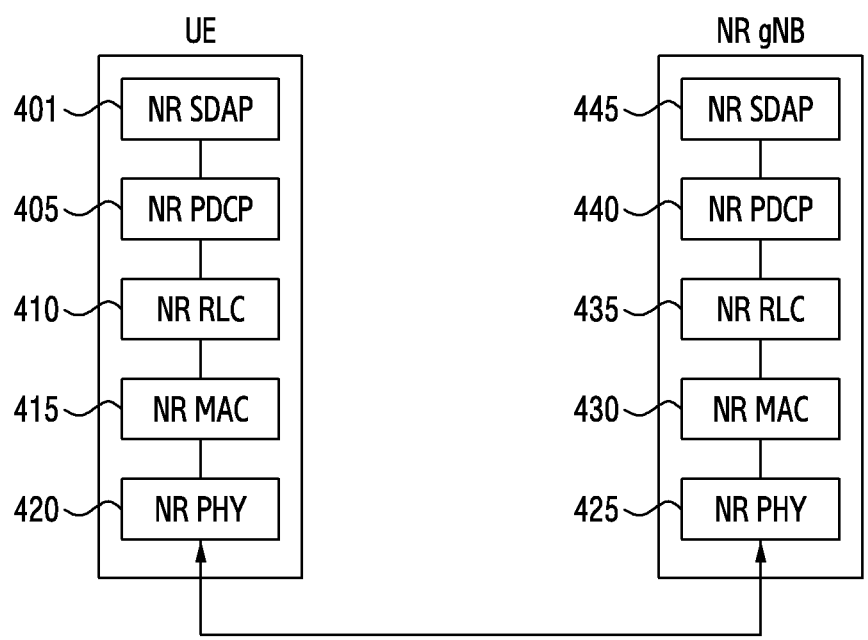
FIG. 4 illustrates an example of a radio protocol structure of a wireless communication system according to various embodiments of the disclosure.

FIG. 4 illustrates an example of a radio protocol structure of a wireless communication system according to various embodiments of the disclosure.

FIG. 4 is a diagram illustrating a radio protocol structure of a next-generation mobile communication system to which the disclosure can be applied.

Referring to FIG. 4, the radio protocol of the next-generation mobile communication system is composed of an NR SDAP 401 or 445, an NR PDCP 405 or 440, an NR RLC 410 or 435, and an NR MAC 415 or 430, respectively, at a terminal and an NR base station.

The main functions of the NR SDAPs 401 and 445 may include some of the following functions.
  Transfer of user plane data
  Mapping between a QoS flow and a DRB for both DL and UL
  Marking QoS flow ID in both DL and UL packets
  Mapping reflective QoS flow to DRB for the UL SDAP PDUs.

For the SDAP layer device, a UE may be configured with an RRC message to determine whether to use the header of the SDAP layer device or the function of the SDAP layer device for each PDCP layer device, for each bearer, or for each logical channel. When the SDAP header is configured, the UE can use an NAS QoS reflective configuration 1-bit indicator (NAS reflective QoS) of the SDAP header and an AS QoS reflective configuration 1-bit indicator (AS reflective QoS) to instruct the UE to update or reconfigure mapping information on the QoS flow and data bearer of UL or DL. The SDAP header may include QoS flow ID information indicating QoS. The QoS information may be used as data processing priority, scheduling information, and the like to smoothly support services.

The main functions of the NR PDCPs 405 and 440 may include some of the following functions.
  Header compression and decompression: ROHC only
  Transfer of user data
  In-sequence delivery of upper layer PDUs
  Out-of-sequence delivery of upper layer PDUs
  PDCP PDU reordering for reception
  Duplicate detection of lower layer SDUs
  Retransmission of PDCP SDUs
  Ciphering and deciphering
  Timer-based SDU discard in uplink In the above, the reordering of the NR PDCP device refers to a function of reordering PDCP PDUs received from a lower layer in order based on a PDCP sequence number (SN), and may include a function of transferring data to an upper layer in the order of reordering or a function of immediately transferring data without considering the order, a function of recording lost PDCP PDUs by recording, a function of reporting the status of the lost PDCP PDUs to a transmitting side, and a function of requesting retransmission of the lost PDCP PDUs.

The main functions of the NR RLCs 410 and 435 may include some of the following functions.
  Transfer of upper layer PDUs
  In-sequence delivery of upper layer PDUs
  Out-of-sequence delivery of upper layer PDUs
  Error Correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment In the above, the in-sequence delivery of the NR RLC device refers to a function of delivering RLC SDUs received from a lower layer to an upper layer in order, and may include a function of, when one RLC SDU is originally divided into multiple RLC SDUs and received, reassembling and delivering the divided RLC SDUs, and a function of rearranging the received RLC PDUs based on RLC sequence number (SN) or PDCP sequence number (SN). In addition, the in-sequence delivery function of the NR RLC device may include a function of recording the lost RLC PDUs by reordering, a function of reporting the status of the lost RLC PDUs to the transmitting side, a function of requesting retransmission of the lost RLC PDUs, a function of sequentially delivering, when there is a lost RLC SDU, only RLC SDUs up to before the lost RLC SDU to the upper layer, a function of sequentially delivering, when a predetermined timer has expired although there is the lost RLC SDU, all RLC SDUs received before the timer starts to the upper layer, and a function of sequentially delivering, when a predetermined timer has expired although there is the lost RLC SDU, all RLC SDUs received so far to the upper layer. In addition, in the above, the RLC PDUs may be processed in the order of reception thereof (regardless of the order of serial number and sequence number, in the order of arrival) and may be delivered to the PDCP device regardless of the order (Out-of sequence delivery). In the case of segment, segments stored in a buffer or to be received in the future may be received, reconfigured into one complete RLC PDU, processed, and then delivered to the PDCP device. The NR RLC layer may not include a concatenation function, and may be performed by the NR MAC layer or may be replaced with a multiplexing function of the NR MAC layer.

In the above, the out-of-sequence delivery of the NR RLC device refers to a function of immediately delivering RLC SDUs received from the lower layer to the upper layer regardless of the order, and may include a function of reassembling and delivering, when one RLC SDU is originally divided into multiple RLC SDUs and received, the received RLC SDUs, and a function of storing the RLC SN or PDCP SN of the received RLC PDUs and recording the lost RLC PDUs by reordering.

The NR MACs 415 and 430 may be connected to several NR RLC layer devices configured in one UE, and the main functions of the NR MAC may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 420 and 425 channel-code and modulate upper layer data, make the obtained data into an OFDM symbol, and transmit the OFDM symbol through a radio channel, or demodulate the OFDM symbol received through the radio channel, and channel decode the demodulated OFDM symbol, and transmit the obtained data to the upper layer.

Figure 5A:
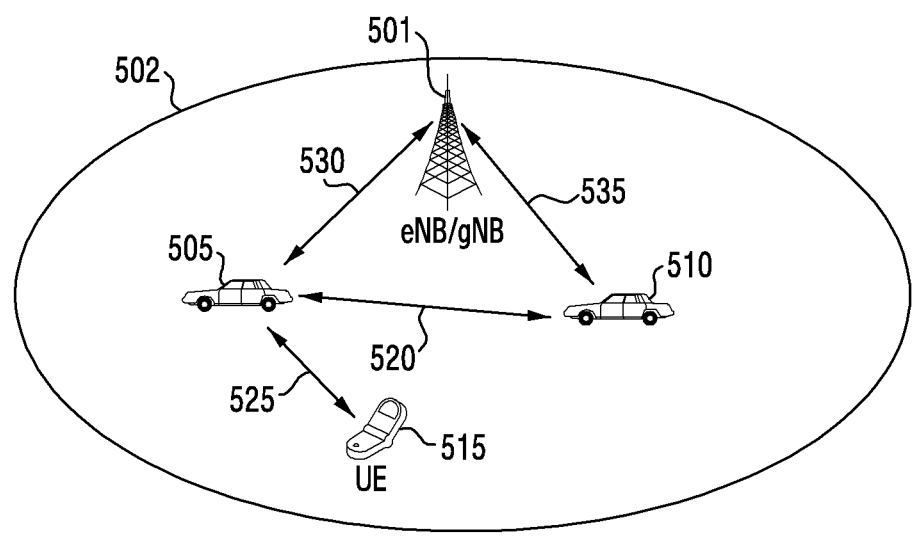
FIGS. 5A to 5C illustrate an example of vehicle-to-everything (V2X) communication in a wireless communication system according to various embodiments of the disclosure.
Figure 5B:
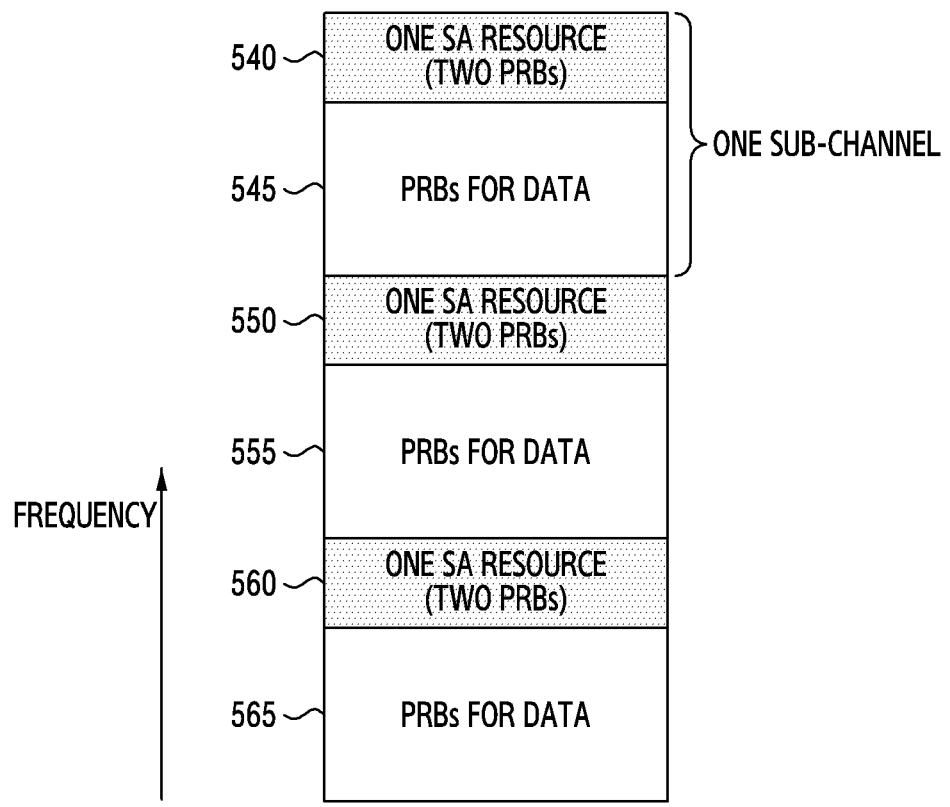
Figure 5C:
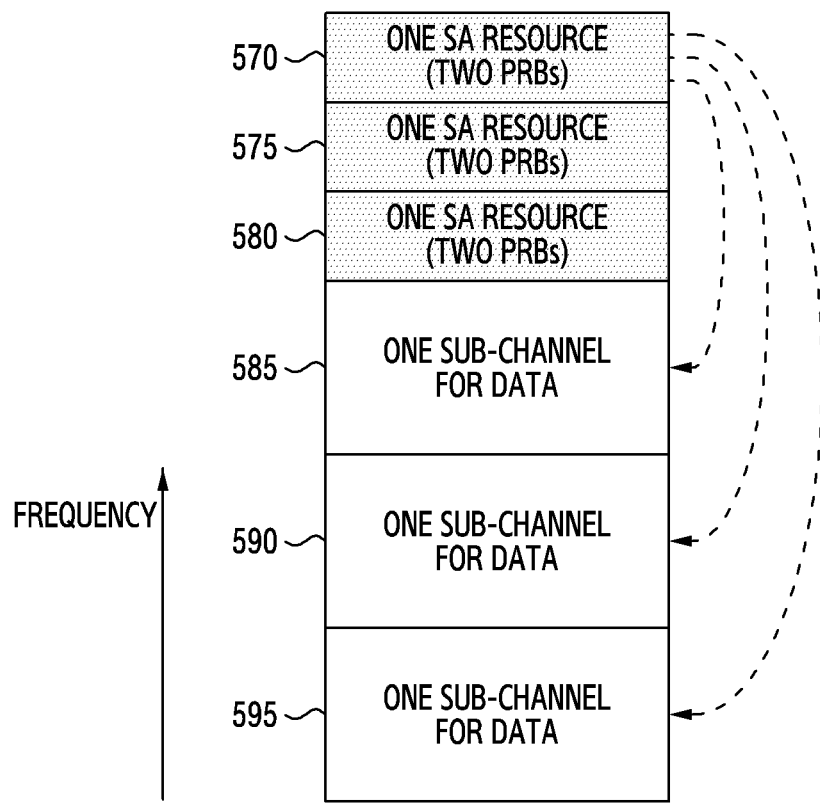

FIGS. 5A to 5C illustrate an example of vehicle-to-everything (V2X) communication in a wireless communication system according to various embodiments of the disclosure. Specifically, FIGS. 5A to 5C are diagrams illustrating V2X communication within a cellular system referred to in the disclosure.

V2X is a collective term for communication technology through vehicles and all interfaces, and depending on components including the form and communication thereof, there are vehicle-to-vehicle (V2V), vehicle-to-infrastructure (V2I), vehicle-to-pedestrian (V2P), vehicle-to-network (V2N), etc. V2P and V2V basically follow the structure and operation principle of Rel-13 device-to-device (D2D). That is, an actual data packet is transmitted and received through a sidelink (a sidelink, which is based on a PC5 operation and is a transmission channel between terminals, not the uplink and downlink of a base station and a terminal). This basic concept can be applied not only to V2X defined in LTE, but also to V2X that can be newly defined in NR, and upgrades for specific scenarios can be applied.

Referring to FIG. 5A, a base station 501 includes at least one vehicle UE 505 and 510 and a pedestrian UE 515 which are located in a cell 502 supporting V2X. That is, the vehicle UE 505 performs cellular communication using the base station 501 and links (Uu) 530 and 535 between the vehicle UE and the base station, and performs communication between devices using sidelinks (PC5) 520 and 525 between another vehicle UE 510 or the pedestrian UE 515. In the above, the base station may be a gNB or an upgraded eNB that supports NR. In order for the vehicle UEs 505 and 510 and the pedestrian UE 515 to directly exchange information using the sidelinks 520 and 525, the eNB must allocate a resource pool that can be used for sidelink communication. In the following description, a method for a UE to allocate resources to an eNB in V2X of an LTE system will be described in detail, and a similar approach as in LTE can be applied to V2X introduced in the NR system. However, in NR, a different numerology is used, and the design of a sidelink resource pool may vary to some extent.

According to the method for the eNB to allocate resources to the UE based on the V2X of the LTE system, corresponding resource allocation can be divided into two types: scheduled resource allocation (mode 3) and UE autonomous resource allocation (mode 4). In the case of the above scheduled resource allocation, the eNB allocates resources used for sidelink transmission to RRC-connected UEs in a dedicated scheduling scheme. The above method is effective for interference management and resource pool management (dynamic allocation, semi-persistence transmission) because the eNB can manage the resources of the sidelink. In addition, in the case of the scheduled resource allocation (mode 3) in which the eNB allocates and manages resources for V2X, an RRC-connected UE may transmit, when there is data to be transmitted to other UEs, the data to the eNB using an RRC message or an MAC control element (hereinafter, referred to as "CE"). Here, as the RRC message, a SidelinkUEInformation or UEAssistanceInformation message may be used. Meanwhile, the MAC CE may be, for example, a buffer status report MAC CE of a new format (including an indicator indicating a buffer status report for at least V2X communication and information on the size of data buffered for sidelink communication). Detailed format and contents of the buffer status report used by 3GPP refer to 3GPP standard TS36.321 "E-UTRA MAC Protocol Specification". On the other hand, in the UE autonomous resource allocation, the eNB provides a sidelink transmission/reception resource pool for V2X as system information, and the UE selects a resource pool according to a predetermined rule. The resource selection method may include zone mapping, sensing-based resource selection, random selection, and the like.

Referring to FIG. 5B, in the structure of the resource pool for V2X, resources 540, 550, and 560 for scheduling allocation (SA) and resources 545, 555, and 565 for data transmission are adjacent to each other to configure one subchannel.

In addition, referring to FIG. 5C, the structure of the resource pool for V2X may be used in a manner in which resources for SAs 570, 575 and 580 and data 585, 590, and 595 are not adjacent. Regardless of which of the above two structures is used, the SA is composed of two consecutive PRBs and includes content indicating the location of a resource for data. The number of UEs receiving a V2X service in one cell may be a large number, and the relationship between the eNB 501 and the UEs 505, 510, and 515 described above can be extended and applied.

In addition, in order to transmit and receive sidelink data through the resource pool, V2X of the LTE system basically classifies a V2X service through a Destination Layer2 ID (or destination ID). That is, a Source/Destination Layer2 ID (each 24 bit size) of a UE is included in the header of a V2X data packet transmitted through the sidelink, that is, the header of an MAC PDU, the Source Layer2 ID refers to a unique identifier of the UE, and the Destination Layer2 ID indicates the service type of V2X data traffic transmitted by the UE. If another UE that has received the Destination Layer2 ID sent by a transmitting UE is configured to be subscribed to and receive a service for the corresponding Destination Layer2 ID, the data packet belonging to the corresponding MAC PDU is decoded and transmitted to the upper layer. Mapping information on the Destination Layer2

ID and the V2X data packet is transmitted from a V2X server to a V2X control function, and is provided to the UE.

FIGS. 6A to 6G illustrate an example of a resource pool design and characteristics in a frequency domain for a V2X system in a wireless communication system according to various embodiments of the disclosure. Specifically, FIGS. 6A to 6G are diagrams illustrating design and characteristics of a resource pool in a frequency domain for a V2X system in a next-generation mobile communication system proposed in the disclosure.

Basically, an NR system has characteristics in a frequency domain different from that of an LTE system. In the LTE system, the system bandwidth in one cell has a fixed value of up to 20M Byte, whereas in the NR system, the system bandwidth in one cell may support 100M Byte or 400M Byte at high frequency. To this end, since there is a hardware difficulty in basically covering a wide frequency band by all UEs, a concept of a bandwidth part (hereinafter, referred to as "BWP") was introduced, so that a plurality of BWPs configured in various sizes of band widths in one cell are supported and a corresponding system is allowed to operate in a specific BWP. In addition, unlike LTE, the data structure and transmission are supported by various sub-carrier spacings (SCSs), so additional SCSs such as 30, 60, and 120 are supported in addition to a 15 kHz (30 kHz in an extended version also exists, but the basic is 15 kHz) SCS in LTE. The characteristics in the frequency domain in the NR system can be applied as it is to the principle of designing V2X. First, a V2X transmission/reception resource pool configured in an NR V2X system can use uplink transmission resources, so that a specific resource area within an uplink BWP can be allocated and used. That is, the eNB may configure some resources to an NR V2X transmission resource pool transmitted to the SL within the uplink BWP configuration supported by the corresponding cell, and the configured resource pool may be transmitted as system information dedicated to NR V2X. The system information may basically include a bandwidth location, SCS, and cyclic prefix information (normal or extended) including a corresponding transmission resource pool. Alternatively, the identifier of the uplink BWP to which the corresponding transmission resource pool belongs may be transmitted. In relation to the BWP, an additional operation may be required for a specific situation according to the RF capability of the UE. In the case of an idle or inactive UE, a paging message is received from the eNB. At this time, a PDCCH is monitored for a predetermined paging occasion specific to the UE, and a problem may occur when only one RF chain required for the UE to receive the SL exists. When a serving cell in which NR V2X is configured is a time division multiplexing (TDD) configuration, paging is received in a downlink slot, and V2X transmission and reception is performed in an uplink slot configured as a sidelink. However, when a serving cell in which NR V2X is configured is frequency division multiplexing (FDD), since the downlink BWP and the uplink BWP may be configured at different frequencies, a switching operation between the uplink BWP and the downlink BWP is required in order for the corresponding UE to receive paging. In this case, it is suggested to operate in one of the following two methods.

1. An NR V2X UE always monitors an initial DL BWP (initial uplink BWP) for paging and RACH operations, and when the corresponding operation occurs, the paging and RACH operations are prioritized rather than SL transmission, and BWP switching is performed through Uu.

2. A network transmits a paging message through an SL PDU in a specific resource existing in the uplink BWP. Alternatively, a specific slot of the uplink BWP is configured or pre-configured, and reserved as a slot for transmission to the V2X UE. At this time, the transmitted paging may be paging for only NR V2X and may be an indication in the form of a short message (i.e., the paging purpose is included through a few bits.)

605 to 630 of FIGS. 6A to 6F indicate design directions in the frequency domain that a resource pool in NR V2X can have. As described above, transmission resource pools 640, 645, 655, and 660 in the NR V2X use some of the uplink resources, which may be configured in a specific part of the uplink BWP.

Figure 6A:
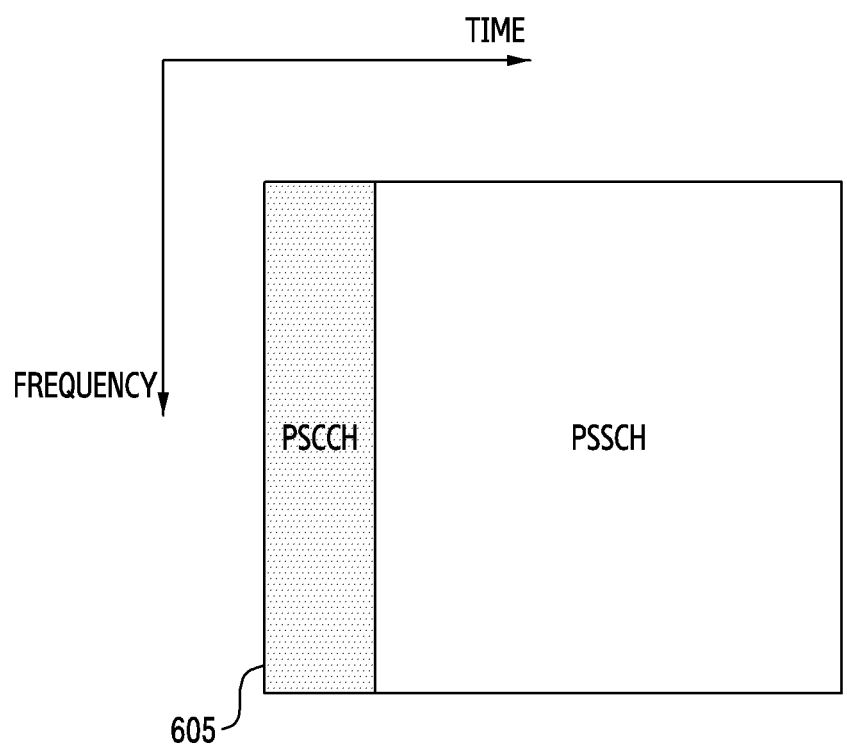
FIGS. 6A to 6G illustrate an example of design and characteristics of a resource pool in a frequency domain for a V2X system in a wireless communication system according to various embodiments of the disclosure.
Figure 6B:
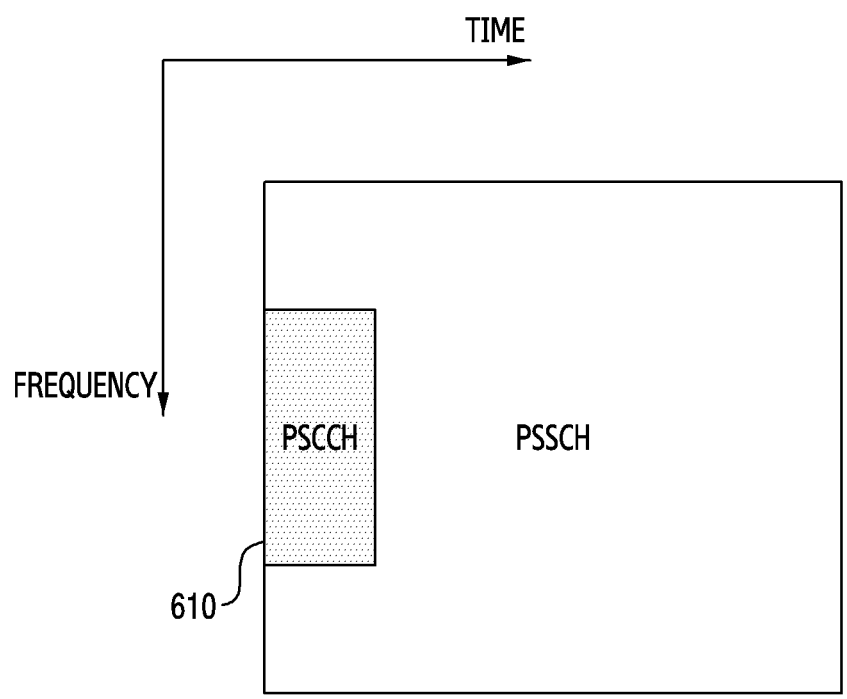
Figure 6C:
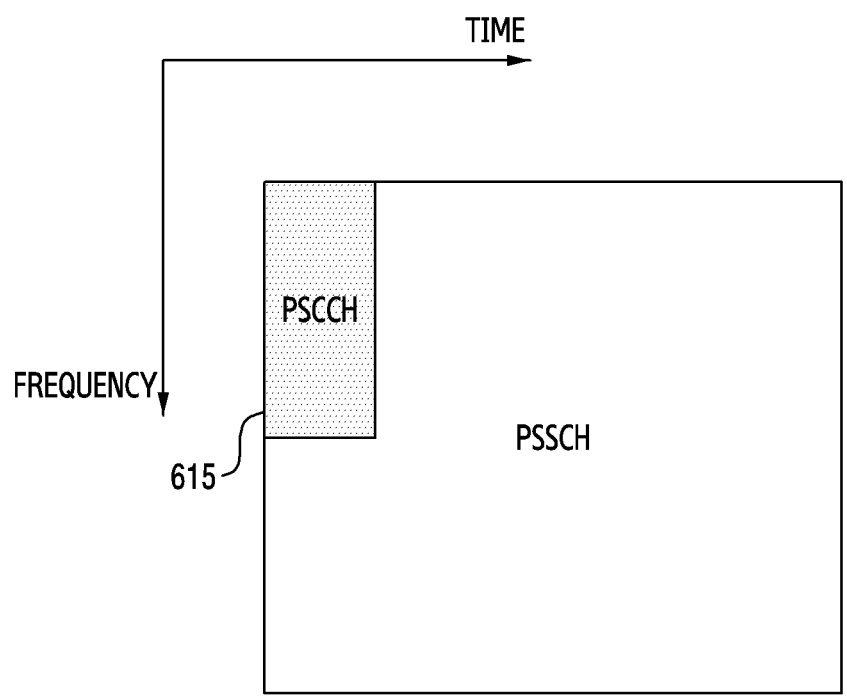
Figure 6D:
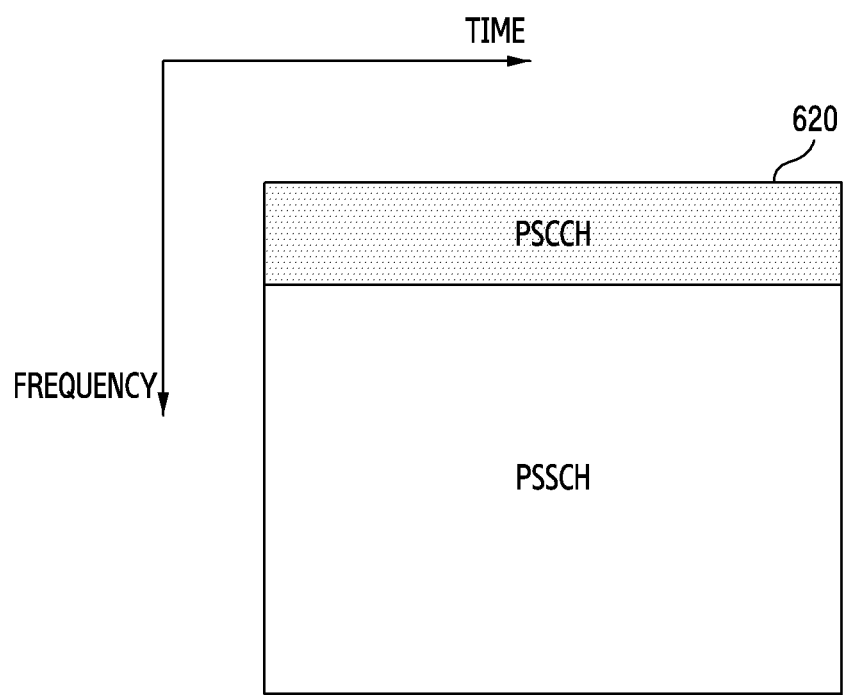
Figure 6E:
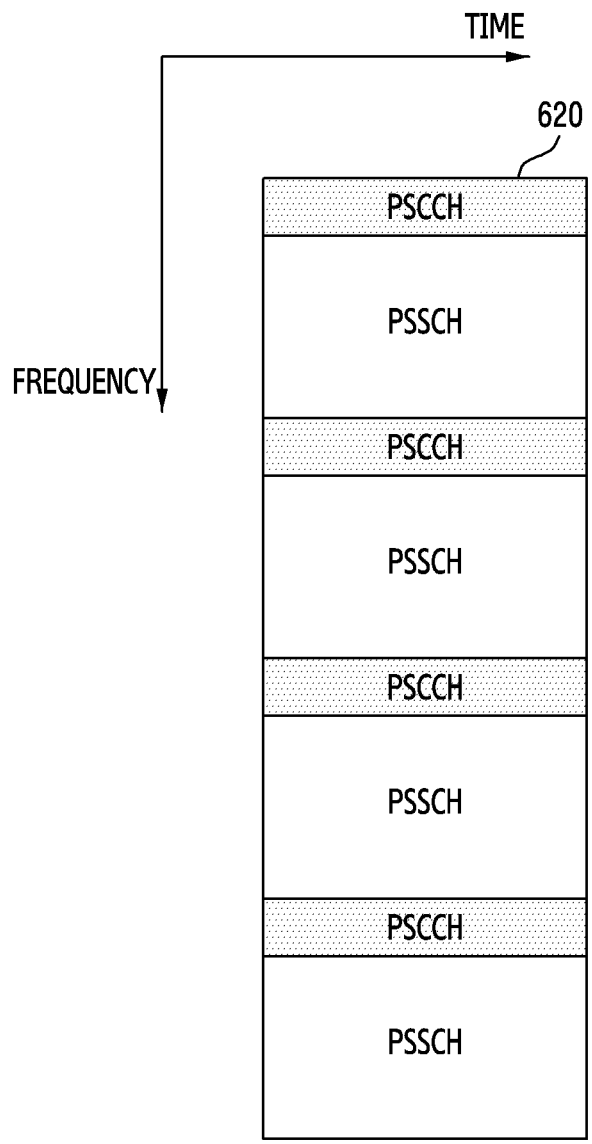
Figure 6F:
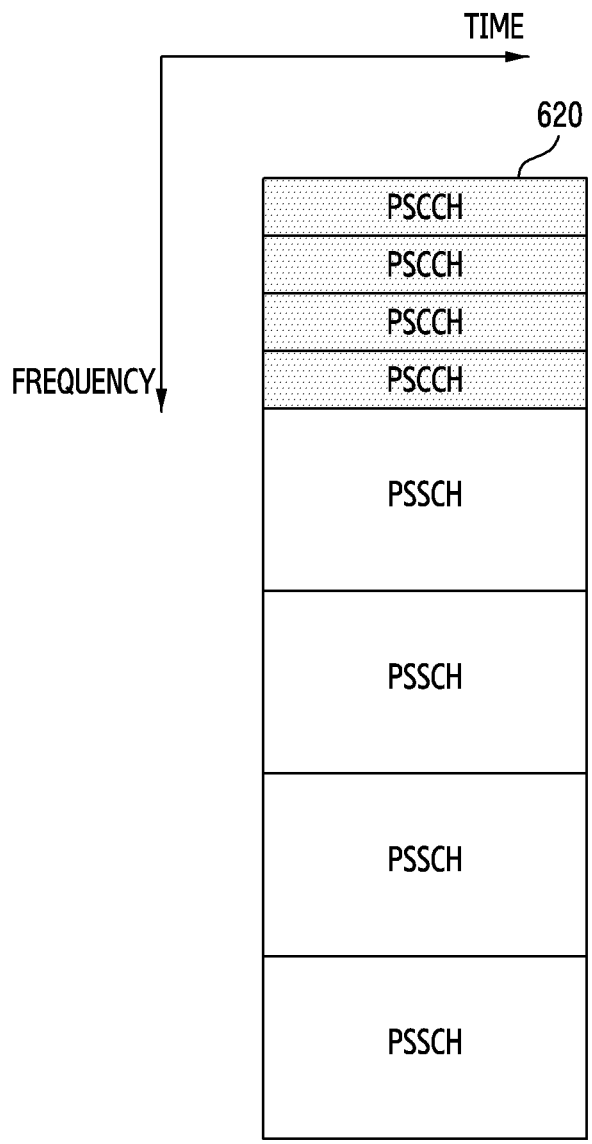
Figure 6G:
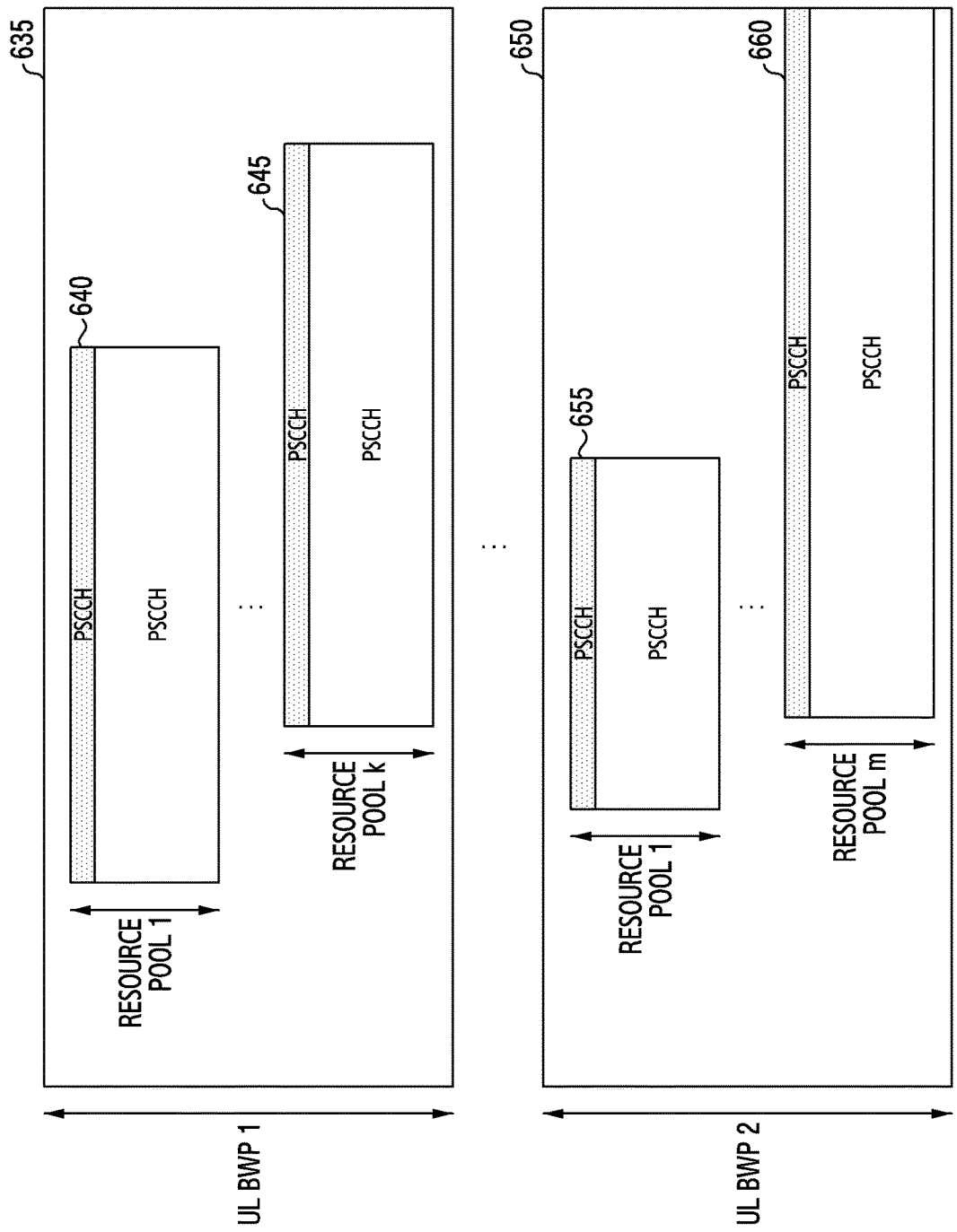

Referring to FIG. 6G, one or a plurality of the corresponding resource pools 640, 645, 655, and 660 may exist in the uplink BWPs 635 and 650, and may exist for all of the plurality of uplink BWPs 635 and 650 or only in some of the uplink BWPs 635 and 650. In 605, an area (physical sidelink control channel, PSCCH) to which a control signal of the NR V2X transmission resource pool is transmitted exists in front of an area (physical sidelink shared channel, PSSCH) to which data is transmitted for the frequency domain of the entire resource pool. In 610 and 615, the area (PSCCH) to which the control signal of the NR V2X transmission resource pool is transmitted exists in front of the area (PSSCH) in which data is transmitted for some frequency domains of the entire resource pool. In 620, the area (PSCCH) to which the control signal of the NR V2X transmission resource pool is transmitted is separated by a specific size in the frequency domain from the area (PSSCH) to which data is transmitted, and co-exists in the time domain with respect to the area (PSSCH). 625 and 630 are concepts obtained by extending the model in 620, and in 625 and 630, a structure in which the PSCCH and the PSSCH continuously share resources in the time domain and are separated in the frequency domain is possible. The difference is that a plurality of sub-channels exist in the corresponding resource pool by applying the concept of sub-channels. Here, the sub-channel is composed of a pair of PSCCH and PSSCH, and depending on the configuration method, one PSCCH-PSSCH pair is repetitively configured as illustrated in 625, or the PSCCH is continuously present in the frequency domain and the corresponding PSSCH is subsequently configured in the frequency domain.

Figure 7A:
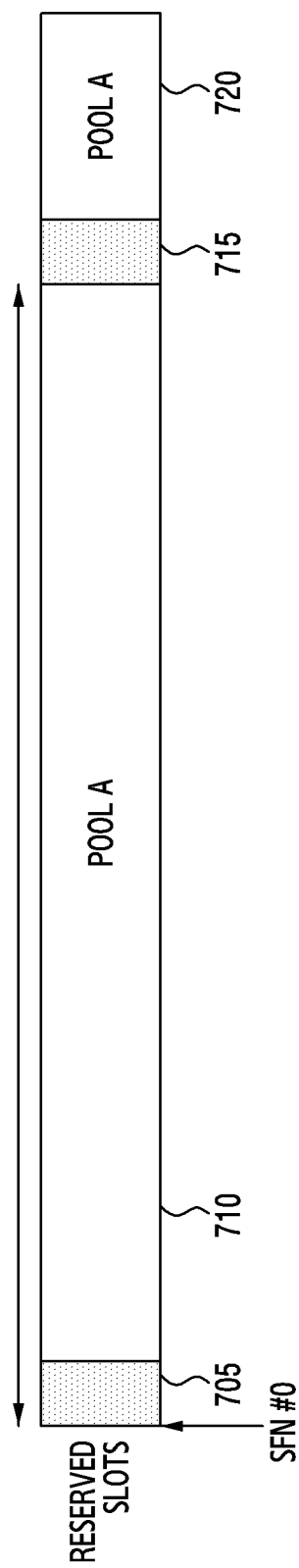
FIGS. 7A to 7C illustrate an example of design and characteristics of a resource pool in a time domain for a V2X system in a wireless communication system according to various embodiments of the disclosure.
Figure 7B:
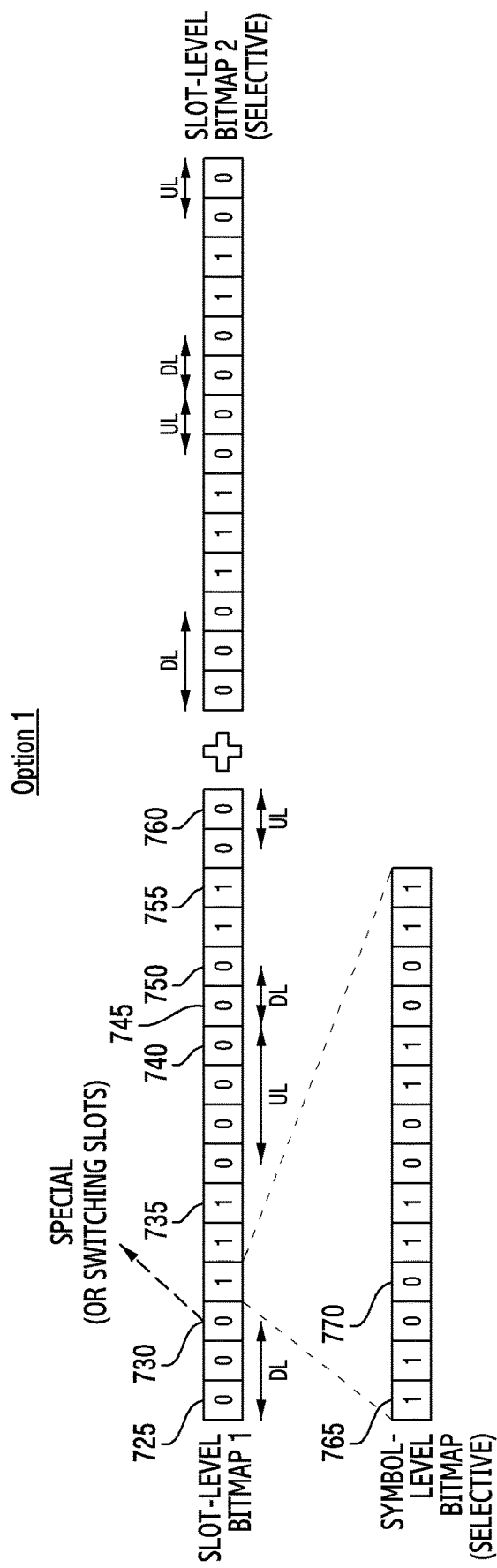
Figure 7C:
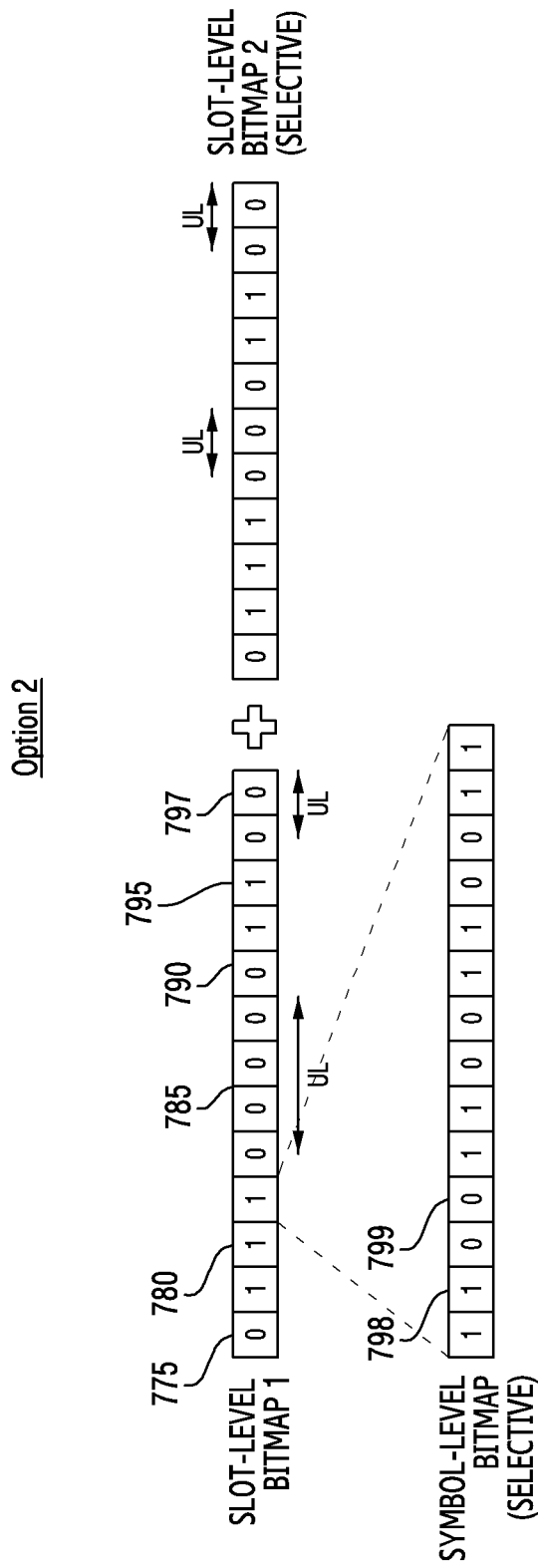

FIGS. 7A to 7C illustrate an example of design and characteristics of a resource pool in a time domain for a V2X system in a wireless communication system according to various embodiments of the disclosure. Specifically, FIGS. 7A to 7C are diagrams illustrating design and characteristics of a resource pool in a time domain for a V2X system in a next-generation mobile communication system proposed in the disclosure.

Basically, unlike the LTE system, in an NR system, the minimum unit in the time domain is a slot and symbol unit, not a subframe. Even in an LTE system, a symbol existed as a unit through which physical signals are transmitted, but a subframe is used as a scheduling unit through which data packets are transmitted, which is extended up to the minimum symbol unit in NR. In order to reflect this characteristic of the NR system, a method of configuring an NR V2X transmission resource pool should also be able to configure the NR V2X transmission resource pool in units of slots or symbols, unlike that configured in units of subframes in the sidelink of the existing LTE.

Therefore, in the disclosure, an area that can be used as sidelink transmission resource pools 710 and 720 in the time domain is configured as a bitmap, and precisely, a method of configuring the area using a slot-level bitmap and a symbol-level bitmap is proposed. In addition, this configuration can be said to have a greater effect on cells operating in TDD than FDD. An eNB should basically configure a time domain resource of the NR V2X resource pool configured in the uplink BWP so as not to overlap a downlink resource and a resource for sidelink synchronization.

Therefore, referring to FIG. 7A, when the NR V2X resource pools 710 and 720 are expressed as the bitmap, the above-described resource should be configured to "0". In addition, when the bitmap size configured according to the entire system frame number (SFN) and the start offset of the transmission pool is applied, a case where the entire slot cannot be covered completely occurs and in order to solve this problem, in LTE, the remaining resource areas in a specific time domain are defined as reserved resources 705 and 715, and are not used for sidelink transmission. Even in the NR V2X transmission resource pools 710 and 720, the above principle may be applied as it is, and the transmission resources 705 and 715 that remain according to the bitmap size and the start offset may not be used as sidelink resources, or the transmission slot and symbols 705 and 715 that remain in the existing bitmap may be continuously applied. In this case, the configured bitmap can be applied to the remaining slots from the front until there are no remaining slots. In this case, there is an advantage in that resources can be used more efficiently.

The above-described slot-level bitmap and symbol-level bitmap serve to explicitly inform the resource in the time domain that NR V2X can use in the sidelink. Basically, the resource pool in V2X allocates the entire area in which sidelink communication is possible in the frequency-time domain, and a UE may autonomously select the transmission resource within the corresponding resource pool or an eNB may explicitly allocate the transmission resource among the resources within the corresponding resource pool. To this end, it is essential to first configure the transmission resource pool capable of sidelink transmission. In the disclosure, the slot and symbol-level bitmap for configuration in the time domain of the NR V2X transmission resource pool is defined in the following two ways.

Option 1: explicitly provide a bitmap indicating which slot and symbol are configured as the resource pool with respect to all slots and symbols present in the SFN, Option 2: explicitly provide a bitmap indicating which slot and symbol are configured as the resource pool with respect to slots and symbols excluding slots allocated as downlink in all SFNs (This is because the UE already knows where the downlink slot is in the corresponding serving cell through a TDD UL-DL pattern provided in SIB1, so it is sufficient to indicate which slot can be allocated to the NR V2X resource pool only for the uplink slot and the flexible slot, through which signaling can be efficiently performed.)

Referring to Option 1 in detail, when NR V2X resource pool configuration information is provided in system information providing NR V2X-related configuration, bitmap information in the time domain of the resource pool is also provided. As for the bitmap information, a slot-level bitmap 1 is mandatory, and a slot-level bitmap 2 may be additionally configured. The slot-level bitmap 1 covers all slots in the time domain and continuously exists in the SFN, and period and bitmap information for bitmap configuration may exist as an example as shown in Table 1 below.

TABLE 1

| BitmapOfSlot-SL::= | CHOICE { |
|---|---|
| Bitmap-slot10 (10)), | BIT STRING (SIZE |
| Bitmap-slot16 (16)), | BIT STRING (SIZE |
| Bitmap-slot20 (20)), | BIT STRING (SIZE |
| Bitmap-slot30 (30)), | BIT STRING (SIZE |
| Bitmap-slot40 (40)), | BIT STRING (SIZE |
| Bitmap-slot50 (50)), | BIT STRING (SIZE |
| Bitmap-slot60 (60)), | BIT STRING (SIZE |
| Bitmap-slot100 (100)) } | BIT STRING (SIZE |

In Table 1, # of Bitmap-slot# means the length of the bitmap, and if # is 16, it means that the bitmap is composed of 16 bits. When "1" is configured in each bitmap, it means a slot that can be configured as the NR V2X resource pool. In addition, BitmapOfSlot-SL IE may be configured for each of various SCSs, provided as BitmapOfSlot15KHZ-SL and BitmapOfSlot30KHZ-SL information to include the bitmap configuration, and may be selected according to the SCS to which the corresponding resource pool is applied. If the corresponding SCS information is separately configured together with the BWP information, it may be omitted.

Referring to FIG. 7B, Option 1 of the embodiment illustrates a case in which a slot-level bitmap 1 having a length of 16 bits is configured, and this bitmap indicates whether to use the NR V2X resource pool for all slots continuously present in all SFNs.

725 and 745 are parts allocated as downlink slots, and the eNB should always set the bitmap to "0" for these parts. 730 and 750 are switching slots in which downlink and flexible resources (or uplink resources) coexist, and are referred to as special slots in the disclosure. This corresponds to a case in which some symbols in one slot are configured as downlink symbols, and some of the remaining slots are configured as flexible resources and uplink resources. In the case of this special slot, the eNB can always determine whether to configure the special slot to "0" or both "0" and "1". If the corresponding slot is configured to "1", the symbol used for downlink in the corresponding slot should always be configured to "0" in the symbol-level bitmap. 735 and 755 correspond to flexible slots, and 740 and 760 correspond to uplink slots. The eNB can configure the NR V2X resource pool for the slot in which the corresponding resource is configured according to the eNB internal resource management rule, and if necessary, the corresponding slot can be configured as the V2X resource pool by configuring it to "1".

If period information configured in the slot-level bitmap 1 does not match the actual resource pool design and a user desires to design the period information in a slightly additional pattern, the slot-level bitmap 2 can be added as the option. In this case, the slot-level bitmap 2 is applied subsequent to the slot-level bitmap 1, and a continuous pattern of the two bitmaps is repeated over the entire SFN. A method of configuring the overall bitmap follows the procedure described in slot-level bitmap 1.

In addition, a bitmap indicating whether to use the NR V2X resource pool of all symbols in the corresponding slot applied to bitmaps configured to "1" in the slot-level bitmap is also required. Symbol-level bitmaps 765 and 770 are applied as options, and if there is no symbol-level bitmap, all symbols in the slot-level bitmap are configured as the NR V2X resource pool. That is, it is the same as a case where all symbols of the symbol-level bitmap are configured to 1. This may be determined in units of symbols according to resource management of the eNB. The size of the symbol-level bitmap may be determined according to whether an extended cyclic prefix (extended CP) is used in the corresponding serving cell, and is fixed to 14 bits in an unused normal mode. If the extended CP is used, the size of the symbol-level bitmap may be configured to 12 bits.

TABLE 2

| | |
|---|---|
| BitmpOfSymbol-SL::= | CHOICE { |
| Bitmap-sym12 | BIT STRING (SIZE (12)), |
| Bitmap-sym14 | BIT STRING (SIZE (14)), |
| } | |

Referring to FIG. 7C, in Option 2 of the present embodiment, a difference from the case in which the slot-level bitmap 1 having a length of 16 bits shown in Option 1 is configured will be described, and a case where the length of the entire bitmap can be changed will be described. In Option 2, not all slots for all SFNs are covered with a bitmap, but slots excluding slots allocated as downlink resources among all slots are configured as candidates for bitmap configuration. In this case, since the downlink slot configured in option 1 can be excluded from the bitmap, by using 13 bits for the slot-level bitmap 1 and 11 bits for the slot-level bitmap 2, a bitmap consisting of 16 bits and 14 bits, which is a total of 30 bits in the previous option 1, can be configured with a total of 24 bits, thereby reducing 6 bits of signaling. There is no performance deterioration because the number and area of all slots actually covered are the same. In addition, it is possible to configure whether to apply the special slot, and if the eNB determines not to always use the NR V2X for the corresponding slot, the corresponding slot can also be excluded from the candidate bitmap. However, if it is determined to use a part of the corresponding slot as the NR V2X resource pool or if the special slot is configured to "1" as described in option 1 above, a symbol used as a downlink in a corresponding slot should always be configured to "0" in the symbol-level bitmap.

In addition, a bitmap indicating whether to use the NR V2X resource pool of all symbols in the corresponding slot applied to the bitmaps configured to "1" in the slot-level bitmap is also required. The symbol-level bitmap is applied as an option, and if there is no symbol-level bitmap, all symbols in the slot level bitmap are configured as the NR V2X resource pool. That is, it is the same as the case where all symbols of the symbol level bitmap are configured to "1". This may be determined in units of symbols according to resource management of the eNB. The size of the symbol-level bitmap may be determined according to whether an extended CP is used in the corresponding serving cell, and is fixed to 14 bits in the unused normal mode. If the extended CP is used, the size of the symbol-level bitmap may be configured to 12 bits.

Figure 8:
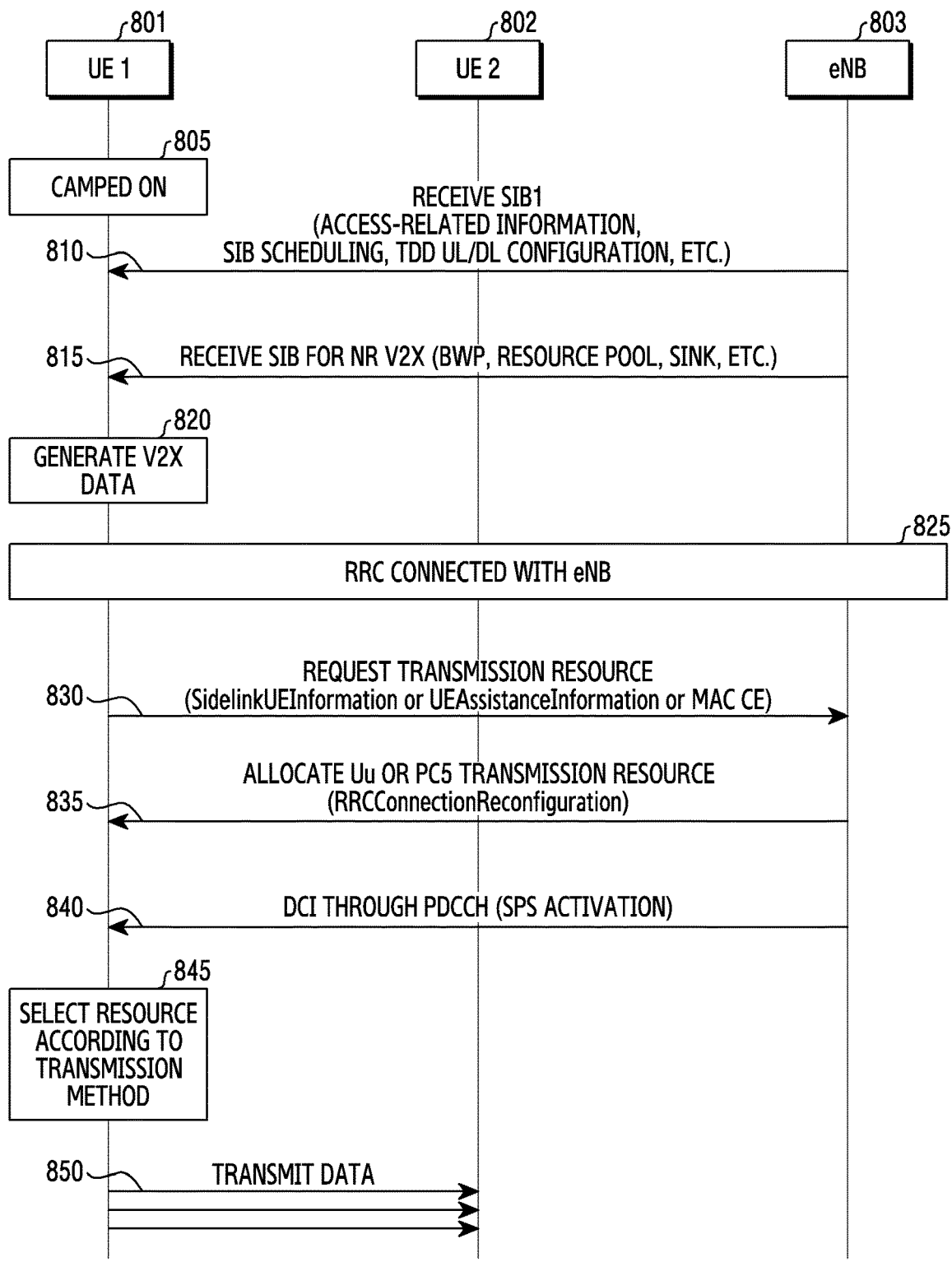
FIG. 8 illustrates an example of a data transmission procedure of a new radio (NR) V2X terminal operating in a base station scheduling mode (mode 1) in a wireless communication system according to various embodiments of the disclosure.

FIG. 8 illustrates an example of a data transmission procedure of a new radio (NR) V2X terminal operating in a base station scheduling mode (mode 1) in a wireless communication system according to various embodiments of the disclosure. Specifically, FIG. 8 is a diagram illustrating a data transmission procedure of an NR V2X UE operating in an eNB scheduling mode (mode 1) in an NR system applied to the disclosure.

Referring to FIG. 8, a UE 1 801 that is camped on in 805 receives SIB1 in 810, which is basic information for accessing a corresponding serving cell from an eNB 803, and then receives system information (SIB for NR V2X) for NR V2X in 815. The SIB1 includes cell access-related information, scheduling information of other system information, and TDD UL/DL configuration of a corresponding serving cell, and the NR V2X system information includes resource pool information for sidelink data transmission and reception, configuration information for sensing operation, information for configuring synchronization, information for inter-frequency transmission and reception, and the like. The resource pool information includes information for configuring a resource pool in the frequency-time domain proposed in the disclosure. In addition, since even in the RRC connected state and IDLE state, the UE should be able to operate even if the UE receives only system information, the system information related to V2X should be provided in the basically supported eNB and cell without a request from the UE.

When data traffic for V2X is generated in the UE 1 801 in 820, RRC connection with the eNB is performed in 825. The RRC connection process may be performed before the data traffic is generated in 820. The UE 1 801 requests a transmission resource capable of V2X communication with another UE 802 from the eNB 830. At this time, the request is made from the eNB by using an RRC message or an MAC CE. Here, as the RRC message, SidelinkUEInformation and UEAssistanceInformation messages may be used. Meanwhile, the MAC CE may be, for example, a buffer status report MAC CE of a new format (including an indicator indicating a buffer status report for at least V2X communication and information on the size of data buffered for sidelink communication). The eNB 803 allocates a V2X transmission resource to the UE 1 801 through a dedicated RRC message in 835. This message can be included in the RRCConnectionReconfiguration message. The resource allocation may be a V2X resource through Uu or a resource for PC5 according to the type of traffic requested by the UE or whether the corresponding link is congested. For the determination, the UE adds and sends proSe per packet priority (PPPP) and proSe per packet reliability (PPPR) or logical channel identifier (LCID) information of V2X traffic through UEAssistanceInformation or MAC CE. Since the eNB also knows information on resources used by other UEs, the eNB schedules a resource requested by the UE 1 among the remaining resources. In addition, when the RRC message includes SPS configuration information through Uu, the SPS may be activated through DCI transmission through the PDCCH in 840. The UE 1 801 selects a transmission link and a resource according to the resource allocated from the eNB 803 and a transmission method in 845, and transmits data to the UE 802 in 850.

Figure 9:
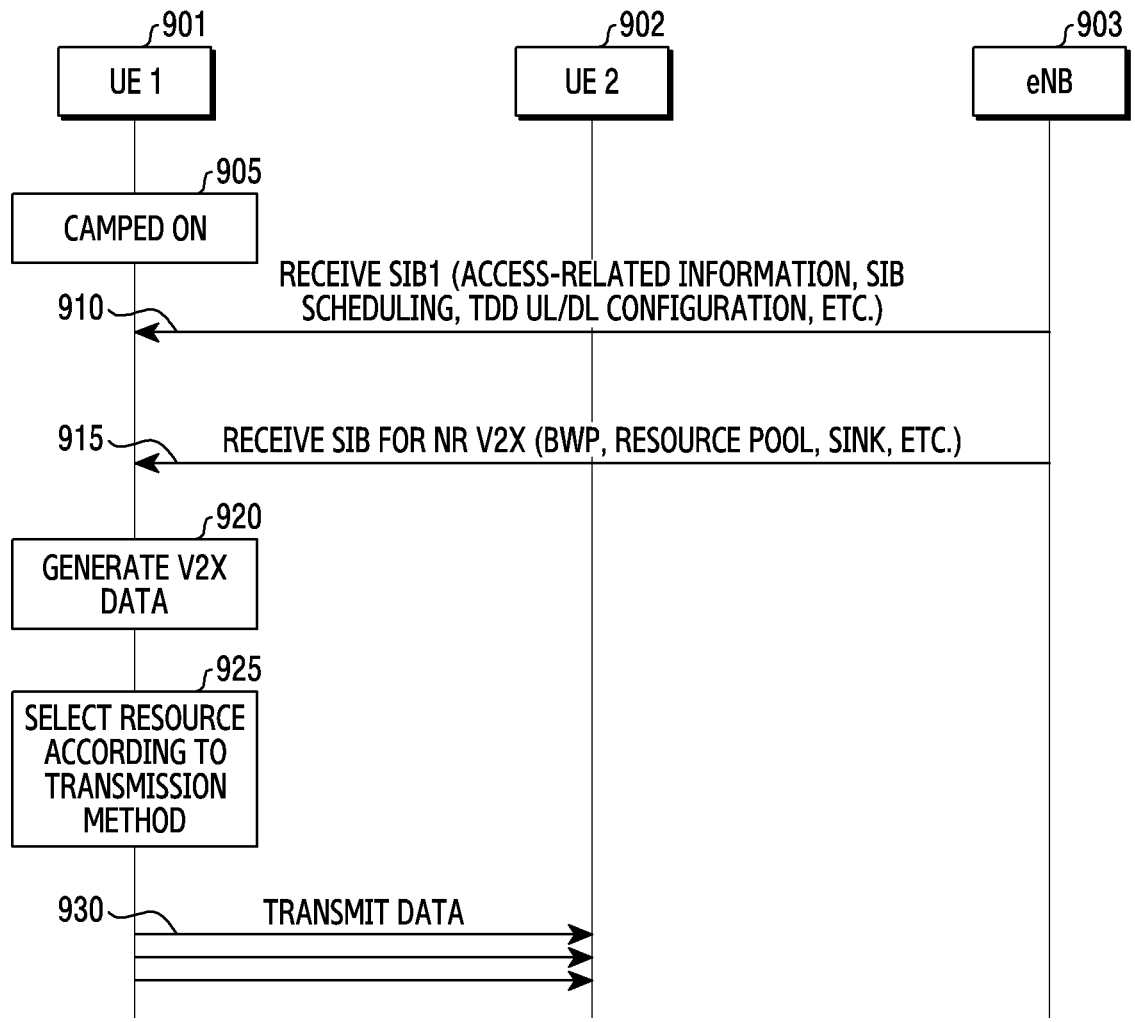
FIG. 9 illustrates an example of a data transmission procedure of an NR V2X terminal operating in a terminal autonomous resource selection mode (mode 2) in a wireless communication system according to various embodiments of the disclosure.

FIG. 9 illustrates an example of a data transmission procedure of an NR V2X terminal operating in a terminal autonomous resource selection mode (mode 2) in a wireless communication system according to various embodiments of the disclosure. Specifically, FIG. 9 is a diagram illustrating a data transmission procedure of an NR V2X UE operating in a UE autonomous resource selection mode (mode 2) in an NR system applied to the disclosure.

Unlike an eNB scheduling mode in which an eNB 903 is directly involved in resource allocation, a UE autonomous resource selection mode (mode 2) operation differs in that a UE 1 901 autonomously selects a resource and transmits data based on a resource pool previously received through system information. In V2X communication, the eNB 903 allocates several types of sidelink resource pools (V2V resource pool and V2P resource pool) for the UE 1 901. The resource pool is composed of a resource pool in which the UE can autonomously select an available resource pool after sensing resources used by other UEs around the UE, and a resource pool in which the UE randomly selects a resource from a predetermined resource pool.

Referring to FIG. 9, the UE 1 901 that is camped on in 905 receives SIB1, which is basic information for accessing a corresponding serving cell, from the eNB 903, and then receives system information for NR V2X (SIB for NR V2X) in 915. The SIB1 includes cell access related information, scheduling information of other system information, TDD UL/DL configuration of a corresponding serving cell, and the like. The NR V2X system information may include resource pool information for sidelink data transmission/reception, configuration information for sensing operation, information for configuring synchronization, information for inter-frequency transmission and reception, and the like. The resource pool information includes information for configuring a resource pool in the frequency-time domain proposed in the disclosure.

In addition, since even in the RRC connected state and IDLE state, the UE should be able to operate even if the UE receives only system information, the system information related to V2X should be provided in the basically supported eNB and cell without a request from the UE.

When data traffic for V2X is generated in the UE 1 901 in 915, the UE 1 901 selects a resource in 925 in the time/frequency domain according to a configured transmission operation (e.g., dynamic allocation one-time transmission, dynamic allocation multiple transmission, sensing-based one-time transmission, sensing-based multiple transmission, or random transmission) from the resource pool received from the eNB 903 through system information, and transmits data to another UE 902 in 930. In general, since a V2X service is implemented for the purpose of periodically transmitting location information of safety-related UEs, in sensing-based multi-transmission in mode 2 operation, the UE senses resources transmitted by other UEs, selects a transmittable resource block from the resource pool in which the corresponding transmission is performed, and then reserves future resources so that they can be transmitted periodically. Next, if the data packet generated by the UE is changed or disappears, a new data packet can be delivered by restarting or canceling the above sensing and resource reservation operation. As described above, the multi-transmission based on the sensing and resource reservation may be basically operated, and if the sensing operation is not well performed, communication may be performed through random resource selection from a corresponding resource pool.

In FIGS. 8 and 9, the configuration of sidelink data transmission and reception and the overall operation in the NR V2X system have been described, and packet design in the user plane for the actually transmitted data packet, radio bearer configuration, and encryption method have been briefly described in FIG. 1E or some of them has been omitted.

Figure 10:
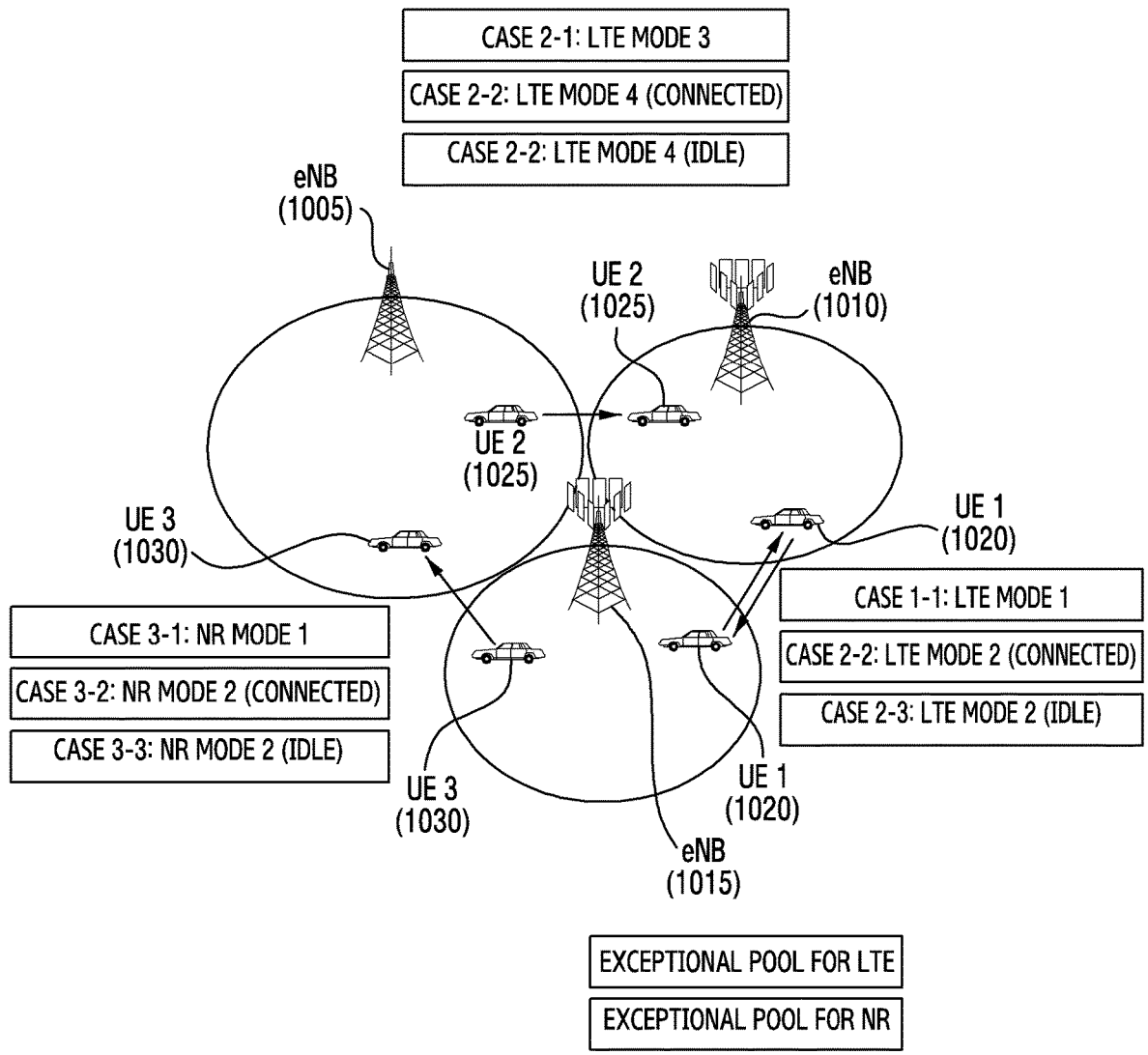
FIG. 10 illustrates an example of a mobility scenario in a wireless communication system according to various embodiments of the disclosure.

FIG. 10 illustrates an example of a mobility scenario in a wireless communication system according to various embodiments of the disclosure. Specifically, FIG. 10 is a diagram illustrating a scenario for mobility in an NR V2X system considered in the disclosure.

Basically, V2X supported by an NR system may be designed to follow the frame structure and numerology of the NR system, which will be structurally different from the V2X defined in the LTE system. As an example, the structure of an LTE V2X resource pool will have a structure different from the resource pool to be designed in NR V2X. In an eNB and a UE that support only LTE V2X without supporting NR, it is difficult to support communication with an NR V2X UE and service continuity of NR V2X because there is no configuration information on the NR V2X resource pool. In this disclosure, a method of supporting a V2X service when LTE and NR serving cells exist and a UE moves a corresponding serving cell will be described.

For a scenario in which multiple LTE serving cells 1001 and NR serving cells 1002 and 1003 are mixed, the UE can move in a connected state and move in an idle state, and movement between different radio access types or radio access technologies (RATs) should also be considered. In the disclosure, a scenario is configured to consider mobility in NR and LTE V2X as follows.

1. Scenario 1: Movement between NR serving cells
   1-A. Case 1-1: Movement of NR mode 1 UE in connected state
   1-B. Case 1-2: Movement of NR mode 2 UE in connected state
   1-C. Case 1-3: Movement of NR mode 2 UE in IDLE state
2. Scenario 2: Movement from LTE serving cell to NR serving cell
   2-A. Case 2-1: Movement of LTE mode 3 UE in connected state
   2-B. Case 2-2: Movement of LTE mode 3 UE in connected state
   2-C. Case 2-3: Movement of LTE mode 4 UE in idle state
3. Scenario 3: Movement from NR serving cell to LTE serving cell
   3-A. Case 3-1: Movement of NR mode 1 UE in connected state
   3-B. Case 3-2: Movement of NR mode 2 UE in connected state
   3-C. Case 3-3: Movement of NR mode 2 UE in idle state In later embodiments of the disclosure, a method of supporting mobility in the scenario and case will be described in detail.

Figure 11:
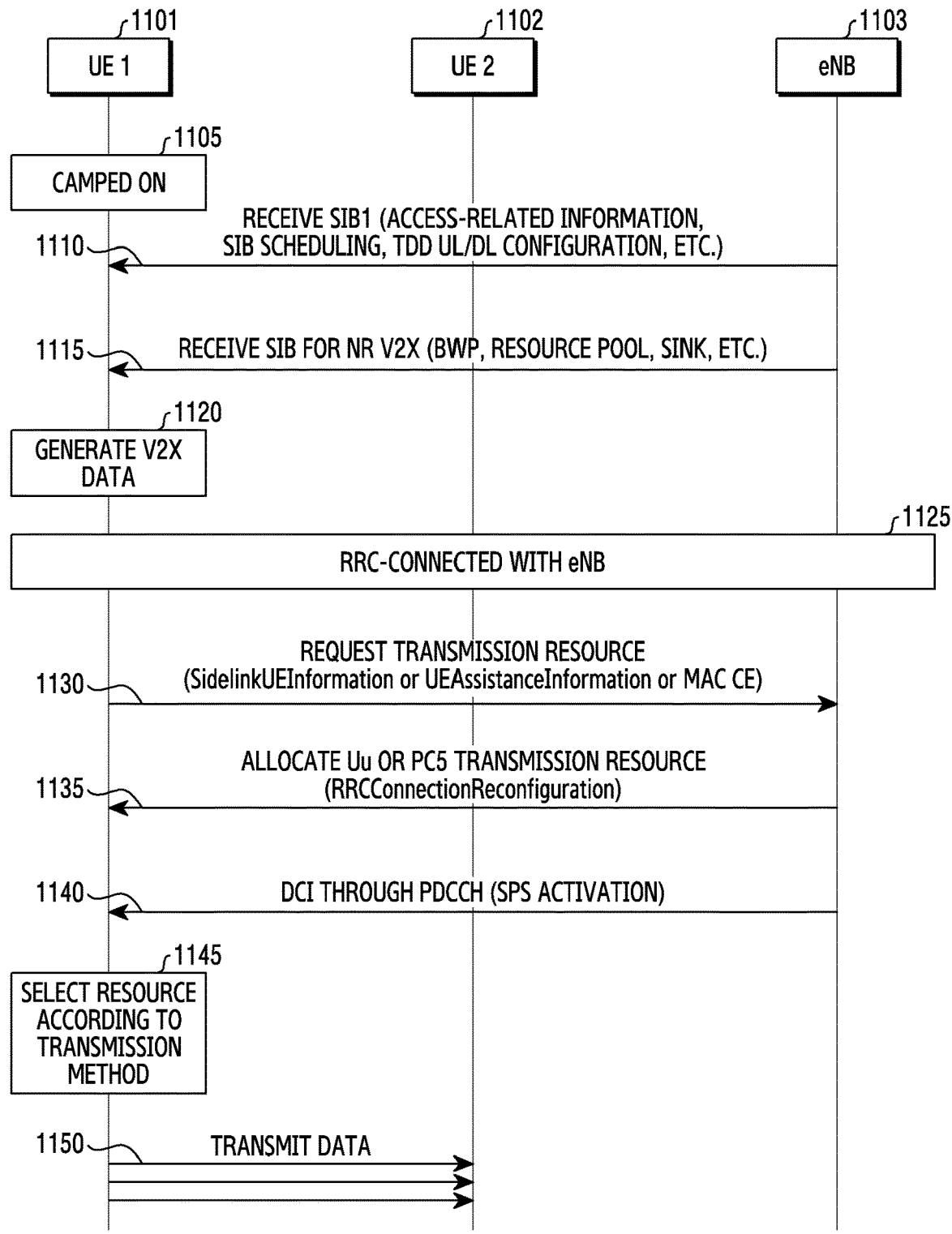
FIG. 11 illustrates an example of a data transmission procedure of an NR V2X terminal operating in a base station scheduling mode (NR mode 1) in a wireless communication system according to various embodiments of the disclosure.

FIG. 11 illustrates an example of a data transmission procedure of an NR V2X terminal operating in a base station scheduling mode (NR mode 1) in a wireless communication system according to various embodiments of the disclosure. Specifically, FIG. 11 is a diagram illustrating a data transmission procedure of an NR V2X UE operating in an eNB scheduling mode (NR mode 1) in an NR system applied to the disclosure.

Referring to FIG. 11, a UE 1 1101 that is camped on in 1105 receives SIB1, which is basic information for accessing a corresponding serving cell, from an eNB 1103, and then receives system information for NR V2X (SIB for NR V2X) in 1115. The SIB1 includes cell access related information, scheduling information of other system information, TDD UL/DL configuration of a corresponding serving cell, and the like. The NR V2X system information may include resource pool information for sidelink data transmission/reception, configuration information for sensing operation, information for configuring synchronization, information for inter-frequency transmission and reception, and the like.

In addition, since even in the RRC connected state and IDLE state, the UE should be able to operate even if the UE receives only system information, the system information related to V2X should be provided in the basically supported eNB and cell without a request from the UE.

When data traffic for V2X is generated in the UE 1 1101 in 1120, RRC connection with the eNB is performed in 1125. The RRC connection process may be performed before the data traffic is generated in 1120. The UE 1 1101 requests a transmission resource capable of V2X communication with another UE 1102 from the eNB 1130. At this time, the request is made from the eNB by using an RRC message or an MAC CE. Here, as the RRC message, SidelinkUEInformation and UEAssistanceInformation messages may be used. Meanwhile, the MAC CE may be, for example, a buffer status report MAC CE of a new format (including an indicator indicating a buffer status report for at least V2X communication and information on the size of data buffered for sidelink communication). The eNB 1103 allocates a V2X transmission resource to the UE 1 1101 through a dedicated RRC message in 1135. This message can be included in the RRCConnectionReconfiguration message. The resource allocation may be a V2X resource through Uu or a resource for PC5 according to the type of traffic requested by the UE or whether the corresponding link is congested. For the determination, the UE adds and sends proSe per packet priority (PPPP) and proSe per packet reliability (PPPR) or logical channel identifier (LCID) information of V2X traffic through UEAssistanceInformation or MAC CE. Since the eNB also knows information on resources used by other UEs, the eNB schedules a resource requested by the UE 1 among the remaining resources. In addition, when the RRC message includes SPS configuration information through Uu, the SPS may be activated through DCI transmission through the PDCCH in 1140. The UE 1 1101 selects a transmission link and a resource according to the resource allocated from the eNB 1103 and a transmission method in 1145, and transmits data to the UE 1102 in 1150.

Figure 12:
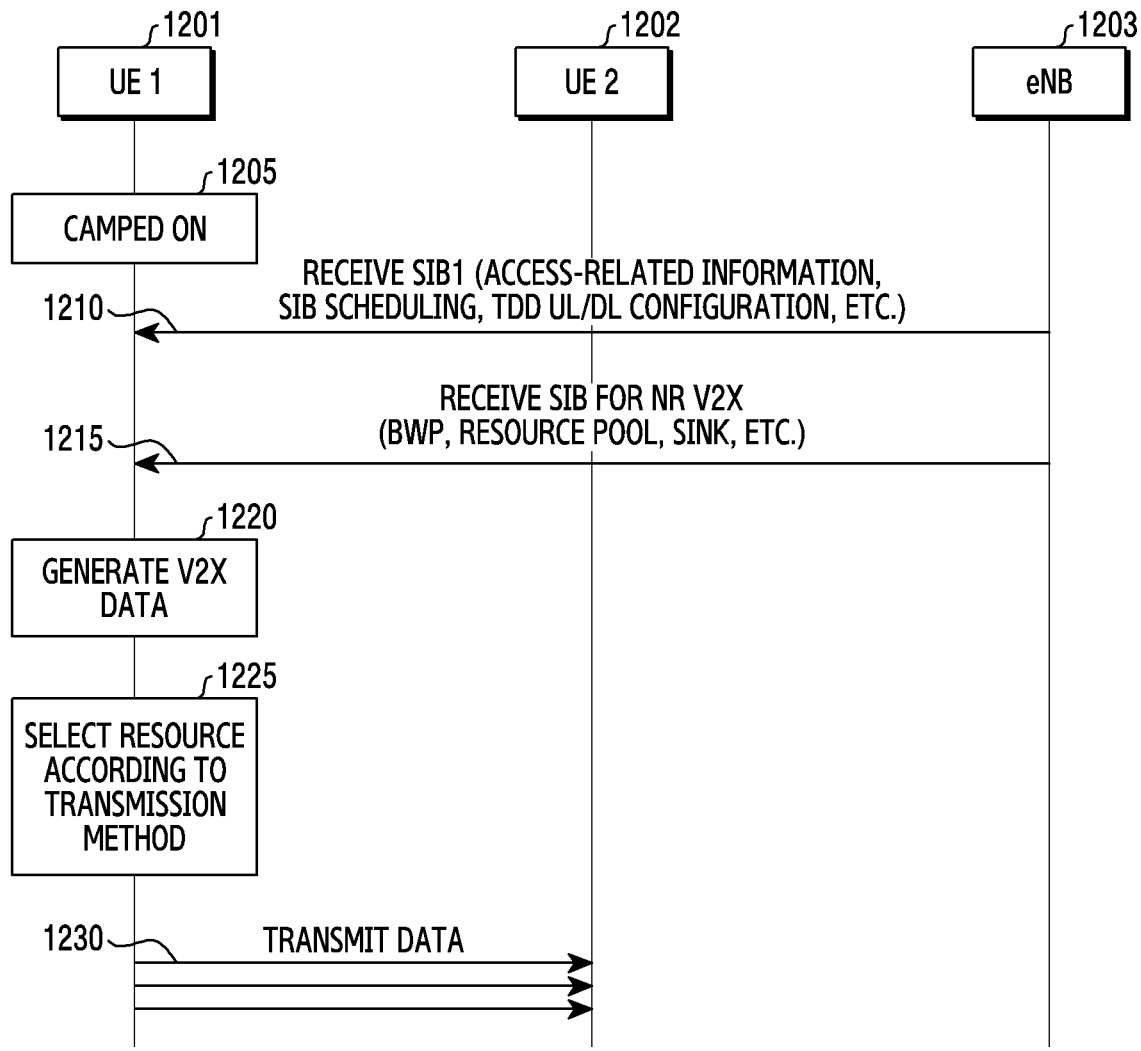
FIG. 12 illustrates an example of a data transmission procedure of an NR V2X terminal operating in a terminal autonomous resource selection mode (NR mode 2) in a wireless communication system according to various embodiments of the disclosure.

FIG. 12 illustrates an example of a data transmission procedure of an NR V2X terminal operating in a terminal autonomous resource selection mode (NR mode 2) in a wireless communication system according to various embodiments of the disclosure. Specifically, FIG. 12 is a diagram illustrating a data transmission procedure of an NR V2X UE operating in a UE autonomous resource selection mode (NR mode 2) in an NR system applied to the disclosure.

Unlike an eNB scheduling mode in which an eNB 1203 is directly involved in resource allocation, a UE autonomous resource selection mode (mode 2) operation differs in that a UE 1 1201 autonomously selects a resource and transmits data based on a resource pool previously received through system information. In V2X communication, the eNB 1203 allocates several types of sidelink resource pools (V2V resource pool and V2P resource pool) for the UE 1 1201. The resource pool is composed of a resource pool in which the UE can autonomously select an available resource pool after sensing resources used by other UEs around the UE, and a resource pool in which the UE randomly selects a resource from a predetermined resource pool.

Referring to FIG. 12, the UE 1 1201 that is camped on in 1205 receives SIB1, which is basic information for accessing a corresponding serving cell, from the eNB 1203, and then receives system information for NR V2X (SIB for NR V2X) in 1215. The SIB1 includes cell access related information, scheduling information of other system information, TDD UL/DL configuration of a corresponding serving cell, and the like. The NR V2X system information may include resource pool information for sidelink data transmission/reception, configuration information for sensing operation, information for configuring synchronization, information for inter-frequency transmission and reception, and the like. In addition, since even in the RRC connected state and IDLE state, the UE should be able to operate even if the UE receives only system information, the system information related to V2X should be provided in the basically supported eNB and cell without a request from the UE.

When data traffic for V2X is generated in the UE 1 1201 in 1215, the UE 1 1201 selects a resource in 1225 in the time/frequency domain according to a configured transmission operation (e.g., dynamic allocation one-time transmission, dynamic allocation multiple transmission, sensing-based one-time transmission, sensing-based multiple transmission, or random transmission) from the resource pool received from the eNB 1203 through system information, and transmits data to another UE 1202 in 1230. In general, since a V2X service is implemented for the purpose of periodically transmitting location information of safety-related UEs, in sensing-based multi-transmission in mode 2 operation, the UE senses resources transmitted by other UEs, selects a transmittable resource block from the resource pool in which the corresponding transmission is performed, and then reserves future resources so that they can be transmitted periodically. Next, if the data packet generated by the UE is changed or disappears, a new data packet can be delivered by restarting or canceling the above sensing and resource reservation operation. As described above, the multi-transmission based on the sensing and resource reservation may be basically operated, and if the sensing operation is not well performed, communication may be performed through random resource selection from a corresponding resource pool.

Figure 13:
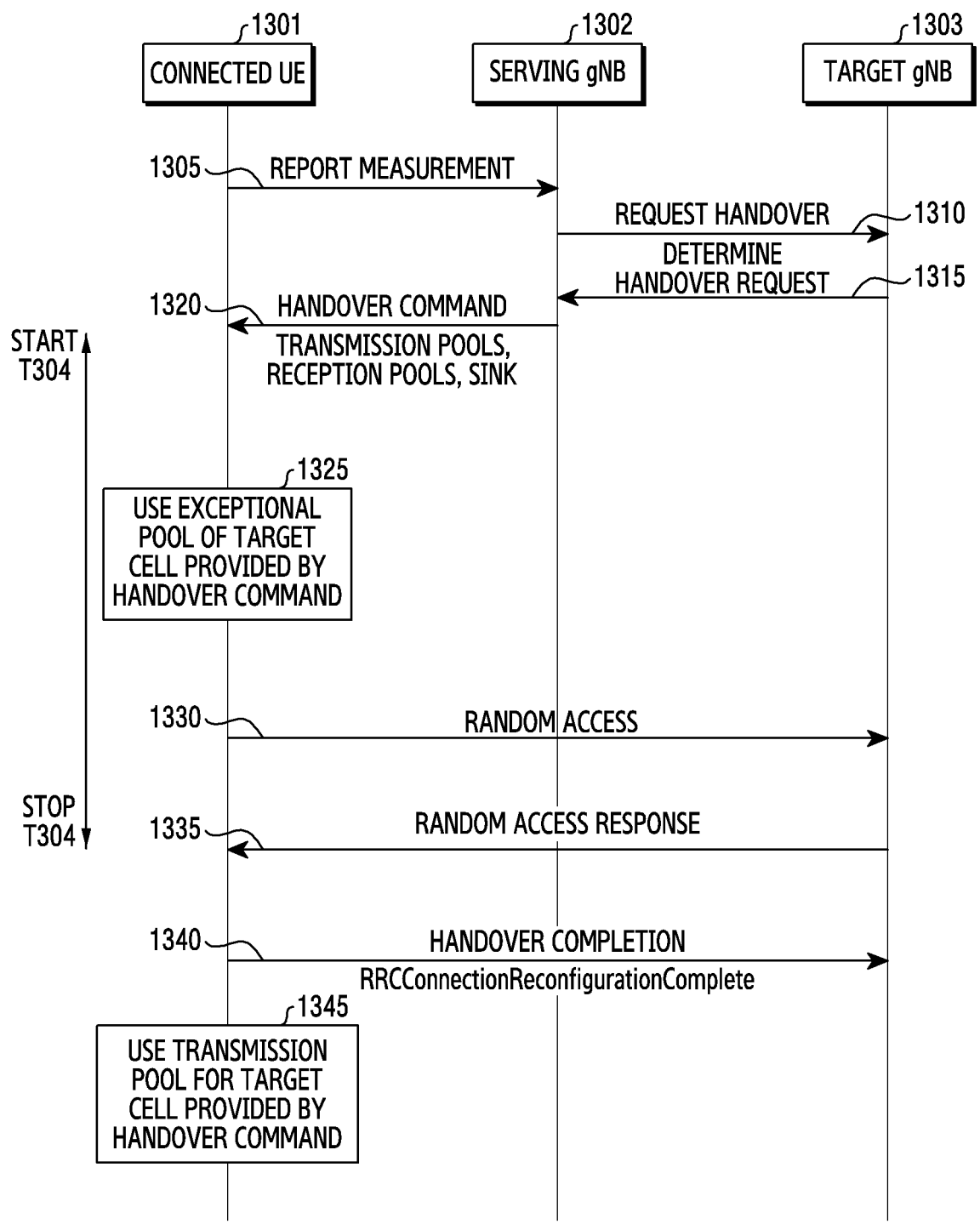
FIG. 13 illustrates an example of a method for supporting mobility between NR serving cells by a terminal in a connected state in a wireless communication system according to various embodiments of the disclosure.

FIG. 13 illustrates an example of a method for supporting mobility between NR serving cells by a terminal in a connected state in a wireless communication system according to various embodiments of the disclosure. Specifically, FIG. 13 is a diagram illustrating a method for a UE in a connected state to support mobility between NR serving cells as Embodiment 1 of the disclosure. This embodiment may correspond to Cases 1-1 and 1-2 of scenario 1 described above.

A UE 1301 in an RRC connected state performs a V2X operation (NR mode 1 or mode 2) in a connected state with a serving cell 1302 supporting NR V2X, and then reports the measurement result of the neighboring cells due to a channel change caused by mobility to the serving cell. The serving cell 1302 determines whether to perform handover based on a channel measurement value of the UE 1301, and transmits a handover request message to a target cell 1303 determined in 1310, preferentially considering the target cell 1303 supporting NR V2X as a handover target. In 1315, the target cell 1303 approves the handover of the corresponding UE, transmits a handover request response message, and transmits information necessary for handover to the target cell 1303 to the serving cell 1302. The information includes transmission/reception resource pool information in the target cell 1303, synchronization information, exceptional pool information, basic information required for cell access (e.g., random access resources), and the like. In 1320, the serving cell 1302 allows the information received from the target cell to be included in a handover command message and transmits the handover command message to the UE 1301.

If the UE 1301 was operating in the connected NR mode 1, the eNB 1302 explicitly instructs and uses a specific resource in the resource pool to the UE, so that two configurations are possible in order to ensure that the transmission has continuity even after handover.

1. For seamless transmission, scheduling information for resources available in the target cell 1303 is provided together so that the UE can apply the scheduling information after handover.

2. If handover is determined, the transmission pool of the target cell 1303 is applied to operate in NR mode 2 (mode 2) instead of NR mode 1 (mode 1) after handover.

Regardless of whether any one of the above two methods is determined, it is necessary to define what resources to perform transmission/reception through during the handover interruption time. If a method of reducing the handover interruption time is introduced even for sidelink transmission, it may not be necessary. However, assuming that an LTE V2X operation is basically followed, when receiving a handover request from the serving cell, the UE 1301 activates a T304 timer and at the same time performs NR V2X transmission for the transmission exceptional pool of the target cell 1303 received in the handover message. Here, the exceptional pool provided for NR V2X in the NR serving cell 1302 is a separate resource pool different from the exceptional pool provided by the LTE serving cell. Thereafter, when the handover procedure with the target cell 1303 is finished in 1330 to 1340 and scheduling resources received from the target cell 1303 are available, or NR mode 2 transmission is possible through the resource pool of the target cell 1303 (for example, if transmittable resources are secured as a result of sensing the transmission resource pool of the target cell 1303), the UE 1301 performs V2X communication through a specific resource of the corresponding resource pool.

Figure 14:
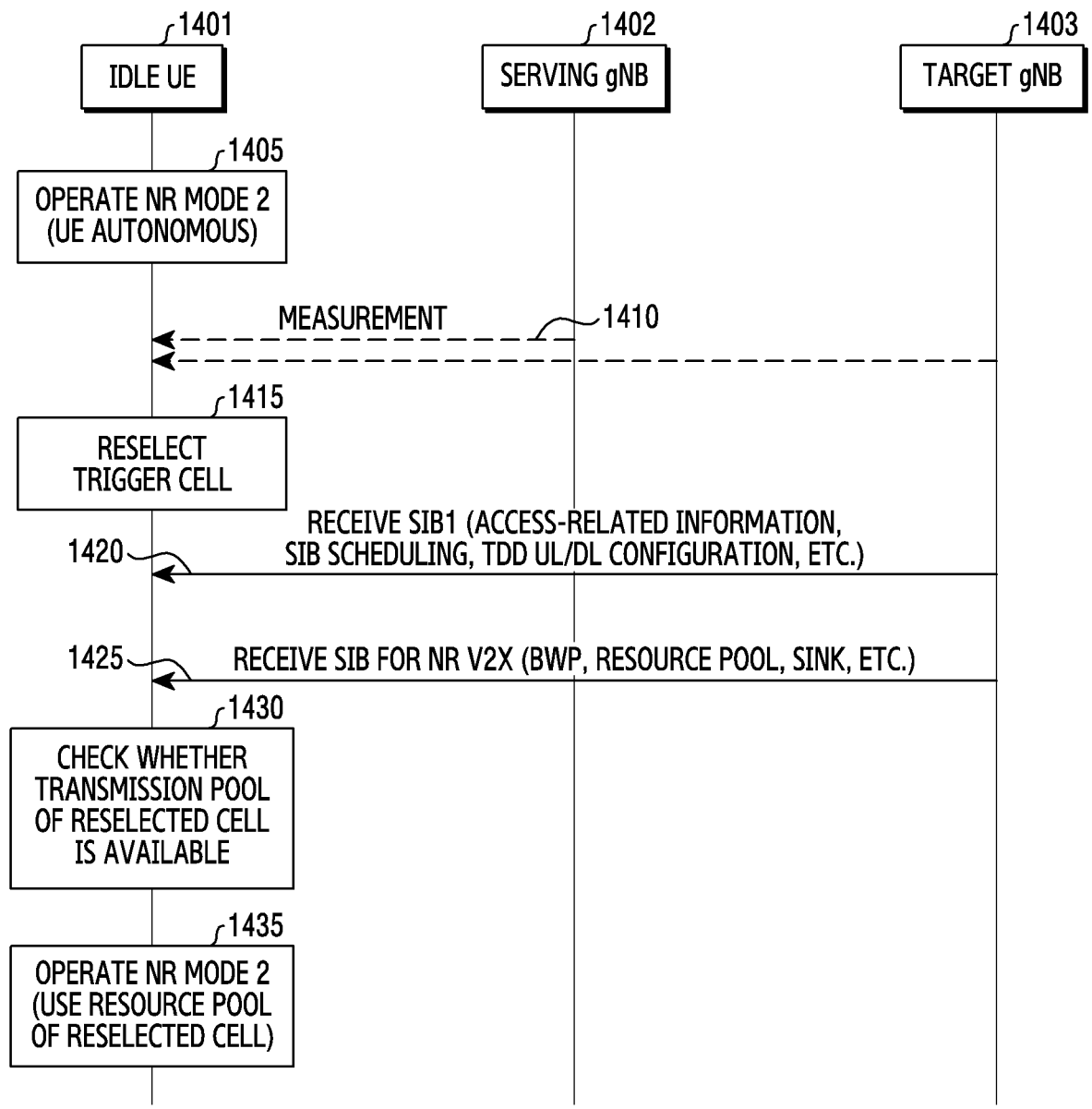
FIG. 14 illustrates an example of a method for supporting mobility between NR serving cells by a terminal in an idle state in a wireless communication system according to various embodiments of the disclosure.

FIG. 14 illustrates an example of a method for supporting mobility between NR serving cells by a terminal in an idle state in a wireless communication system according to various embodiments of the disclosure. Specifically, FIG. 14 is a diagram illustrating a method for a UE in an idle state of to support mobility between NR serving cells as Embodiment 2 of the disclosure. This embodiment may correspond to Cases 1-3 of scenario 1 described above.

In operation 1405, a UE 1401 in an idle state performs an NR mode 2 (mode 2) operation (a method for a UE to autonomously determine and transmit available resources from the transmission resource pool), and measures a channel from the current serving cell and neighboring cells. If the channel signal strength of the current serving cell 1402 is weak and the signal strength of the neighboring cell satisfies a condition for performing cell reselection, the UE performs a cell reselection operation to the neighboring cell 1403 in operation 1415. In performing the cell reselection operation, the UE 1401 may prioritize and search for a frequency and cell supporting NR V2X. Alternatively, cell reselection may be performed by configuring a frequency supporting LTE V2X to have the next priority or the same priority. This is to allow the UE 1401 performing V2X communication to obtain the maximum service continuity.

In operation 1420, after performing cell reselection, the UE 1401 receives SIB1 from the corresponding cell 1403, and when the UE is camped on, the UE 1401 receives the remaining system information from the camped-on cell 1403 in operation 1425. The SIB1 includes cell access-related information, scheduling information of other system information, and TDD UL/DL configuration of a corresponding serving cell, and the NR V2X system information includes resource pool information for sidelink data transmission and reception, configuration information for sensing operation, information for configuring synchronization, information for inter-frequency transmission and reception, and the like.

The UE 1401 that has performed cell reselection is required to determine what resource is used during an interruption time before receiving system information from the target cell 1403. This means that the UE must be able to quickly receive the system information for NR V2X from the target cell in order to reduce the interruption interval as much as possible in the implementation of the UE, and this interval is regarded as out of coverage (OOC) so that it is also possible to use pre-configured transmission resources. If there is a transmission resource pool applicable after receiving the system information in operation 1430, the UE uses an exceptional resource pool provided by the corresponding cell until V2X transmission through the corresponding resource is valid, and then performs sidelink transmission by applying a corresponding normal resource pool after the validity is determined (for example, a case in which the sensing result in the resource pool is valid so that the UE can transmit the sidelink to a specific resource) in operation 1435.

Figure 15:
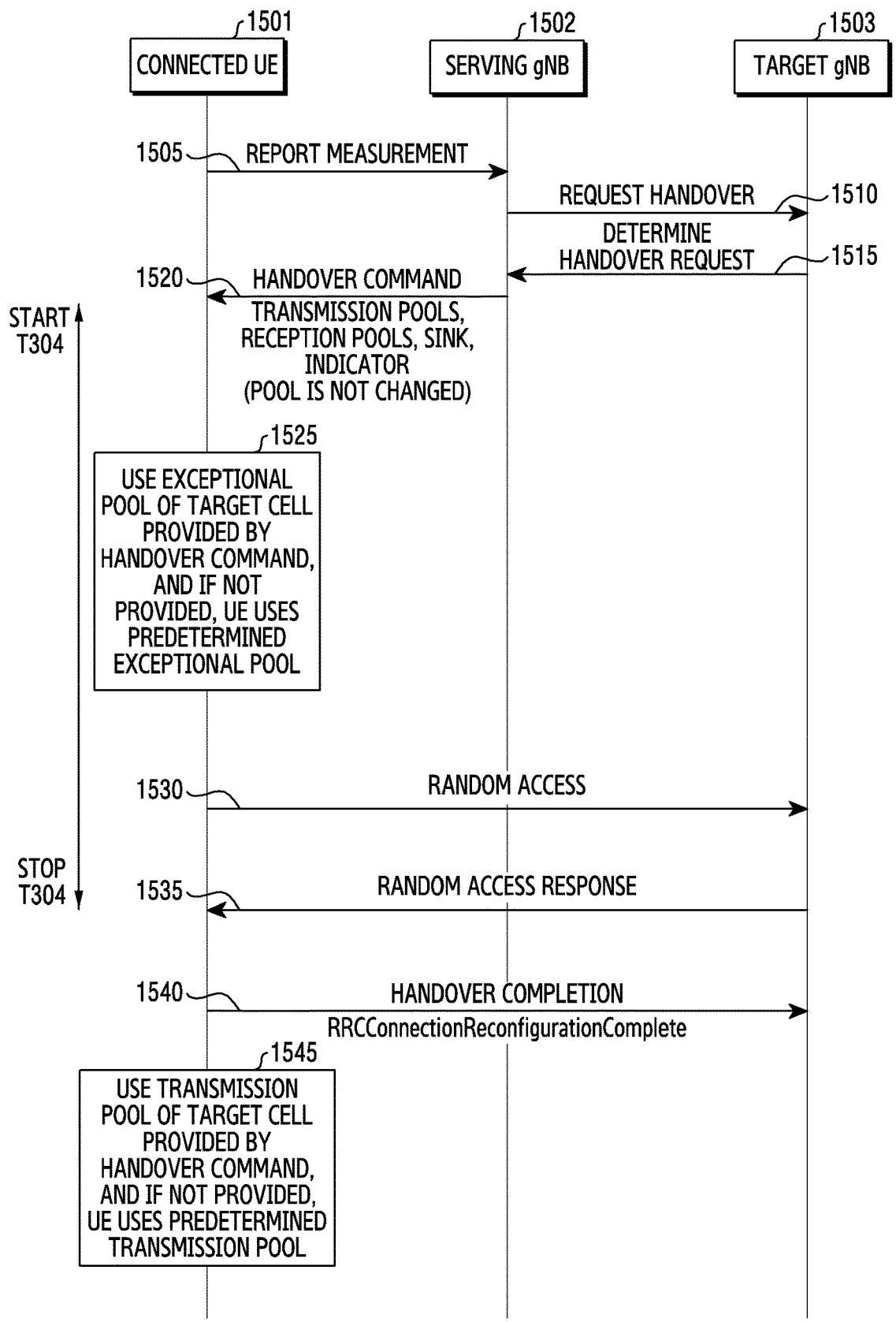
FIG. 15 illustrates an example of a method for supporting mobility from a long term evolution (LTE) serving cell to an NR serving cell by a terminal in a connected state in a wireless communication system according to various embodiments of the disclosure.

FIG. 15 illustrates an example of a method for supporting mobility from a long term evolution (LTE) serving cell to an NR serving cell by a terminal in a connected state in a wireless communication system according to various embodiments of the disclosure. Specifically, FIG. 15 is a diagram illustrating a method for a UE in a connected state to support mobility from an LTE serving cell to an NR serving cell as Embodiment 3 of the disclosure. This embodiment may correspond to Cases 2-1 and 2-2 of scenario 2 described above.

A UE 1501 in an RRC connected state performs a V2X operation (LTE mode 3 or mode 4) in a connected state with a serving cell 1502 supporting LTE V2X, and then may report the measurement result of neighboring cells due to a channel change caused by mobility to the serving cell in 1505. The LTE serving cell 1502 determines whether to perform handover based on a channel measurement value of the UE, and transmits, if there is a target cell 1503 supporting NR V2X in the vicinity, a handover request message to the target cell 1503 determined in 1510, considering the corresponding cell as a handover target. A cell providing the LTE V2X may have the highest priority, and may have the same priority if the NR V2X serving cell supports LTE V2X. In operation 1515, the target NR cell 1503 approves the handover of the corresponding UE, transmits a handover request response message, and transmits information necessary for handover to the target cell 1503 to the LTE serving cell 1502. The information includes transmission/reception resource pool information in the target cell 1503, synchronization information, exceptional pool information, basic information required for cell access (e.g., random access resources), and the like. In operation 1520, the UE allows the information transmitted from the target cell to be included in a handover command message to transmit the handover command message to the UE. In addition, when the NR V2X cell supports the LTE V2X service, LTE V2X resource pool configuration information supported by the corresponding target NR V2X cell is also included in the handover command message 1520 that transmits the corresponding handover request response message 1515 and the handover command message 1520 transmitted from the LTE serving cell to the UE. In the above operation, if the resource pool information provided by the LTE serving cell and the LTE V2X resource pool information provided by the NR serving cell are the same, an indicator indicating that there is no resource pool change will be included in the handover command message provided in operation 1520. The indicator may be one bit, and information corresponding to several bits may be provided. Alternatively, the resource pool can be transmitted in a delta signaling perspective. That is, the resource pool may be additionally provided only to parameters that differ from information of the previous serving cell, and information without any change is not signaled. For reference, this embodiment operates on the premise that service continuity of the LTE V2X operation performed in the previous LTE serving cell should be guaranteed even if a handover from an LTE cell to an NR cell occurs.

If the UE was operating in the connected LTE mode 3 (mode 3), the eNB explicitly instructs and uses a specific resource in the resource pool to the UE, so that two configurations are possible in order to ensure that the transmission has continuity even after handover.

1. For seamless transmission, scheduling information for resources available in the target cell is provided together so that the UE can apply the scheduling information after handover.

2. If handover is determined, the transmission pool of the target cell is applied to operate in LTE mode 4 instead of LTE mode 3 after handover.

Regardless of whether any one of the above two methods is determined, it is necessary to define what resources to perform transmission/reception through during the handover interruption time. If a method of reducing the handover interruption time is introduced even for sidelink transmission, it may not be necessary. However, assuming that an LTE V2X operation is basically followed, when receiving a handover request from the serving cell, the UE 1301 activates a T304 timer and at the same time performs LTE V2X transmission for the transmission exceptional pool of the target cell received in the handover message in 1525. However, if the UE does not receive the exceptional pool from the target cell, the UE determines this as OOC and uses a pre-configured exceptional pool. Thereafter, when the handover procedure with the target cell is finished in 1530 to 1540 and scheduling resources received from the target cell are available, or LTE mode 4 transmission (mode 4) is possible through the resource pool of the target cell (for example, if transmittable resources are secured as a result of sensing the transmission resource pool of the target cell), the UE performs V2X communication through a specific resource of the corresponding resource pool. However, if the UE does not receive a normal transmission pool from the target cell, the UE determines this as OOC and uses a pre-configured transmission resource pool in 1545.

Figure 16:
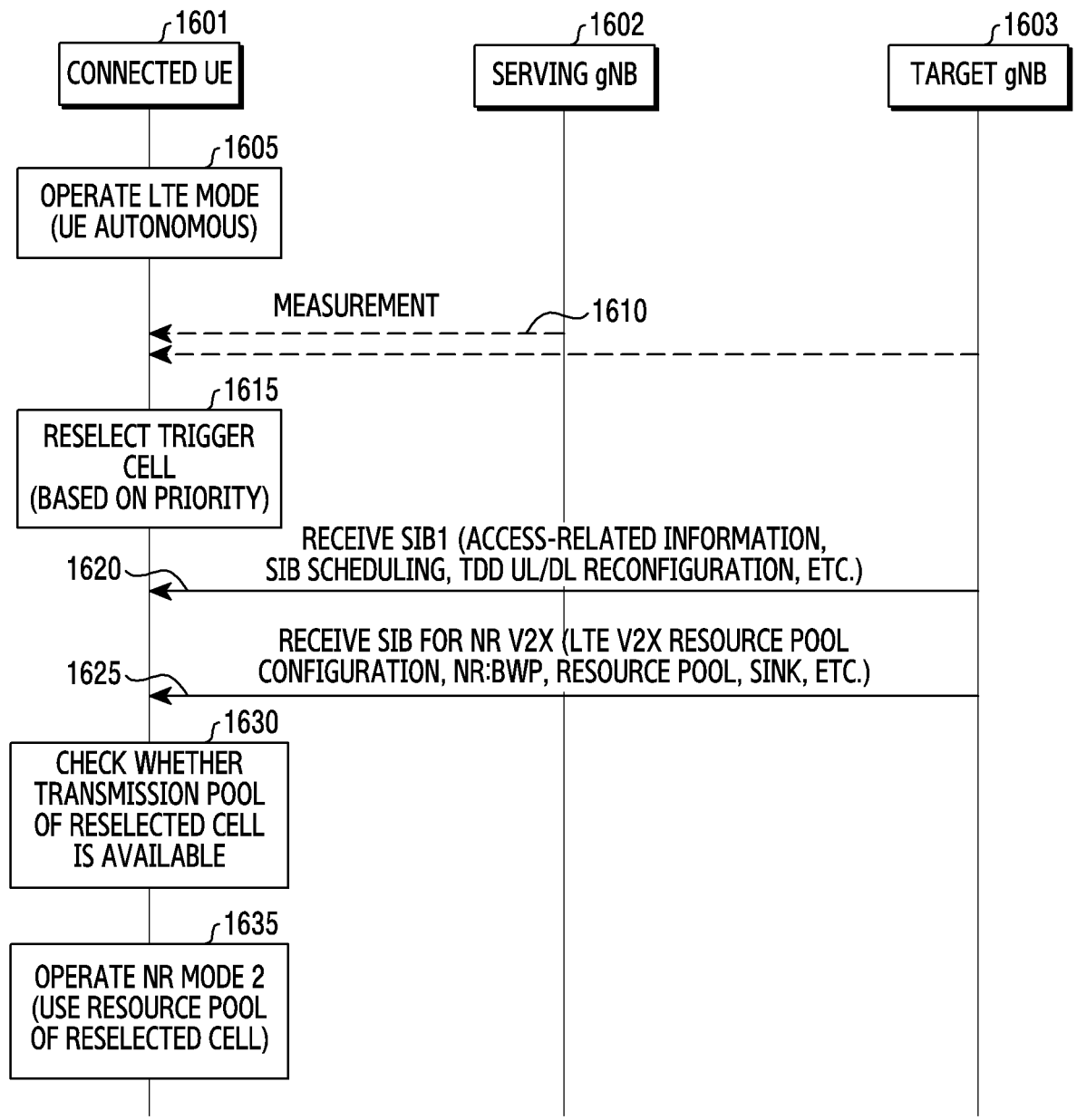
FIG. 16 illustrates an example of a method for supporting mobility from an LTE serving cell to an NR serving cell by a terminal in an idle state in a wireless communication system according to various embodiments of the disclosure.

FIG. 16 illustrates an example of a method for supporting mobility from an LTE serving cell to an NR serving cell by a terminal in an idle state in a wireless communication system according to various embodiments of the disclosure. Specifically, FIG. 16 is a diagram illustrating a method for a UE in an IDLE state to support mobility from an LTE serving cell to an NR serving cell as Embodiment 4 of the disclosure. This embodiment may correspond to Case 2-3 of scenario 2 described above.

In operation 1605, a UE 1601 in an idle state performs an LTE mode 4 operation (a method for a UE to autonomously determine and transmit available resources from the transmission resource pool), and measures a channel from the current serving cell and neighboring cells. If the channel signal strength of a current serving cell 1602 is weak and the signal strength of a neighboring cell 1603 satisfies a condition for performing cell reselection, the UE performs a cell reselection operation to the neighboring cell in operation 1615. In performing the cell reselection operation, the UE may configure a frequency and cell supporting NR V2X to have a priority next to those of a frequency and cell supporting LTE V2X, and may perform searching. Alternatively, cell reselection may be performed by configuring the frequency and cell supporting NR V2X to have the same priority as that of the frequency and cell supporting LTE V2X. This is to allow the UE performing V2X communication to obtain the maximum service continuity.

In operation 1620, after performing cell reselection, the UE receives SIB1 from the corresponding cell, and when the UE is camped on, the UE receives the remaining system information from the camped-on cell 1603 in operation 1625. The SIB1 includes cell access-related information, scheduling information of other system information, and TDD UL/DL configuration of a corresponding serving cell, and the NR V2X system information includes resource pool information for sidelink data transmission and reception, configuration information for sensing operation, information for configuring synchronization, information for inter-frequency transmission and reception, and the like. In addition, if an NR V2X serving cell supports an LTE V2X service, LTE V2X resource pool configuration information supported by the target NR V2X cell is also included in the corresponding system information or transmitted through system information dedicated to LTE V2X. In the above operation, when the resource pool information provided by the LTE serving cell and the LTE V2X resource pool information provided by the NR serving cell are the same, an indicator indicating that there is no resource pool change may be included in the system information provided in operation 1620.

The UE that has performed cell reselection is required to determine what resource is used during an interruption time before receiving system information from the target cell 1603. This means that the UE must be able to quickly receive the system information for NR V2X from the target cell in order to reduce the interruption interval as much as possible in the implementation of the UE, and this interval is regarded as out of coverage (OOC) so that it is also possible to use pre-configured transmission resources. If there is a transmission resource pool applicable after receiving the system information in operation 1630, the UE uses an exceptional resource pool provided by the corresponding cell until V2X transmission through the corresponding resource is valid, and then performs sidelink transmission by applying a corresponding normal resource pool after the validity is determined (for example, a case in which the sensing result in the resource pool is valid so that the UE can transmit the sidelink to a specific resource) in operation 1635.

Figure 17:
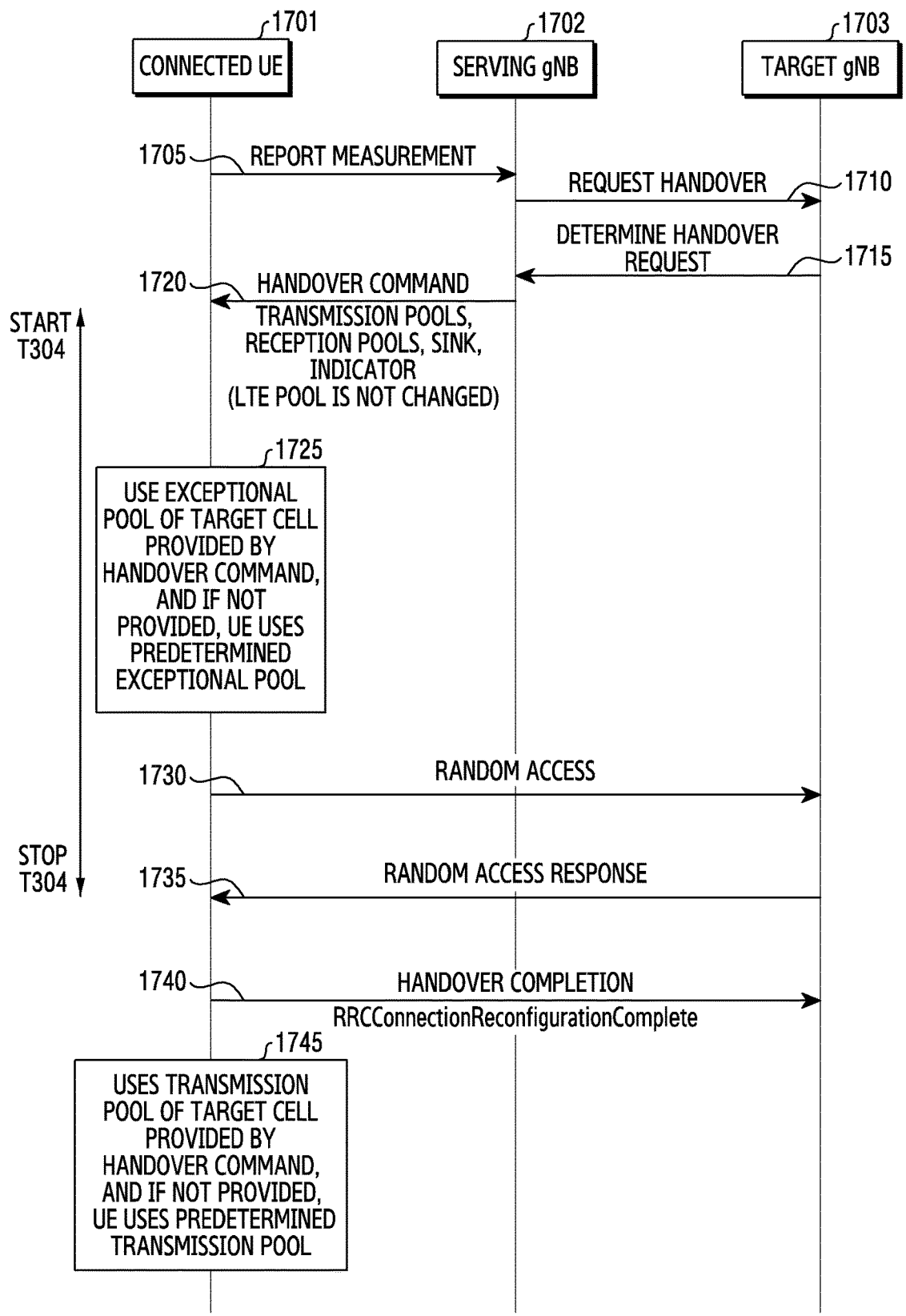
FIG. 17 illustrates an example of a method for supporting mobility from an NR serving cell to an LTE serving cell by a terminal in a connected state in a wireless communication system according to various embodiments of the disclosure.

FIG. 17 illustrates an example of a method for supporting mobility from an NR serving cell to an LTE serving cell by a terminal in a connected state in a wireless communication system according to various embodiments of the disclosure. Specifically, FIG. 17 is a diagram illustrating a method for a UE in a connected state to support mobility from an NR serving cell to an LTE serving cell as Embodiment 5 of the disclosure. This embodiment may correspond to Cases 3-1 and 3-2 of scenario 3 described above.

A UE 1701 in an RRC connected state performs a V2X operation (NR mode 1 or mode 2) in a connected state with a serving cell 1702 supporting NR V2X, and then may report the measurement result of neighboring cells due to a channel change caused by mobility to the serving cell in operation 2j-05. The NR serving cell 1702 determines whether to perform handover based on a channel measurement value of the UE, and transmits, if there is a target cell 1703 supporting LTE V2X in the vicinity, a handover request message to the target cell 1703 determined in 1710, considering the corresponding cell as a handover target. A cell providing the NR V2X may have the highest priority, and may have the same priority or have a priority next to that of the serving cell providing NR V2X. In operation 1715, the target LTE cell 1703 approves the handover of the corresponding UE, transmits a handover request response message, and transmits information necessary for handover to the target cell 1703 to the LTE serving cell 1702. The information includes transmission/reception resource pool information in the target cell, synchronization information, exceptional pool information, basic information required for cell access (e.g., random access resources), and the like. In operation 1720, the UE allows the information transmitted from the target cell to be included in a handover command message to transmit the handover command message to the UE. In addition, when the LTE V2X cell supports the NR V2X service, NR V2X resource pool configuration information supported by the corresponding target LTE V2X target cell is also included in a handover request response message 1715 and a handover command message 1720 transmitted to the UE by the NR serving cell. In the above operation, if the resource pool information provided by the NR serving cell and the LTE and NR V2X resource pool information provided by the LTE serving cell are the same, an indicator indicating that there is no resource pool change will be included in the handover command message provided in operation 1720. The indicator may be one bit, and information corresponding to several bits may be provided. Alternatively, the resource pool can be transmitted in a delta signaling perspective. That is, the resource pool may be additionally provided only to parameters that differ from information of the previous serving cell, and information without any change is not signaled. For reference, this embodiment operates on the premise that service continuity of the LTE V2X operation performed in the previous NR serving cell should be guaranteed even if a handover from the NR cell to the LTE cell occurs. However, if the target LTE cell does not support NR V2X configuration information, the UE can of course use only the LTE V2X configuration information received from the target LTE cell. That is, continuity of the NR V2X service operating in the NR cell cannot be supported. As one method, if handover is performed from the NR serving cell to the LTE serving cell, and if the target LTE cell does not support NR V2X configuration information and wants to use the NR service continuously, the UE determines this as OOC, and may use a pre-configured NR resource pool.

If the UE was operating in NR mode 1 in the connected state, the eNB explicitly instructs and uses a specific resource in the resource pool to the UE, so that the following configurations are possible in order to ensure that the transmission has continuity even after handover.

1. If handover is determined, the transmission pool of the target cell is applied to operate in LTE mode 1 (mode 1) instead of NR mode 1 (mode 1) after handover.

2. If handover is determined, the transmission pool of the target cell is applied to operate in NR mode 2 (mode 2) instead of NR mode 1 (mode 1) after handover.

3. If handover is determined, the transmission pool of the target cell is applied to operate in LTE mode 4 (mode 4) instead of NR mode 1 (mode 1) after handover.

Regardless of whether any one of the above two methods is determined, it is necessary to define what resources to perform transmission/reception through during the handover interruption time. If a method of reducing the handover interruption time is introduced even for sidelink transmission, it may not be necessary. However, assuming that an LTE V2X operation is basically followed, when receiving a handover request from the serving cell, the UE activates a T304 timer and at the same time performs LTE or NR V2X transmission for the transmission exceptional pool of the target cell received in the handover message in 1725. However, when failing to receive an exceptional pool from the corresponding target cell, the UE determines this as OOC and uses a pre-configured exceptional pool. Thereafter, when the handover procedure with the target cell is finished in 1730 to 1740 and scheduling resources received from the target cell are available, or LTE mode 4 or NR mode 2 transmission is possible through the resource pool of the target cell (for example, if transmittable resources are secured as a result of sensing the transmission resource pool of the target cell), the UE performs V2X communication through a specific resource of the corresponding resource pool. However, if the normal transmission pool cannot be received from the target cell, the UE determines this as OOC and uses a pre-configured transmission resource pool in 1745.

Figure 18:
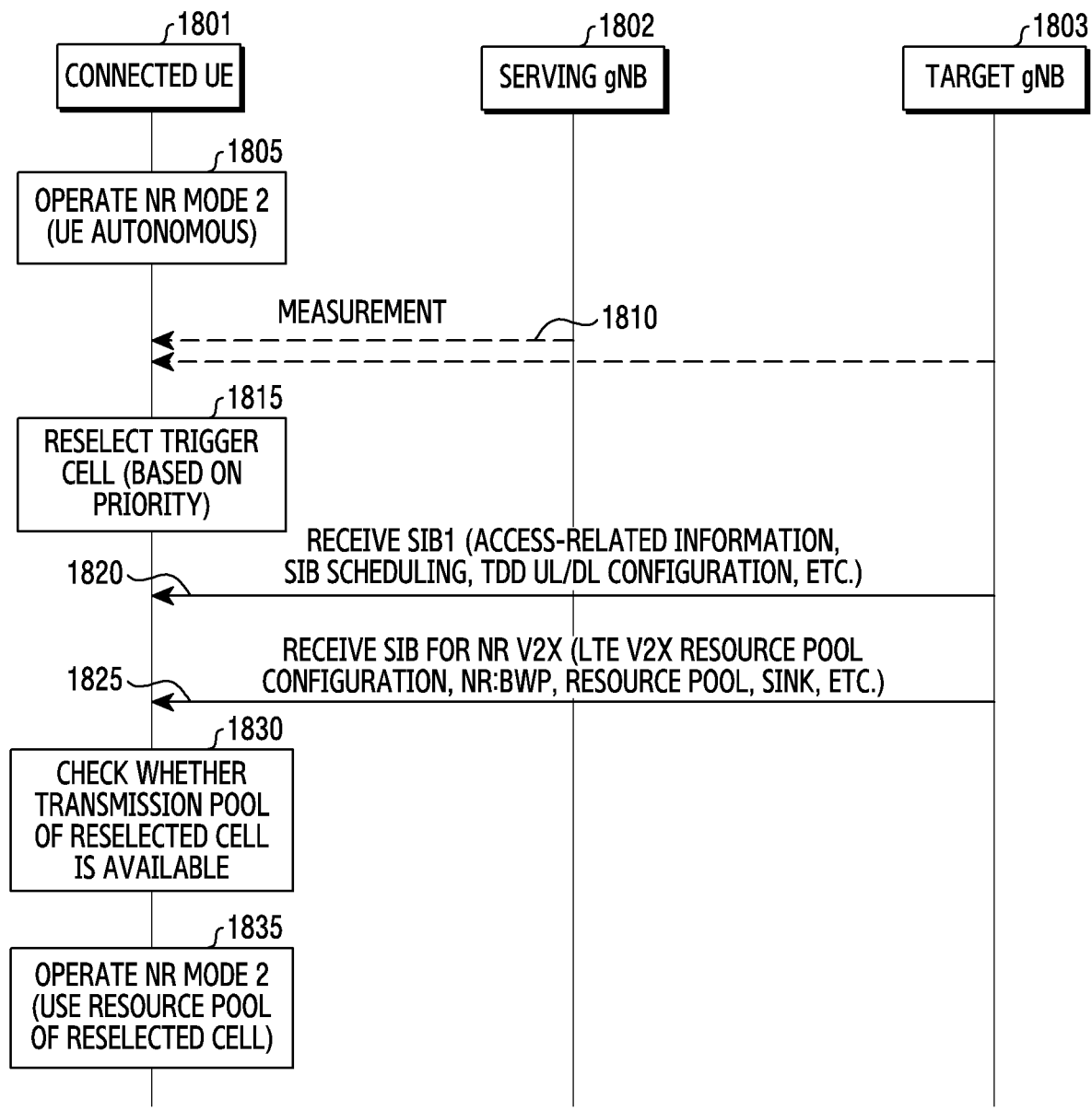
FIG. 18 illustrates an example of a method for supporting mobility from an NR serving cell to an LTE serving cell by a terminal in an IDLE state in a wireless communication system according to various embodiments of the disclosure.

FIG. 18 illustrates an example of a method for supporting mobility from an NR serving cell to an LTE serving cell by a terminal in an IDLE state in a wireless communication system according to various embodiments of the disclosure. Specifically, FIG. 18 is a diagram illustrating a method for a UE in an idle state to support mobility from an NR serving cell to an LTE serving cell as Embodiment 6 of the disclosure. This embodiment may correspond to Case 3-3 of scenario 3 described above.

In operation 1805, a UE 1801 in an idle state performs an NR mode 2 (mode 2) operation (a method for a UE to autonomously determine and transmit available resources from the transmission resource pool), and measures a channel from the current serving cell and neighboring cells. If the channel signal strength of the current serving cell is weak and the signal strength of the neighboring cell satisfies a condition for performing cell reselection, the UE performs a cell reselection operation to the neighboring cell in operation 1815. In performing the cell reselection operation, the UE may configure a frequency and cell supporting NR V2X to have the highest priority, and may perform searching. Alternatively, cell reselection may be performed by configuring the frequency and cell supporting NR V2X to have the same priority as that of the frequency and cell supporting LTE V2X. This is to allow the UE performing V2X communication to obtain the maximum service continuity.

In operation 1820, after performing cell reselection, the UE receives SIB1 from the corresponding cell, and when the UE is camped on, the UE receives the remaining system information from the camped-on cell in operation 1825. The SIB1 includes cell access-related information, scheduling information of other system information, and TDD UL/DL configuration of a corresponding serving cell, and the V2X system information includes resource pool information for sidelink data transmission and reception, configuration information for sensing operation, information for configuring synchronization, information for inter-frequency transmission and reception, and the like. In addition, if an LTE V2X serving cell supports an NR V2X service, NR V2X resource pool configuration information supported by the target LTE V2X cell is also included in the corresponding system information or transmitted through system information dedicated to NR V2X. In the above operation, when the resource pool information provided by the LTE serving cell and the LTE V2X resource pool information provided by the NR serving cell are the same, an indicator indicating that there is no resource pool change may be included in the system information provided in operation 1820.

The UE that has performed cell reselection is required to determine what resource is used during an interruption time before receiving system information from the target cell.

This means that the UE must be able to quickly receive the system information for V2X from the target cell in order to reduce the interruption interval as much as possible in the implementation of the UE, and this interval is regarded as OOC so that it is also possible to use pre-configured transmission resources. If there is a transmission resource pool applicable after receiving the system information in operation 1830, the UE uses an exceptional resource pool provided by the corresponding cell until V2X transmission through the corresponding resource is valid, and then performs sidelink transmission by applying a corresponding normal resource pool after the validity is determined (for example, a case in which the sensing result in the resource pool is valid so that the UE can transmit the sidelink to a specific resource) in operation 1835.

Figure 19:
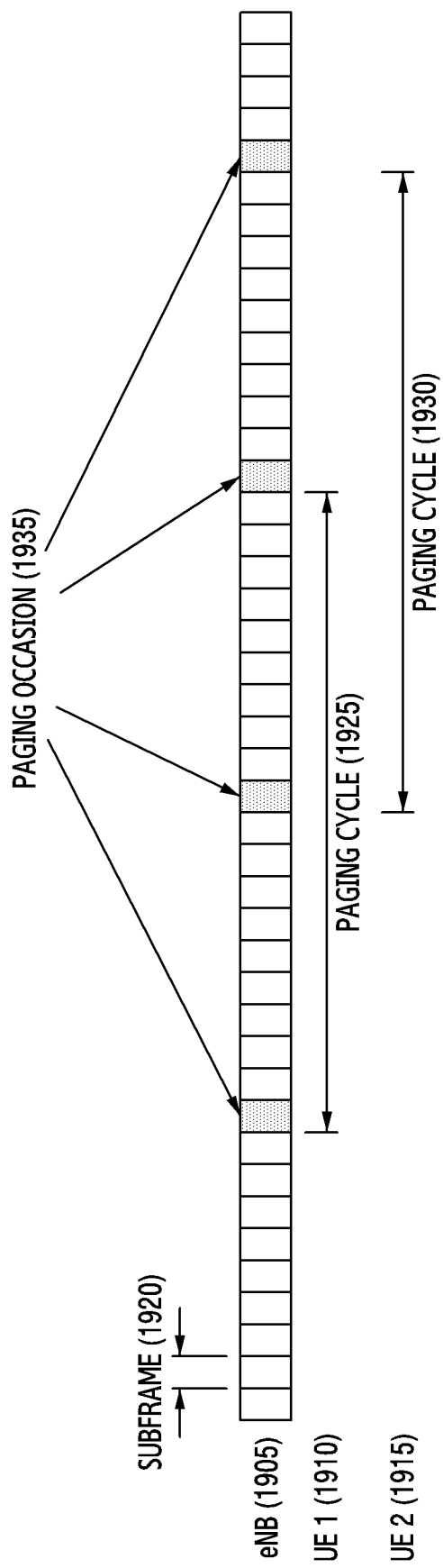
FIG. 19 illustrates an example of a discrete reception (DRX) operation for an IDLE terminal in a wireless communication system according to various embodiments of the disclosure.

FIG. 19 illustrates an example of a discrete reception (DRX) operation for an IDLE UE in a wireless communication system according to various embodiments of the disclosure. Specifically, FIG. 19 is a diagram illustrating a DRX operation for an idle UE in an LTE system.

UEs 1910 and 1915 monitor a PDCCH to receive paging from a network 1910 when the UEs are in an RRC idle state. In LTE, as an efficient method of reducing the power consumption of the UE, a discontinuous reception (hereinafter, referred to as "DRX") period is configured in units of subframe 1920, so that a receiver wakes up only for a predetermined time period and sleeps for the rest of the time. That is, in order to receive paging from the network 1910, paging cycles 1925 and 1930, which are predetermined time intervals, are configured. When the UE detects P-RNTI used for paging, the UEs 1910 and 1915 process a corresponding downlink paging message. The paging message contains the ID of the UE, and UEs other than the corresponding ID discard the received information and sleep according to the DRX cycle. During the DRX cycle, since the uplink timing is not known, HARQ is not used.

The network configures subframe 1920 in which the UE should receive paging. For the configuration, the minimum value of a period Tue requested by the UE and a cell-specific period Tc is used. In addition, 32, 64, 128, and 256 frames are configured in the paging cycle. Subframes to be monitored for paging within the above frame can be extracted from an international mobile subscriber identity (IMSI) of the UE. Since each UE has a different IMSI, the UE operates according to a paging instance belonging to each UE at the entire paging occasion 1935.

The paging message can be transmitted only in some subframes, and possible configurations are shown in the following Table 3.

TABLE 3

| | | Number of paging subframes | | | | | | | |
|---|---|---|---|---|---|---|---|---|---|
| | | 1/32 | 1/16 | 1/8 | 1/4 | 1/2 | 1 | 2 | 4 |
| Paging subframe | FDD | 9 | 9 | 9 | 9 | 9 | 9 | 4, 9 | 0, 4, 5, 9 |
| | TDD | 0 | 0 | 0 | 0 | 0 | 0 | 0, 5 | 0, 1, 5, 6 |

Figure 20:
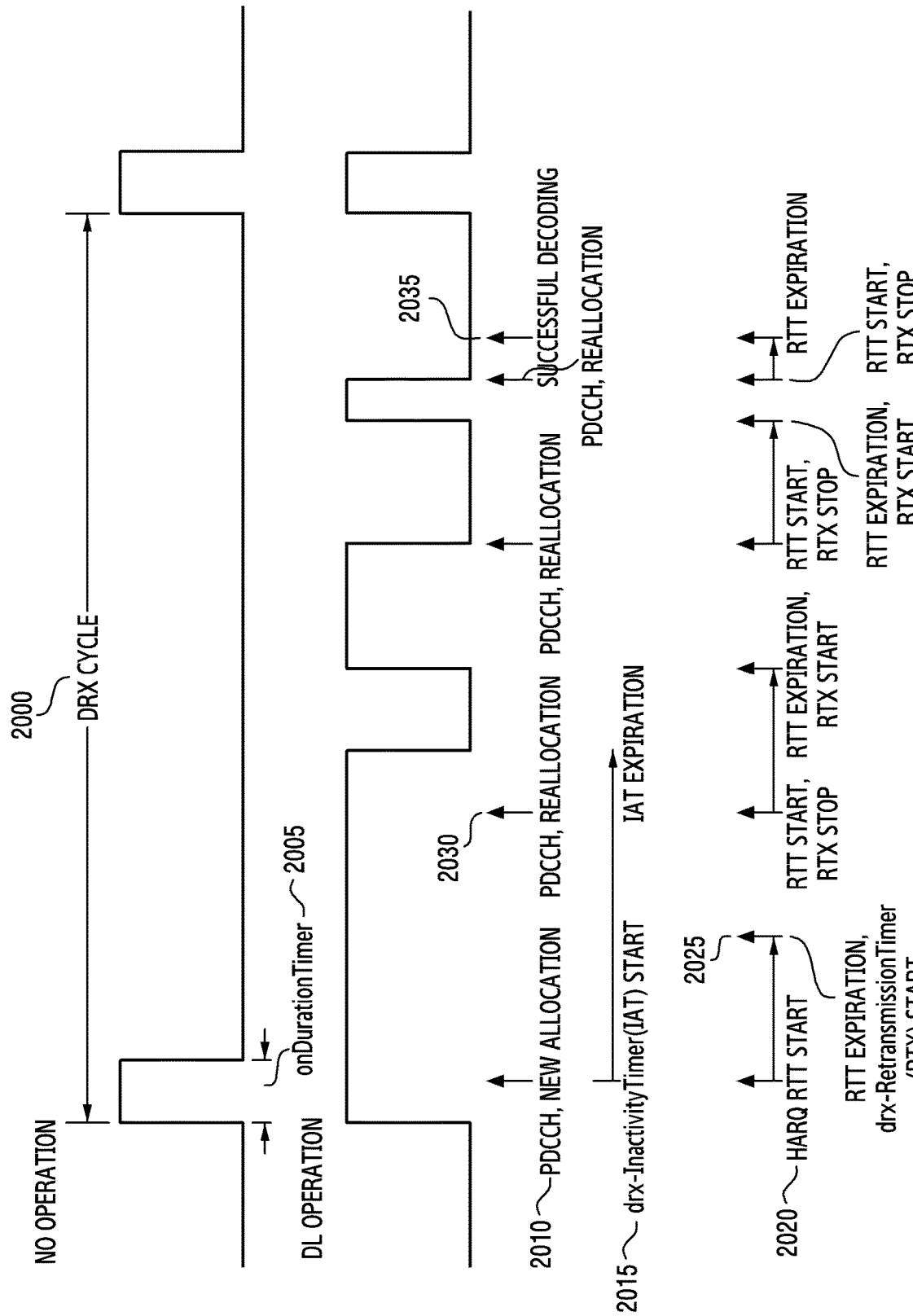
FIG. 20 illustrates an example of a DRX operation for a terminal in an RRC connected state in a wireless communication system according to various embodiments of the disclosure.

FIG. 20 illustrates an example of a DRX operation for a terminal in an RRC connected state in a wireless communication system according to various embodiments of the disclosure. Specifically, FIG. 20 is a diagram illustrating a DRX operation for a UE in an RRC connected state in an LTE system.

DRX is also defined in the RRC connected state, and its operation method is different from that of an idle DRX. This DRX is collectively referred to as a connected DRX (connected mode DRX or CDRX). As described above, in order for the UE to acquire scheduling information, continuously monitoring the PDCCH will cause large power consumption. The DRX operation in a basic connection state has a DRX cycle of 2000, and the PDCCH is monitored only during an on-duration 2005 time. In the connected mode, the DRX cycle has two values: long DRX and short DRX. In general, the long DRX cycle is applied, and if necessary, the eNB can trigger the short DRX cycle using a MAC control element (CE). After a certain period of time, the UE changes from the short DRX cycle to the long DRX cycle. Initial scheduling information of a specific UE is provided only in a predetermined PDCCH. Accordingly, the UE can minimize power consumption by periodically monitoring only the PDCCH. If, during the on-duration 2005 time, scheduling information for a new packet is received by PDCCH, in 2010, the UE starts a DRX inactivity timer 2015. The UE maintains an active state during the DRX inactivity timer. In other words, PDCCH monitoring is continued. An HARQ RTT timer 2020 is also started. The HARQ RTT timer is applied to prevent the UE from monitoring the PDCCH unnecessarily during the HARQ round trip time (RTT), and during the timer operation time, the UE does not need to perform PDCCH monitoring. However, while the DRX inactivity timer and HARQ RTT timer operate at the same time, the UE continues to monitor the PDCCH based on the DRX inactivity timer. When the HARQ RTT timer expires, a DRX retransmission timer 2025 is started. While the DRX retransmission timer is operating, the UE must perform PDCCH monitoring. In general, during the DRX retransmission timer operation time, scheduling information for HARQ retransmission is received in 2030. Upon receiving the scheduling information, the UE immediately stops the DRX retransmission timer and starts the HARQ RTT timer again. The above operation continues until the packet is successfully received in 2035.

Configuration information related to the DRX operation in the connected mode is delivered to the UE through an RRCConnectionReconfiguration message. The on-duration timer, the DRX inactivity timer, and the DRX retransmission timer are defined as the number of PDCCH subframes. After the timer starts, when the number of subframes defined as PDCCH subframes passes by a predetermined number, the timer expires. In FDD, all downlink subframes belong to PDCCH subframes, and in TDD, downlink subframes and special subframes correspond to this. In TDD, a downlink subframe, an uplink subframe, and a special subframe exist in the same frequency band. Among them, a downlink subframe and a special subframe are considered as a PDCCH subframe.

The eNB can configure two states: longDRX and shortDRX. In general, the eNB may use one of the two states in consideration of power preference indication information and UE mobility record information reported from the UE, and characteristics of the configured DRB. The transition between the two states is achieved by transmitting a specific timer or a specific MAC CE to the UE.

Figure 21:
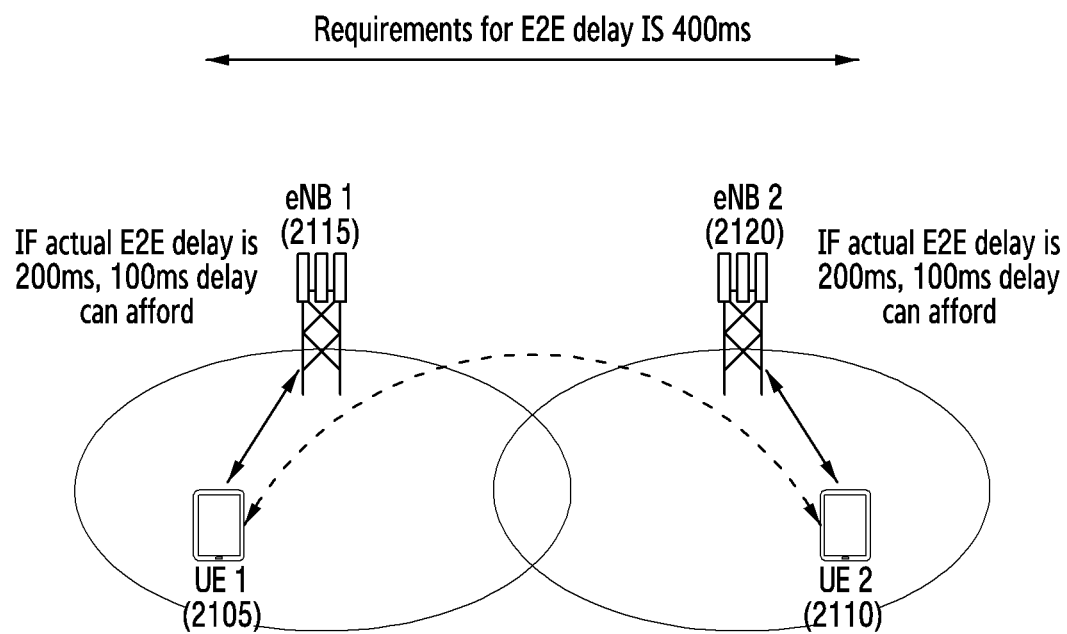
FIG. 21 illustrates an example of an operation of a packet delay budget report for improving voice over LTE (VoLTE) quality in a wireless communication system according to various embodiments of the disclosure.

FIG. 21 illustrates an example of an operation of a packet delay budget report for improving voice over LTE (VoLTE) quality in a wireless communication system according to various embodiments of the disclosure. Specifically, FIG. 21 is a diagram illustrating a packet delay budget report operation for improving VoLTE quality in a wireless communication system to which the disclosure is applied.

Based on the LTE system, the recommended unidirectional end-to-end (E2E) delay time, which is currently VoLTE's QoS requirement, is within 150 ms and the budget is less than 400 ms. Referring to the drawing, when two UEs 2105 and 2110 are performing VoLTE service through connected eNBs 2115 and 2120, respectively, the VoLTE quality of the UE 1 2105 and the UE 2 2110 may be different depending on the channel state in which the UE is connected to the eNB. That is, in the case of UE 1, the VoLTE quality is good, but in the case of UE 2, the VoLTE quality may be poor. In addition, the eNB can adjust the DRX (CDRX) period in the connection state to the UE according to the unidirectional packet delay time of the VoLTE described above, and for an MTC UE, the UE can adjust the period in which the UE can repeatedly transmit. In general, the eNB tries to reduce unnecessary power consumption of the UE by configuring the DRX connection state with the UE when the channel state with the UE is good. Conversely, when the channel state with the terminal is bad, the eNB does not configure the DRX connection state with the UE. In the disclosure, an operation for requesting DRX reconfiguration in a connected state when the VoLTE quality of the UE 1 2105 and UE 2 2110 is poor will be described. It will be described with reference to the following Table 4.

TABLE 4

| VoLTE quality | Channel quality | Delay budget report triggering | Configuration content | eNB operation |
|---|---|---|---|---|
| Poor | poor | eNB request delay budget report from UE 2 | X ms capable of eMTC repetitive transmission is put in DBR and transmitted (Type 1) | Perform eMTC repetitive transmission (X ms delay occurs) |
| poor | good | In order for UE 1 to improve VoLTE quality, preferred CDRS is put in delay budget report and transmitted | CDRX cycle value Y ms desired to be changed (reduced) is put in CDRX cycle value Y ms and transmitted (type 2) | Change CDRY cycle (by Y ms) |

As shown in Table 4, when the VoLTE quality of UE 1 2105 and UE 2 2110 is poor, the channel status of UE 1 2105 and an eNB 1 2115 is good, and the channel status of UE 2 2110 and an eNB 2 2120 is poor, it is highly likely that the eNB generally configures the CDRX for the UE 1 2105 and not for the UE 2 2110. However, the VoLTE communication performance with the UE 2 2110 may be further degraded by the CDRX operation configured in the UE 1 2105, which is related to a failure to receive a packet transmitted by the UE 2 during the sleep period by the CDRX. If the UE 1 2105 knows the unidirectional E2E delay time with the UE 2 2110, a budget delay value and CDRX cycle request value for the UE may be calculated in consideration of the corresponding delay time and the CDRX cycle configured by the eNB.

$$E2E \text{ delay budget} = E2E \text{ delay requirement } 400 \text{ ms} - \text{measured } E2E \text{ delay time} \quad \text{Equation 1}$$

That is, if an end-to-end (E2E) delay requirement is 400 ms, and the E2E delay time measured by the UE is 200 ms, an additional delay of 200 ms is allowed to the UE. If the current CDRX cycle is configured to 160 ms to the UE 1, the UE may improve VoLTE performance by adjusting the configured CDRX cycle value or may increase the CDRX cycle to achieve power reduction. The E2E delay time measured above can be regarded as the sum of the configured CDRX cycle value and a packet transmission delay in wireless and wired channels, and the maximum value (E2E delay budget/2) of the CDRX cycle change may be 100 ms. This is a case of considering the operation of another UE when both the channels of the UE 1 and the UE 2 are considered, but the exact value may vary. That is, by reducing the CDRX cycle value, the UE can receive packets more frequently, and thus VoLTE performance can be improved. The CDRX cycle change value that the UE can request may be configured by UE implementation in consideration of the E2E delay value. In addition, since the E2E transmission delay value is a value measured by the UE, the eNB and the network do not know the exact value, so the corresponding operation can be triggered by the UE. That is, in order to report the transmission delay budget, unlike the previously configured CDRX cycle value, the CDRX cycle value Yms to be changed according to the E2E transmission delay value measured by the UE may be requested. The eNB receiving the message may reconfigure the CDRX cycle to a predetermined period.

Figure 22B:
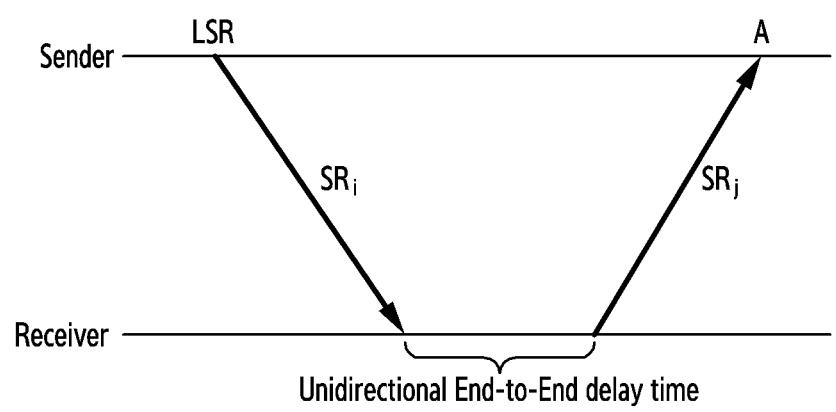

FIGS. 22A to 22B illustrate an example of a method for a terminal to measure a packet transmission delay in a wireless communication system according to various embodiments of the disclosure. Specifically, FIGS. 22A to 22B are diagrams illustrating a method for a UE to measure a packet transmission delay in a VoLTE system to which the disclosure is applied.

As briefly described in FIG. 21, since the eNB and the network cannot measure the unidirectional packet delay time between the UEs, it is impossible to know if the correct packet delay measurement value is not reported. When a VoLTE service is performed, the UE can transmit data using real time protocol (RTP) packets, and can measure the E2E delay time between UEs by transmitting and receiving real time control protocol (RTCP) packets.

Referring to FIG. 22A, a sender report format of an RTCP packet is shown. In the format, an E2E packet delay time can be measured by referring to a last sender report (SR) and a delay since last SR (DLSR). That is, as shown in FIG. 22B, a unidirectional E2E delay time can be summarized by the following Equation 2.

$$\text{Unidirectional } E2E \text{ delay time} = ((\text{time } A - \text{time LSR}) - \text{DLSR})/2 \quad \text{Equation 2}$$

This method is only an example, and the packet transmission delay time between UEs can be implemented through other methods. The reason for dividing by 2 in the above equation can be known through round-trip time in order for the transmitting end to measure the unidirectional E2E delay time, and the unidirectional E2E delay time is calculated as half of the round-trip time of the packet.

Figure 23:
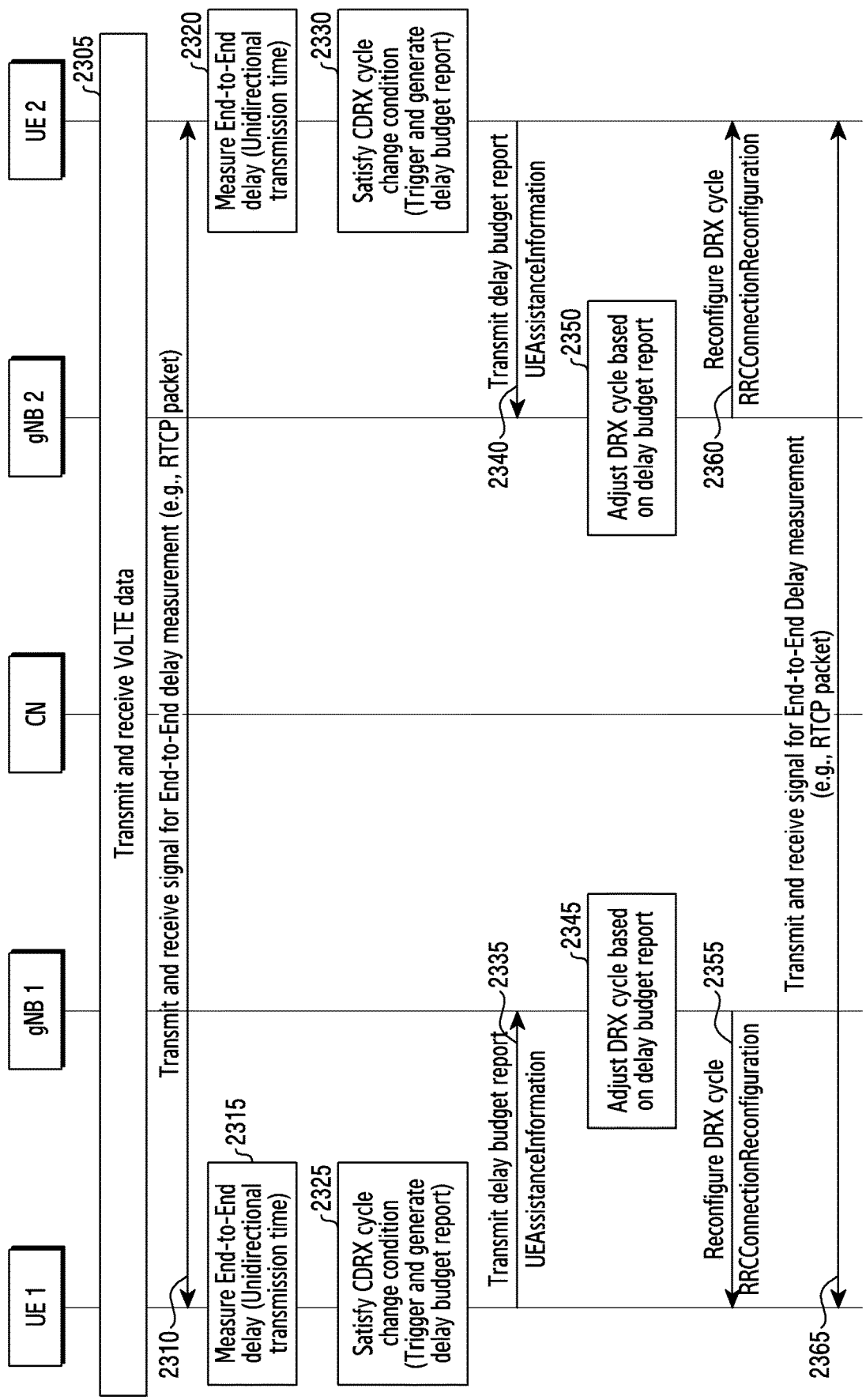
FIG. 23 illustrates an example of a method for a terminal to request a change in a connected state DRX cycle and transmit and receive data by applying the request in a wireless communication system according to various embodiments of the disclosure.

FIG. 23 illustrates an example of a method for a terminal to request a change in a connected state DRX cycle and transmit and receive data by applying the request in a wireless communication system according to various embodiments of the disclosure. Specifically, FIG. 23 is a diagram illustrating a method for a UE to transmit and receive data by requesting a change in a connection state DRX cycle and applying this as an embodiment proposed in the disclosure. Overall operations described in this drawing are applicable to both an LTE system and a next-generation mobile communication system.

A UE 1 and UE 2 in an RRC connected state are connected to an eNB 1 and an eNB 2, respectively, and can transmit and receive voice data through a VoLTE service. In this embodiment, taking VoLTE service as an example, the overall operation in which the UE measures an E2E delay mission delay time and a predetermined E2E delay request time margin, or requests a change in repetitive transmission period for eMTC UEs. In the disclosure, the DRX cycle change is described, and the DRX cycle change request is performed by the UE transmitting a delay budget report to a corresponding eNB. The message may be delivered as UEAssistanceInformation RRC message in 2335 and 2340. The message has the following message format. Here, the DRX cycle change request corresponds to a type1 field value of DelayBudgetReport-14 IE, and when the UE transmits the message, the DRX cycle value requesting the change is configured in the type 1 field and transmitted.

| UEAssistanceInformation message |
|---|
| -- ASN1START<br>UEAssistanceInformation-v1430-IEs ::=         SEQUENCE {<br>    bw-Preference-r14                                        BW-Preference-r14                                        OPTIONAL,<br>    sps-AssistanceInformation-r14                    SEQUENCE {<br>        trafficPatternInfoListSL-r14                  TrafficPatternInfoList-r14      OPTIONAL,<br>        trafficPatternInfoListUL-r14                  TrafficPatternInfoList-r14      OPTIONAL,<br>    }            OPTIONAL,<br>    rlm-Report-r14                                             SEQUENCE {<br>        rlm-Event-r14                                        ENUMERATED {earlyOutofSync, earlyInSync},<br>        excessRsp-MPDCCH-r14                      ENUMERATED {excessRep1, excessRep2}  OPTIONAL<br>    }                                                                                                                                         OPTIONAL,<br>    delayBudgetReport-r14                               DelayBudgetReport-r14                                OPTIONAL,<br>    nonCriticalExtension                                    SEQUENCE { }                                                OPTIONAL<br>}<br>DelayBudgetReport-r14::=      CHOICE {<br>    Type1                                                                ENUMERATED {<br>                                    msMinus1280, msMinus640, msMinus320, msMinus160,<br>                                    msMinus80, msMinus60, msMinus40, msMinus20, ms0, ms20,<br>                                        ms40, ms60, ms80, ms160, ms320, ms640, ms1280},<br>    Type2                                                                ENUMERATED {<br>                                    msMinus192, msMinus168, msMinus144, msMinus120,<br>                                    msMinus96, msMinus72, msMinus48, msMinus24, ms0,<br>MS24,                                                                                  ms48, ms72, ms96, ms120, ms144, ms168, ms192}<br>}<br>-- ASN1STOP | time to request a change in the connection state DRX cycle, and then configures a reconfigured DRX cycle to improve VoLTE call quality is illustrated. However, the above operation is not limited to VoLTE, that is, voice data service, but can be applied equally to other services.

In operation 2305, the UE 1 connected to the eNB 1 and the UE 2 connected to the eNB 2 may each perform a voice call through VoLTE. The above VoLTE data transmission and reception may be performed through an RTP packet. In this case, as described in FIG. 3H, after a corresponding field value is decoded through the transmission and reception of the RTCP packet, the round-trip time of the packet sent from the transmitting end is determined in 2310. In operations 2315 and 2320, the UE 1 and the UE 2 may measure the unidirectional transmission delay time through a signal for E2E measurement received in operation 2310. For example, the unidirectional E2E delay time can be obtained as half of the round-trip time of the packet measured in operation 2310. For reference, in the present embodiment, both the operations of the UE 1 and the UE 2 are included, but it is known that the operation of each UE is actually performed independently. That is, the UE 1 operation and the UE 2 operation may occur together, but may be performed only on one side. Alternatively, even if they are performed together, they can be performed at different times.

In operations 2325 and 2330, the UE 1 and UE 2 each changes the DRX cycle in a connected state to improve VoLTE quality based on the measured unidirectional trans- Various options as follows are possible depending on which DRX cycle value is used in Table 5.
1. Option 1: long DRX cycle of MCG (Master Cell Group)
    Apply long DRX cycle value configured in MCG
2. Option 2: short DRX cycle of MCG
    Apply short DRX cycle value configured in MCG
3. Option 3: Actual DRX cycle of MCG (long or short which is currently applied)
    Apply DRX cycle value (applied to both long DRX or short DRX) currently configured in MCG
4. Option 4: Short DRX cycle of MCG if short DRX cycle is configured for MCG. Otherwise long DRX cycle of MCG
    Apply short DRX cycle value of MCG if short DRX cycle is configured in MCG
5. Option 5: DelayBudgetReport indicates which DRX cycle should be adjusted
    Indicate which DRX cycle value is applied to Delay-BudgetReport The disclosure further proposes the following method in addition to the above method. The above method basically assumes that the DRX cycle in the MCG is used.
1. Proposal 1: uses DRX cycle value of specific cell group
    1-A. Method 1: uses DRX cycle value of cell group in which logical channel where VoIP (VoLTE) is configured exists
    1-B. Method 2: uses DRX cycle value of cell group configured from eNB (eNB explicitly instructs to refer to delay budget report of certain cell group)

2. Proposal 2: If transmission of UEAssistanceInformation message through SRB3 is possible in MR-DC including EN-DC and NR-NR DC, when indicating DRX cycle value, specify that it is used as DRX cycle value in cell group to which corresponding UEAssistanceInformation is reported The two proposals may be configured in combination with the long DRX and short DRX selection principles proposed above. That is, the cell group determined in Proposal 1 and 2 is applied instead of a fixed portion by the MCG in the options, and the remaining long DRX and short DRX configuration methods follow the methods in the options. For example, only the long DRX part of Proposal 1 and Option 1 is combined, and the same combination as the long DRX period value of a cell group in which a logical channel in which VoIP (VoLTE) is configured exists is possible.

In operations 2345 and 2350, the eNB 1 and eNB 2 reset the DRX cycle based on a DRX cycle change request signal received from the UEs 1 and 2. In the above-described operation of the eNB, the DRX cycle change request included in the RRC report message of the UE may be performed as it is, but other values may be configured according to determination or implementation of the eNB. In operations 2355 and 2360, the eNB delivers the reconfigured DRX cycle value to the UE through an RRC message. After that, the UE 1 and UE 2 continue to perform services (VoLTE or other data transmission/reception) according to the VoLTE or reconfigured the DRX cycle, and perform an E2E delay time measurement operation as in operation 2310, in operation 2365. If the currently requested DRX change value calculated based on a unidirectional packet delay time measured by the UE is different from the previously requested DRX cycle, the UE may trigger and repeat the DRX change request operations 2325 to 2360.

Figure 24:
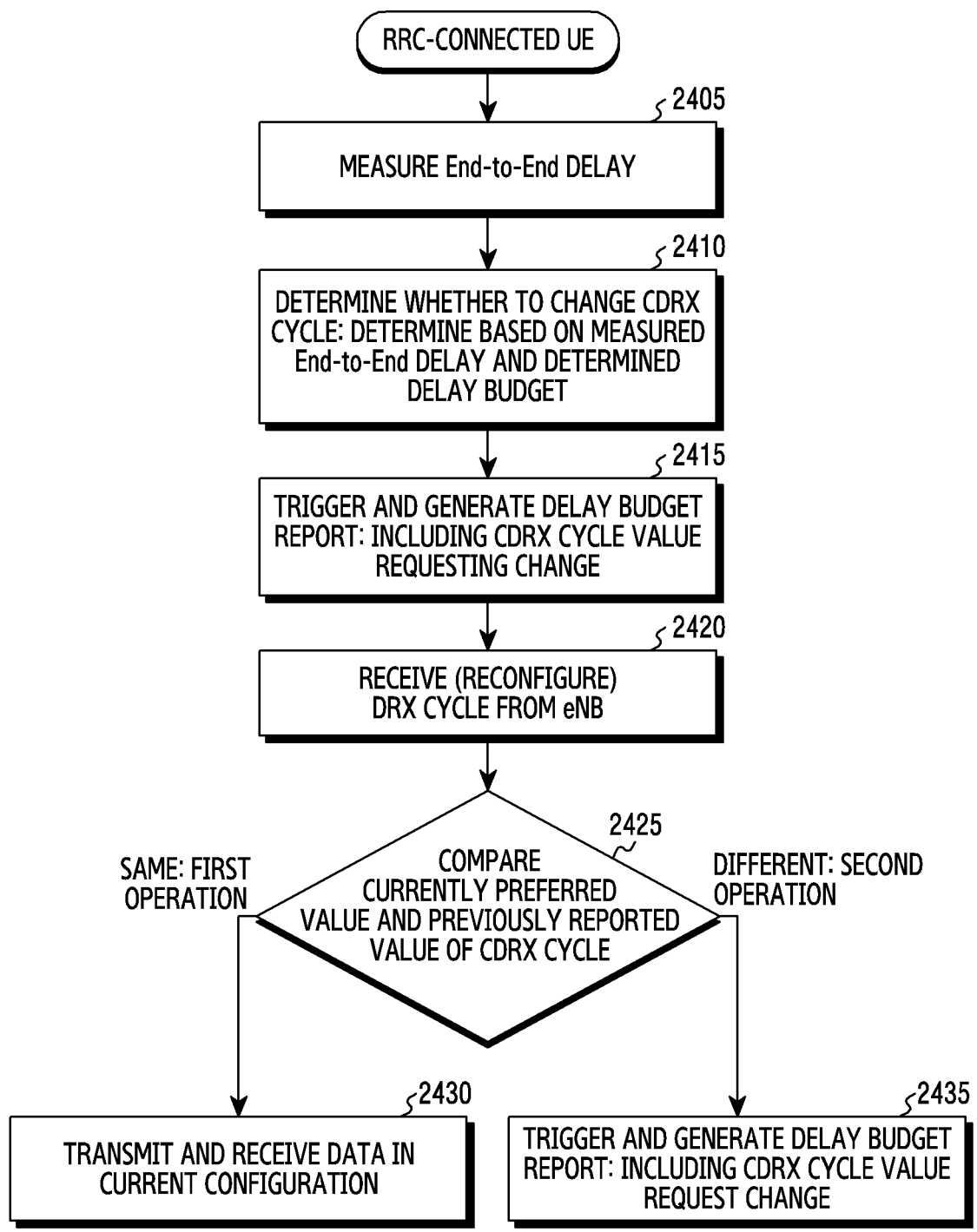
FIG. 24 illustrates an example of an overall operation of a terminal in a wireless communication system according to various embodiments of the disclosure.

FIG. 24 illustrates an example of an overall operation of a terminal in a wireless communication system according to various embodiments of the disclosure. Specifically, FIG. 24 is a diagram illustrating the overall operation of a UE to which the disclosure is applied.

In operation 2405, a UE in a connected state measures a unidirectional E2E delay. The above operation can be performed through various methods of UE implementation. For example, the above operation may be performed through transmission and reception of an RTP packet, especially an RTCP packet. In this case, as described in FIG. 3H, after decoding a specific field value for measuring the E2E delay in the RTCP packet, the round-trip-time of the packet sent from the transmitting end is measured. Then, based on this, the unidirectional E2E delay is measured. In operation 2410, the UE may determine the DRX cycle change in the connected state based on the measured unidirectional E2E and predetermined E2E delay requirement (determined in advance according to E2E delay requirement and QoS). That is, if there is a difference from the E2E delay requirement because the currently configured DRX cycle value is too long or too short, it is possible to improve data transmission/reception performance by adjusting the difference. For example, when VoLTE quality is poor for a UE currently executing a VoLTE service and the measured E2E delay value is large compared to the E2E delay requirement, it is possible to achieve the VoLTE quality and E2E delay requirement satisfaction by requesting to reduce the value of the CDRX cycle. For reference, the CDRX cycle value and the E2E delay have a correlation, and reducing the CDRX cycle has an effect of reducing the E2E delay. This is because data transmission/reception does not occur during the CDRX cycle, so the E2E delay must include the CDRX cycle. Conversely, if the VoLTE quality for the UE is good and the measured E2E delay value is small compared to the E2E delay requirement, by requesting an increase in the CDRX cycle value, the power consumption of the UE can be improved.

In operation 2415, the UE triggers and generates a delay budget report including the CDRX cycle value for requesting the change determined in the above process. Here, the DRX cycle change request corresponds to the type 1 field value of the DelayBudgetReport-14 IE of the RRC signaling UEAssistanceInformation message, and when the UE transmits the message, the DRX cycle value requesting the change is configured in the type 1 field and transmitted. Alternatively, it may be transmitted including the corresponding information through another type of RRC message or MAC CE.

In operation 2420, the UE receives an RRC message (RRC connection reconfiguration) from the eNB and reconfigures the DRX cycle. In operation 2425, the UE compares the preferred DRX cycle value in the currently reconfigured state with the previously reported DRX cycle value. If there is no difference, the UE performs a first operation, and if there is a difference, the UE performs a second operation. Operation 2430 is the first operation, in which the UE maintains the current configuration and transmits and receives data, and in operation 2435, the UE triggers a delay budget report as the second operation to re-request a desired CDRX cycle value by RRC signaling. This means repetition of operations 2410 to 2420 above.

Figure 25:
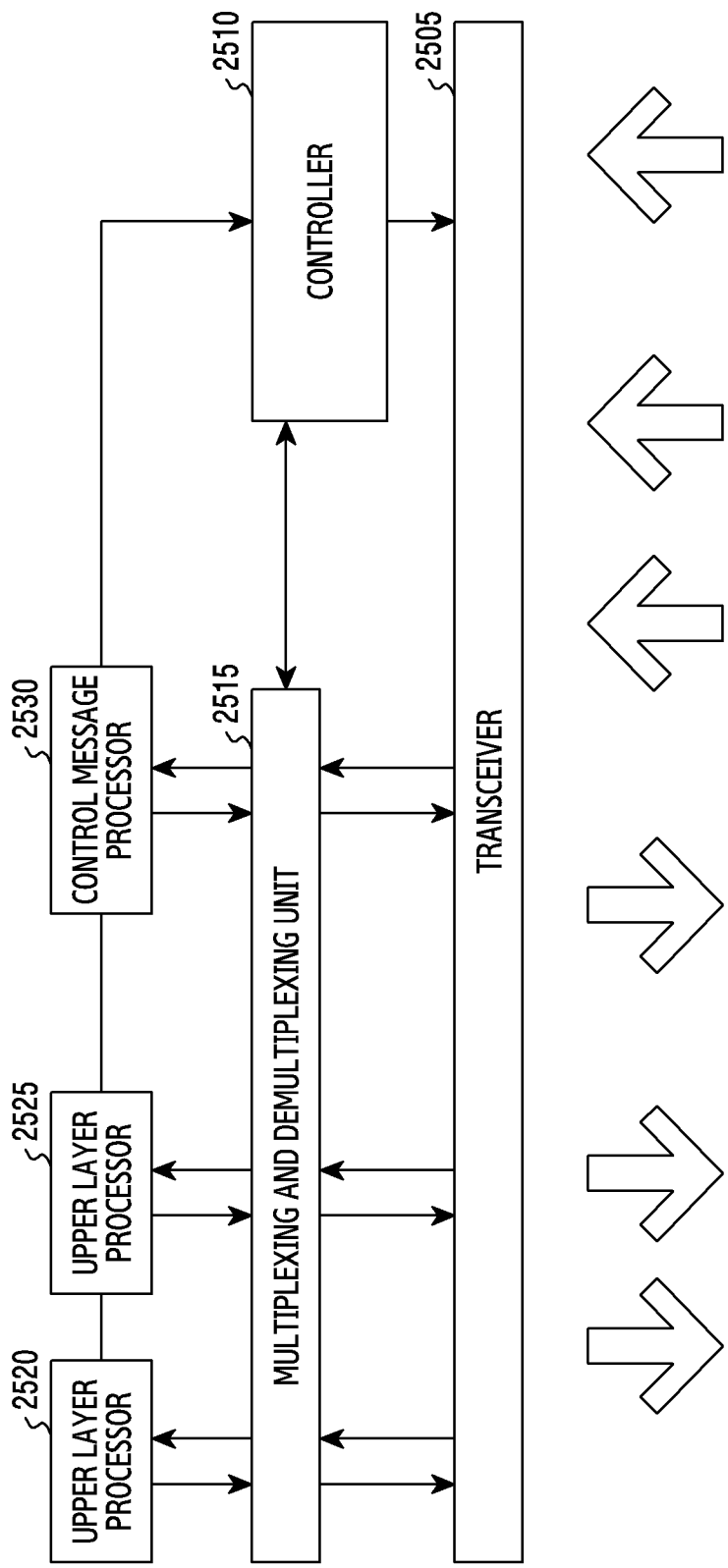
FIG. 25 illustrates an example of a block configuration of a terminal in a wireless communication system according to various embodiments of the disclosure.

FIG. 25 illustrates an example of a block configuration of a terminal in a wireless communication system according to various embodiments of the disclosure. Specifically, as illustrated in FIG. 25, a UE according to an embodiment of the disclosure includes a transceiver 2505, a controller 2510, a multiplexing and demultiplexing unit 2515, upper layer processors 2520 and 2525, and a control message processor 2530.

The transceiver 2505 receives data and a predetermined control signal through a forward channel of a serving cell, and transmits data and a predetermined control signal through a reverse channel. When multiple serving cells are configured, the transceiver 2505 performs data transmission/reception and control signal transmission/reception through the multiple serving cells. The transceiver 2505 may include at least one transmitter, at least one receiver, or at least one transceiver.

The multiplexing and demultiplexing unit 2515 multiplexes data generated by the upper layer processors 2520 and 2525 or the control message processor 2530, or demultiplexes the data received from the transceiver 2505 to transmits the multiplexed or demultiplexed data to the appropriate upper layer processors 2520 and 2525 or the control message processor 2530. The control message processor 2530 transmits and receives a control message from the base station and performs necessary operations. These operations include a function of processing control messages such as RRC messages and MAC CE, reporting of CBR measurement values, and reception of RRC messages for resource pool and UE operation. The upper layer processors 2520 and 2525 refer to DRB devices and may be configured for each service. The upper layer processors 2520 and 2525 may process data generated from user services such as file transfer protocol (FTP) or Voice over Internet Protocol (VoIP) and transmits the processed data to the multiplexing and demultiplexing unit 2515, or may process the data transmitted from the multiplexing and demultiplexing unit 2515 to transmit the processed data to an upper layer service application.

The controller 2510 controls the transceiver 2505 and the multiplexing and demultiplexing unit 2515 by checking scheduling commands received through the transceiver 2505, for example, reverse grants, so that reverse transmission is performed using appropriate transmission resources at an appropriate time. The controller 2510 may include at least one processor.

Meanwhile, in the above, it has been described that the UE is composed of a plurality of blocks and each block performs a different function, but this is only an exemplary embodiment and is not limited thereto. For example, the controller 2510 itself may perform a function that the multiplexing and demultiplexing unit 2515 performs.

Figure 26:
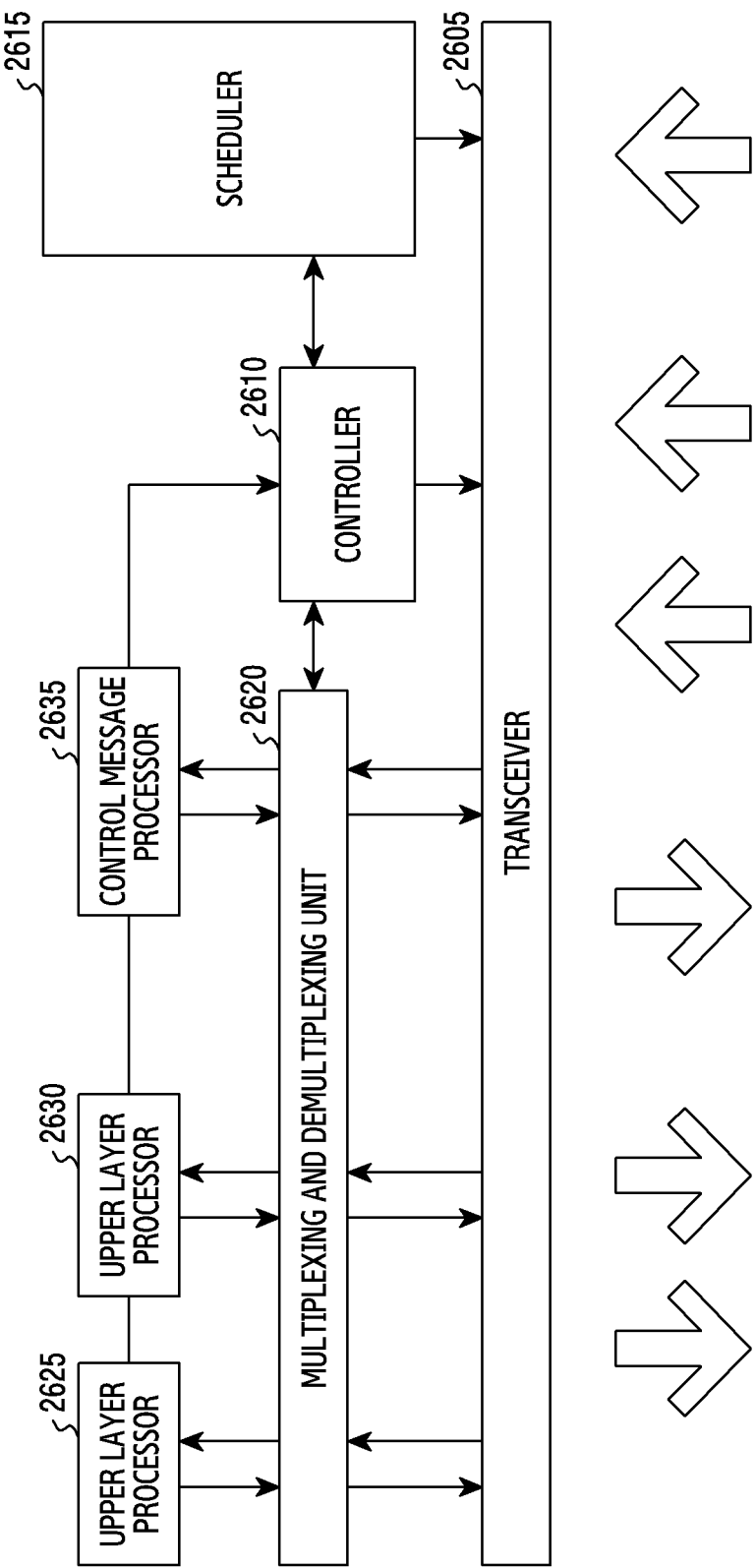
FIG. 26 illustrates an example of a block configuration of a base station in a wireless communication system according to various embodiments of the disclosure.

FIG. 26 illustrates an example of a block configuration of a base station in a wireless communication system according to various embodiments of the disclosure. Specifically, an eNB device of FIG. 26 includes a transceiver 2605, a controller 2610, a multiplexing and demultiplexing unit 2620, a control message processor 2635, upper layer processors 2625 and 2630, and a scheduler 2615.

The transceiver 2605 transmits data and a predetermined control signal through a forward carrier and receives data and a predetermined control signal through a reverse carrier. When multiple carriers are configured, the transceiver 2605 performs data transmission/reception and control signal transmission/reception through the multiple carriers. The transceiver 2505 may include at least one transmitter, at least one receiver, or at least one transceiver.

The multiplexing and demultiplexing unit 2620 multiplexes data generated by the upper layer processors 2625 and 2630 or the control message processor 2635, or demultiplexes the data received from the transceiver 2605 to transmit the multiplexed or demultiplexed data to the appropriate upper layer processors 2625 and 2630, the control message processor 2635, or the controller 2610. The controller 2610 may include at least one processor.

The control message processor 2635 receives an instruction from the controller, generates a message to be transmitted to a UE, and transmits the generated message to a lower layer. The upper layer processors 2625 and 2630 can be configured for each UE service, and process data generated from user services such as FTP or VoIP, and transmit the processed data to the multiplexing and demultiplexing unit 2620 or may process the data transmitted from the multiplexing and demultiplexing unit 2620 to transmit the processed data to an upper layer service application. The scheduler 2615 allocates transmission resources to the UE at an appropriate time in consideration of the buffer state, the channel state, and the active time of the UE, and may instruct the transceiver to process or transmit signals transmitted by the UE to the UE.

Figure 27:
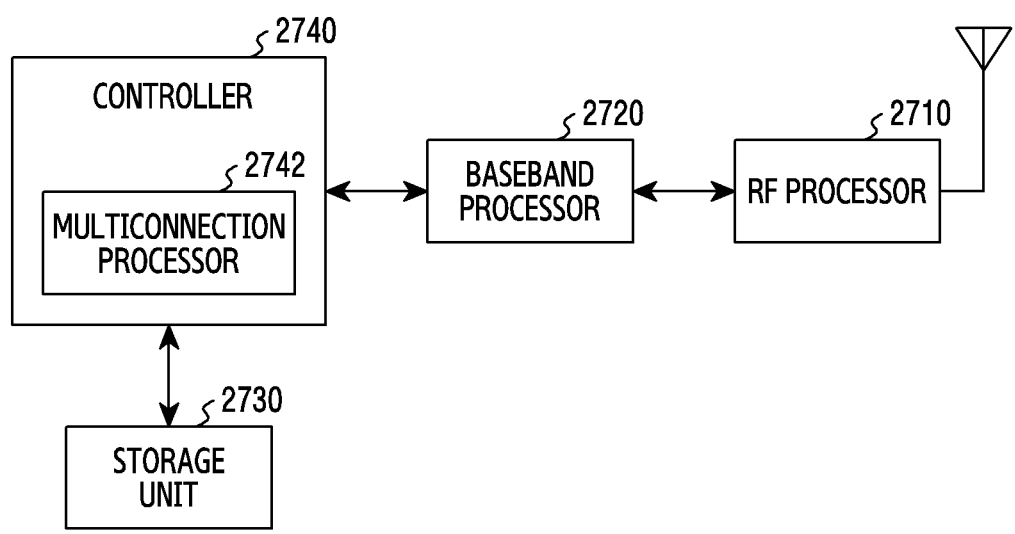
FIG. 27 illustrates an example of a configuration of a terminal in a wireless communication system according to various embodiments of the disclosure.

FIG. 27 illustrates an example of a configuration of a terminal in a wireless communication system according to various embodiments of the disclosure.

Referring to FIG. 27, a UE includes a radio frequency (RF) processor 2710, a baseband processor 2720, a storage unit 2730, and a controller 2740.

The RF processor 2710 performs a function for transmitting and receiving a signal through a wireless channel such as band conversion and amplification of a signal. That is, the RF processor 2710 up-converts a baseband signal provided from the baseband processor 2720 into an RF band signal and then transmits the up-converted signal through an antenna, and down-converts the RF band signal received through the antenna into a baseband signal. For example, the RF processor 2710 may include a transmission filter, a reception filter, an amplifier, a mixer, an oscillator, a digital-to-analog converter (DAC), an analog-to-digital converter (ADC), and the like. In the drawing, only one antenna is shown, but the UE may include a plurality of antennas. In addition, the RF processor 2710 may include a plurality of RF chains. Furthermore, the RF processor 2710 may perform beamforming. For the beamforming, the RF processor 2710 may adjust a phase and a magnitude of each of signals transmitted and received through the plurality of antennas or antenna elements. Further, the RF processor may perform MIMO, and may receive multiple layers when performing the MIMO operation.

The baseband processor 2720 performs a function of converting between a baseband signal and a bit stream according to the physical layer standard of the system. For example, when transmitting data, the baseband processor 2720 generates complex symbols by encoding and modulating a transmission bit stream. In addition, when receiving data, the baseband processor 2720 restores a received bit stream through demodulation and decoding of the baseband signal provided from the RF processor 2710. For example, in the case of an orthogonal frequency division multiplexing (OFDM) method, when transmitting data, the baseband processor 2720 generates complex symbols by encoding and modulating the transmission bit stream, maps the complex symbols to subcarriers, and then configures OFDM symbols through an inverse fast Fourier transform (IFFT) operation and a cyclic prefix (CP) insertion. In addition, when receiving data, the baseband processor 2720 divides the baseband signal provided from the RF processor 2710 into OFDM symbol units, restores the signals mapped to subcarriers through a fast Fourier transform (FFT) operation, and then restores the reception bit stream through demodulation and decoding.

The baseband processor 2720 and the RF processor 2710 transmit and receive signals as described above. Accordingly, the baseband processor 2720 and the RF processor 2710 may be referred to as a transmitter, a receiver, a transceiver, or a communication unit. Furthermore, at least one of the baseband processor 2720 and the RF processor 2710 may include a plurality of communication modules to support a plurality of different wireless access technologies. In addition, at least one of the baseband processor 2720 and the RF processor 2710 may include different communication modules to process signals of different frequency bands. For example, the different wireless access technologies may include a wireless LAN (e.g., IEEE 802.11, a cellular network (e.g., LTE)), etc. In addition, the different frequency bands may include a super high frequency SHF (e.g., 2.NRHz, NRhz) band and a millimeter wave (e.g., 60 GHz) band.

The storage unit 2730 stores data such as a basic program, an application program, and configuration information for the operation of the UE. In particular, the storage unit 2730 may store information related to a second access node that performs wireless communication using a second wireless access technology. Further, the storage unit 2730 provides stored data according to the request of the controller 2740.

The controller 2740 controls overall operations of the terminal. For example, the controller 2740 transmits and receives signals through the baseband processor 2720 and the RF processor 2710. Also, the controller 2740 writes and reads data in the storage unit 2740. To this end, the controller 2740 may include at least one processor. For example, the controller 2740 may include a communication processor (CP) that controls communication and an application processor (AP) that controls an upper layer such as an application program.

Figure 28:
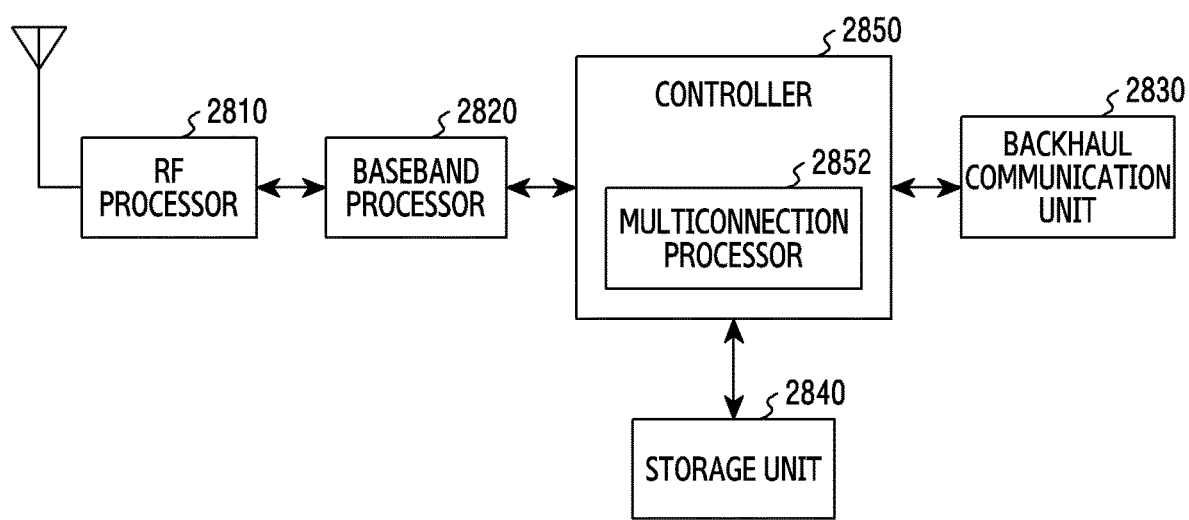
FIG. 28 illustrates an example of a configuration of a base station in a wireless communication system according to various embodiments of the disclosure.

FIG. 28 illustrates an example of a configuration of a base station in a wireless communication system according to various embodiments of the disclosure.

Referring to FIG. 28, an eNB includes an RF processor 2810, a baseband processor 2820, a backhaul communication unit 2830, a storage unit 2840, and a controller 2850.

The radio frequency (RF) processor 2810 performs a function for transmitting and receiving a signal through a wireless channel such as band conversion and amplification of a signal. That is, the RF processor 2810 up-converts the baseband signal provided from the baseband processor 2820 into an RF band signal and then transmits the up-converted signal through an antenna, and down-converts the RF band signal received through the antenna into a baseband signal. For example, the RF processor 2810 may include a transmission filter, a reception filter, an amplifier, a mixer, an oscillator, a digital-to-analog converter (DAC), an analog-to-digital converter (ADC), and the like. In the drawing, only one antenna is shown, but a first access node may include a plurality of antennas. In addition, the RF processor 2810 may include a plurality of RF chains. Furthermore, the RF processor 2810 may perform beamforming. For the beamforming, the RF processor 2810 may adjust a phase and a magnitude of each of signals transmitted and received through the plurality of antennas or antenna elements. The RF processor may perform a downlink multiple-input multiple-output (MIMO) operation by transmitting one or more layers.

The baseband processor 2820 performs a function of converting between a baseband signal and a bit stream according to the physical layer standard of the first wireless access technology. For example, when transmitting data, the baseband processor 2820 generates complex symbols by encoding and modulating a transmission bit stream. In addition, when receiving data, the baseband processor 2820 restores a received bit stream through demodulation and decoding of the baseband signal provided from the RF processor 2810. For example, in the case of the OFDM (orthogonal frequency-division multiplexing) scheme, when transmitting data, the baseband processor 2820 generates complex symbols by encoding and modulating a transmission bit stream, and mapping the complex symbols to subcarriers. Thereafter, OFDM symbols are configured through IFFT operation and CP insertion. In addition, when receiving data, the baseband processor 2820 divides the baseband signal provided from the RF processor 2810 into OFDM symbol units, restores signals mapped to subcarriers through FFT operation, and then restores the received bit stream through demodulation and decoding. The baseband processor 2820 and the RF processor 2810 transmit and receive signals as described above. Accordingly, the baseband processor 2820 and the RF processor 2810 may be referred to as a transmitter, a receiver, a transceiver, a communication unit, or a wireless communication unit.

The backhaul communication unit 2830 provides an interface for performing communication with other nodes in a network. That is, the backhaul communication unit 2830 converts a bit stream transmitted from the main station to another node, for example, an auxiliary base station, a core network, etc., into a physical signal, and converts a physical signal received from the other node into a bit stream.

The storage unit 2840 stores data such as a basic program, an application program, and configuration information for the operation of the main station. In particular, the storage unit 2840 may store information on a bearer allocated to an accessed terminal and a measurement result reported from the connected UE. In addition, the storage unit 2840 may store information serving as a criterion for determining whether to provide or stop providing multiple connections to the terminal. In addition, the storage unit 2840 provides stored data according to the request of the control unit 2850.

The controller 2850 controls overall operations of the main station. For example, the control unit 2850 transmits and receives signals through the baseband processor 2820 and the RF processor 2810 or through the backhaul communication unit 2830. Also, the controller 2850 writes and reads data in the storage unit 2840. To this end, the control unit 2850 may include at least one processor.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a first user equipment (UE) in a wireless communication, the method comprising:
   receiving, from a first base station, a radio resource control (RRC) reconfiguration message, wherein the RRC reconfiguration message includes synchronization information, first configuration information for a new radio (NR) sidelink communication associated with a first exceptional resource pool, and second configuration information for an evolved-universal mobile telecommunications system (UMTS) terrestrial radio access (E-UTRA) sidelink communication associated with a second exceptional resource pool;
   starting a 304 timer based on the receiving of the RRC reconfiguration message including the synchronization information;
   performing a sidelink communication with a second UE based on the first exceptional resource pool, in case that the 304 timer is running and the first configuration information includes the first exceptional resource pool,
   performing a random access to a second base station;
   upon a completion of the random access, stopping the 304 timer; and
   transmitting an RRC reconfiguration complete message to the second base station.

2. The method of claim 1, wherein the sidelink communication with the second UE is performed based on:
   a normal resource pool in case that the normal resource pool is received, and
   a preconfigured resource pool in case that a resource associated with the sidelink communication is not received.

3. The method of claim 1, wherein the random access to the second base station is performed while the 304 timer is running.

4. The method of claim 1, wherein the synchronization information is associated with the 304 timer and a handover with performing the random access to the second base station.

5. A first user equipment (UE) in a wireless communication, the first UE comprising:
   a transceiver; and
   a controller coupled with the transceiver, and configured to:
      receive, from a first base station, a radio resource control (RRC) reconfiguration message, wherein the RRC reconfiguration message includes synchronization information, first configuration information for a new radio (NR) sidelink communication associated with a first exceptional resource pool, and second configuration information for an evolved-universal mobile telecommunications system (UMTS) terrestrial radio access (E-UTRA) sidelink communication associated with a second exceptional resource pool,
      start a 304 timer based on the receiving of the RRC reconfiguration message including the synchronization information,
      perform a sidelink communication with a second UE based on the first exceptional resource pool, in case that the 304 timer is running and the first configuration information includes the first exceptional resource pool,
      perform a random access to a second base station while the 304 timer is running,
      upon a completion of the random access, stop the 304 timer, and
      transmit an RRC reconfiguration complete message to the second base station.

6. The first UE of claim 5, wherein the sidelink communication with the second UE is performed based on:
   a normal resource pool in case that the normal resource pool is received, and
   a preconfigured resource pool in case that a resource associated with the sidelink communication is not received.

7. The first UE of claim 5, wherein the random access to the second base station is performed while the 304 timer is running.

8. The first UE of claim 5, wherein the synchronization information is associated with the 304 timer and a handover with performing the random access to the second base station.

* * * * *